US 7,031,956 B1

(12) United States Patent
Lee et al.

(10) Patent No.: US 7,031,956 B1
(45) Date of Patent: Apr. 18, 2006

(54) SYSTEM AND METHOD FOR SYNCHRONIZING AND/OR UPDATING AN EXISTING RELATIONAL DATABASE WITH SUPPLEMENTAL XML DATA

(75) Inventors: Wang-Chien Lee, Belmont, MA (US); Gail Anne Mitchell, Westwood, MA (US); Elke Angelika Rundensteiner, Acton, MA (US); Xin Zhang, Seattle, WA (US)

(73) Assignee: Verizon Laboratories Inc., Waltham, MA (US)

( * ) Notice: Subject to any disclaimer, the term of this patent is extended or adjusted under 35 U.S.C. 154(b) by 602 days.

(21) Appl. No.: 09/973,514

(22) Filed: Oct. 9, 2001

Related U.S. Application Data

(63) Continuation-in-part of application No. 09/783,657, filed on Feb. 14, 2001.

(60) Provisional application No. 60/182,939, filed on Feb. 16, 2000.

(51) Int. Cl.
*G06F 17/30* (2006.01)

(52) U.S. Cl. .......................... 707/3; 100/101; 100/102; 100/104.1

(58) Field of Classification Search .............. 707/1–10, 707/100–204
See application file for complete search history.

(56) References Cited

U.S. PATENT DOCUMENTS

| 5,897,634 | A  | * | 4/1999  | Attaluri et al. .......... 707/104.1 |
| 5,970,490 | A  | * | 10/1999 | Morgenstern ................ 707/10  |
| 6,209,124 | B1 | * | 3/2001  | Vermeire et al. ........... 717/114  |
| 6,418,448 | B1 | * | 7/2002  | Sarkar ..................... 707/104.1 |
| 6,519,597 | B1 | * | 2/2003  | Cheng et al. ................ 707/10  |
| 6,591,260 | B1 | * | 7/2003  | Schwarzhoff et al. .......... 707/2  |
| 6,604,100 | B1 | * | 8/2003  | Fernandez et al. ............. 707/3 |
| 6,636,845 | B1 | * | 10/2003 | Chau et al. .................... 707/1 |
| 6,643,652 | B1 | * | 11/2003 | Helgeson et al. ............. 707/10 |
| 6,665,677 | B1 | * | 12/2003 | Wotring et al. ............. 707/100  |
| 6,718,320 | B1 | * | 4/2004  | Subramanian et al. ......... 707/2  |
| 6,766,330 | B1 | * | 7/2004  | Chen et al. ................. 707/102 |
| 6,785,673 | B1 | * | 8/2004  | Fernandez et al. ............. 707/3 |
| 2001/0047372 | A1 | * | 11/2001 | Gorelik et al. ............. 707/514 |
| 2002/0116371 | A1 | * | 8/2002  | Dodds et al. .................. 707/3 |
| 2002/0169788 | A1 | * | 11/2002 | Lee et al. ................ 707/104.1 |
| 2003/0014397 | A1 | * | 1/2003  | Chau et al. .................... 707/3 |

OTHER PUBLICATIONS

"An Effective Mechanism for Index Update in Structured Documents"—Hyunchui Jang, Youngil Kim & Dongwook Shin—1999 ACM (pps 383-390).*

(Continued)

*Primary Examiner*—Jean Corrielus
*Assistant Examiner*—Anh Ly
(74) *Attorney, Agent, or Firm*—Leonard C. Suchtya, Esq.; Joel Wall, Esq.; Rader, Fishman & Grauer PLLC

(57) ABSTRACT

A system and a method for synchronizing and updating a relational database with supplemental data in which the relational database has a set of tables defined by a relational schema. The supplemental data preferably comprises data in a tagged format having a document-type definition representative of the relational schema and is represented in a document object. The system and method preferably ensure record-by-record updating and synchronization of the relational database with the at least one proposed data update by receiving at least one proposed data update from a source external to the relational database; and propagating the received at least one proposed data update into the relational database. In this matter, the compliance with both the relational database relational schema and the tagged data document type definition is ensured without requiring reloading existing data in the relational database.

68 Claims, 31 Drawing Sheets

OTHER PUBLICATIONS

"Implementing Catalog Clearinghouse with XML and XSL"—Andrew V. Royappa—1998 ACM (pps 616623).*

Dongwon Lee, Wesley W. Chu, Constraints-Preserving Transformation from XML Document Type Definition to Relational Schema, Proc. Of ER2000, Salt Lake City, UT, 10/9-12,00, pp. 323-338, (1-22), http://dblp.uni-trier.de/db/conf/er/er2000.html.

Gerti Kappel, Elisabeth Kapsammer, S. Rausch-Schott, Werner Retschitzegger: X-Ray—Towards Integrating XML and Relational Database Systems, Proc. Of ER2000, Salt Lake City, UT, Oct. 9-12, 2000, pp. 339-353, http://dblp.uni-trier.de/db/conf/er/er2000.html (15 pages).

Tim Bray, Jean Paoli, C.M. Sperberg-McQueen, and Eve Maler, Extensible Markup, Language (XML) 1.0 (Second Edition) W3C Recommendation Oct. 6, 2000, http://www.w3.org/TR/2000/REC-xml-20001006, (41 pages).

Alin Deutsch, Mary F. Fernandez, and Dan Suciu, Storing Semistructured Data with Stored, SIGMOD 1999, Proc. ACM SIGMOD Intl. Conf. On Management of Data, Jun. 1-3, 1999, pp. 431-442 (12 pages).

G.E. Blake, M.P. Consens, P. Kilpelinen, P.-A. Larson, T. Snider, and F.W. Tompa, Text/Relational Database Management Systems: Harmonizing sql and sgml., Proc. Applications of Databases (ADB-94), Jun. 21-23, 1994, pp. 267-280 (14 pages).

J. Shanmugasundaram, G. He, K. Tufte, C. Zhang, D. DeWitt, and J. Naughton, Relational Databases for Querying XML Documents: Limitations and Opportunities, Proc. Of 25$^{th}$ Intl. Conf. On Very Large Data Bases (VLDB'99), Sep. 1999, pp. 302-314 (13 Pages).

J. Widom, Data Management for XML—Research Directions, IEEE Data Engineering Bulletin, Special Issue on XML, 22(3), 1999, pp. 1-10.

Alin Deutsch, Mary Fernandez, Daniela Florescu, Alon Levy, and Dan Suciu, A Query Language for XML, Proc. Of the Eighth Intl. World Wide Web Conf. (WWW-8), 1999.

Richard Hackathorn, WebFarming Newsletter—Aug. 1999, http://webfarming.com/new/NL199908a.html (2 pages).

Daniela Floresu and Donald Kossmann, Storing and Querying XML Data Using an rdbms, Bulletin of the Technical Committee on Data Engineering, Sep. 1999, pp. 27-34, (1-8).

Giansalvatore Mecca, Paolo Merialdo, and Paolo Atzeni, Araneus in the Era of XML, Bulletin of the Technical Committee on Data Engineering, Sep. 1999, pp. 19-26, (1-8).

Oracle Technologies Network, Using XML in Oracle Database Applications, http://technet.oracle.com/tech/xml/info/htdocs/otnwp/about_oracle_xml_products.htm, Nov. 1999 (25 pages).

Oracle, Oracle XML sql utility for java, http://technet.oracle.com/tech/xml/oracle_xsu/, 1999 (58 pages).

J. McHugh, S. Abiteboul, R. Goldman, D. Quass, and J. Widom, Lore: A Database Management System for Semistructured Data, SIGMOD Record, 26(3), Sep. 1997, pp. 54-66 (13 pages).

Ronald Bourrett, XML and Databases, http://www.informatik.ty-darmstadt.de/DVSI/staff/bourret/xml/XMLAndDatabases.htm, Sep. 1999 (15 pages).

* cited by examiner

SYSTEM AND METHOD FOR SYNCHRONIZING AND/OR UPDATING AN EXISTING RELATIONAL DATABASE WITH SUPPLEMENTAL XML DATA

RELATED APPLICATIONS

This application is a continuation-in-part application of U.S. patent application Ser. No. 09/783,657, filed Feb. 14, 2001 which, in turn, claims the benefit of U.S. Provisional claims priority of U.S. Provisional Application No. 60/182,939 entitled "METHOD AND APPARATUS FOR AUTOMATIC LOADING OF XML DOCUMENTS INTO RELATIONAL DATABASES," filed Feb. 16, 2000.

BACKGROUND OF THE INVENTION

1. Field of the Invention

The invention relates to a relational database management system (RDBMS) and an XML conversion utility for the same. More specifically, the invention relates to a system and method for receiving XML-based data and updating a set of relational database tables only with data that has changed and verifying that the updates have performed successfully.

2. Description of the Related Art

Touted as the ASCII of the future, eXtensible Markup Language (XML) is used to define markups for information modeling and exchange in many industries. By enabling automatic data flow between businesses, XML is contributing to efforts that are pushing the world into the electronic commerce (e-commerce) era. It is envisioned that collection, analysis, and management of XML data will be tremendously important tasks for the era of e-commerce. XML data, i.e., data surrounded by an initiating tag (e.g., <tag>) and a terminating tag (e.g., </tag>) can be validated by a document-type definition (DTD) as will be hereinafter described. As can be seen, boldface text is used to describe XML and DTD contents as well as names for table and document tags and fields.

Some background on XML and DTDs may be helpful in understanding the difficulties present in importing XML data into a relational database. XML is currently used both for defining document markups (and, thus, information modeling) and for data exchange. XML documents are composed of character data and nested tags used to document semantics of the embedded text. Tags can be used freely in an XML document (as long as their use conforms to the XML specification) or can be used in accordance with document-type definitions (DTDs) for which an XML document declares itself in conformance. An XML document that conforms to a DTD is referred to as a valid XML document.

A DTD is used to define allowable structures of elements (i.e., it defines allowable tags, tag structure) in a valid XML document. A DTD can basically include four kinds of declarations: element types, attribute lists, notations, and entity declarations.

An element type declaration is analogous to a data type definition; it names an element and defines the allowable content and structure. An element may contain only other elements (referred to as element content) or may contain any mix of other elements and text, one such mixed content is represented as PCDATA. An EMPTY element type declaration is used to name an element type without content (it can be used, for example, to define a placeholder for attributes). Finally, an element type can be declared with content ANY meaning the type (content and structure) of the element is arbitrary.

Attribute-list declarations define attributes of an element type. The declaration includes attribute names, default values and types, such as CDATA, NOTATION, and ENUMERATION. Two special types of attributes, ID and IDREF, are used to define references between elements. An ID attribute is used to uniquely identify the element; an IDREF attribute can be used to reference that element (it should be noted that an IDREFS attribute can reference multiple elements). ENTITY declarations facilitate flexible organization of XML documents by breaking the documents into multiple storage units. A NOTATION declaration identifies non-XML content in XML documents. It is assumed herein that one skilled in the art of XML documents that include a DTD is familiar with the above terminology.

Element and attribute declarations define the structure of compliant XML documents and the relationships among the embedded XML data items. ENTITY declarations, on the other hand, are used for physical organization of a DTD or XML document (similar to macros and inclusions in many programming languages and word processing documents). For purposes of the present invention, it has been assumed that entity declarations can be substituted or expanded to give an equivalent DTD with only element type and attribute-list declarations, since they do not provide information pertinent to modeling of the data (this can be referred to as a logical DTD). In the discussion that follows, DTD is used to refer to a logical DTD. The logical DTD in Example 1 below (for books, articles and authors) is used throughout for illustration.

EXAMPLE 1

DTD for Books, Articles, and Authors

<!ELEMENT book (booktitle, (author*|editor))>
<!ELEMENT booktitle (#PCDATA)>
<!ELEMENT article (title, (author, affiliation?)+, contactauthors?)>
<!ELEMENT title (#PCDATA)>
<!ELEMENT contactauthors EMPTY>
<!ATTLIST contactauthors authorIDs IDREFS #REQUIRED>
<!ELEMENT monograph (title, author, editor)>
<!ELEMENT editor (book|monograph)*>
<!ATTLIST editor name CDATA #IMPLIED>
<!ELEMENT author (name)>
<!ATTLIST author id ID #REQUIRED>
<!ELEMENT name (firstname?, lastname)>
<!ELEMENT firstname (#PCDATA)>
<!ELEMENT lastname (#PCDATA)>
<!ELEMENT affiliation ANY>

The task of developing a relational schema for XML documents requires understanding the components of, and relationships within, such documents. A DTD defines a structure for XML documents that can be seen as an ordered graph composed of element type declarations. A DTD has the following properties (also referred to herein as data and/or content particles):

Grouping: Within an element type definition, elements that are associated within parentheses participate in a grouping relationship, and are defined as a group. This relationship can be further classified as sequence grouping (wherein the elements are separated by a comma ',') or choice grouping (wherein the elements are separated by a vertical bar '|') according to the operator used as a delimiter in the grouping.

Nesting: An element type definition provides the mechanism for modeling relationships that can be represented structurally as a hierarchy of elements. These relationships are referred to as a nesting relationship (a structural view can be chosen to avoid having to choose particular semantics for all such relationships).

Schema Ordering: The logical ordering among element types specified in a DTD. For example, line one of the DTD in Example 1 specifies that in a book, a booktitle precedes a list of authors (or an editor).

Existence: In a DTD, an element type with no content declares the existence of an element with no structure or value for that element type. This kind of virtual element is declared so that attributes can be defined for unique properties of the element or for element referencing relationships.

Occurrence: Occurrence indicators (i.e., "?", "*", and "+") indicate optional occurrence or repetition of a content particle in an element definition. For example, in Example 1, the grouping (book|monograph) can appear zero or more times in an editor element which is indicated by the "*" following this grouping in line eight of the DTD in Example 1.

Element Referencing: Elements reference one another using attributes of type ID and IDREF(s). For example, in Example 1, contactauthors has an element reference relationship with author.

These properties and relationships illustrate that a DTD not only defines element types for conforming XML documents, but also provides valuable information about the structure of an XML document and relationships between its elements. Besides that, while the DTD specifies a schema ordering between element types thereof, XML documents also have a physical ordering, or data ordering, of data elements. The challenges of mapping a DTD to a relational database model arise from a mismatch between (1) types of properties and relationships embedded in DTDs and (2) those modeled by relational database models.

Turning to the task of loading XML data (as validated by a DTD) into a relational database, the prior art in database systems must be considered. Database systems are traditional, well-known tools for managing data. After many years of development, database technology has matured and contributed significantly to the rapid growth of business and industry. Relational database systems are a proven technology for managing business data and are used everywhere by various sizes of companies for their critical business tasks. Commercial relational database products embody years of research and development in modeling, storage, retrieval, update, indexing, transaction processing, and concurrency control, and continue to add capabilities to address new kinds of data, such as multimedia.

With more and more data flowing in XML formats, there have been attempts to extend prior art relational database systems to accommodate XML data. Such an approach has avoided re-inventing database technology to suit XML data but, more importantly, takes best advantage of the power of relational database technology and the wealth of experience in optimizing and using the technology.

There have been several problems to overcome in bringing XML data into a relational database for management, including defining a relational schema for the XML data, loading the XML data into a relational database, and transforming XML queries (whether formulated in extensible stylesheet language [XSL], XML Query Language [XML-QL] or other XML query standards) into meaningful structured query language [SQL] queries.

Prior attempts to solve these problems have fallen short of an efficient and, preferably automatic, way to import XML data into a relational database schema. Current industry enterprise database management system (DBMS) vendors, such as DB2 and Oracle 8i, provide XML extensions for bringing XML data into a relational database. However, these methods are far from automatic. These vendors require users to manually design the relational schema for a given DTD and to define the mapping between the DTD and the user-designed schema for the loading of XML documents. While this manual approach can be straightforward, and these vendors provide tools to assist the user, users must be very familiar with the XML data, the DTD therefor and the particular database system used.

In addition, the prior art approach only works well for generating a relatively simple relational schema, and is not effective or efficient when the data contains complex relationships between tables. It is most appropriate for a small number of short or familiar DTDs. The known approach also requires experts on both XML and relational techniques. For more complex DTDs and a more robust relational schema, the manual approach becomes more difficult and requires specialized expertise. The common existence of non-straightforward relational database schema cases requires a more advanced approach to generating the relational schema and defining the load mapping definition.

Other attempts to conceive a method that automatically loads XML data into a relational database have also proven to be of limited success. In accordance with these failed attempts, the user is required to either mine XML documents or to simplify the DTD. In either case, semantics captured by the DTD or XML documents are lost, e.g., how elements may be grouped within the data or as defined by the DTD, and how to distinguish between DTD specific symbols, such as * and +, etc.

Other prior art attempts to load XML data into a relational database schema include one method by which a large amount of data is placed into relational databases by creating a relational data schema and applying data mining over a large number of the same type of XML documents, and then abstracting a relational data schema out of them. Then, the data is loaded into the relational tables. For parts that cannot fit into the relational table schema, an overflow graph is generated.

Others have done benchmark testing on a relational schema generated out of XML data by four variations of a basic mapping approach—but this work does not consider or does not require a DTD.

However, one known form of benchmark testing that does consider a DTD was performed by Shanmugasundaram et. al. who investigated schema conversion techniques for mapping a DTD to a relational schema by giving (and comparing) three alternative methods based on traversal of a DTD tree and creation of element trees. This process simplified the DTDs and then mapped those into a relational schema. While this approach also works with simple XML data structures, portions of the structure, properties and embedded relationships among elements in XML documents are often lost.

Instead of bringing the semi-structured data into the relational model, there are other approaches to bring the XML data into semi-structured, object-oriented, or object-relational database management systems (DBMS). Some commercial relational DBMSs, e.g., IBM's DB2 and Oracle, have begun to incorporate XML techniques into their databases, e.g., IBM Alphaworks visual XML tools, IBM DB2 XML Extender, and Oracle 8i.

Recently IBM's Alphaworks proposed a new set of visual XML tools that can visually create and view DTDs and XML documents. In its tools, IBM has proposed the idea of breaking DTDs into elements, notations, and entities that use components grouped with properties sequential, choice, attribute, and relationship and with repetition properties to construct DTDs. Tools to do XML translation and XML generation from SQL queries are provided. However, a method by which to load the XML data into relational tables was not addressed in this prior art.

The DB2 XML Extender can store, compose and search XML documents. Document storing is accomplished in two ways. First, the XML document is stored as a whole for indexing, referred to as way of storing the XML document as an XML column. Second, pieces of XML data are stored into table(s), referred to as XML collections.

Oracle 8i is an XML-enabled database server that can do XML document reading and writing in the document's native format. An XML document is stored as data and distributed across nested-relational tables. This XML SQL utility provides a method to load the XML documents in a canonical form into a preexisting schema that users manually (and previously) designed.

Other problems have arisen with the prior art regarding propagation of updates to an XML database and/or a relational database. In many cases, the relational database has been required to be completely rebuilt from all of the previous updates or, alternatively, a single update to the data requires the relational database to be rebuilt. Much of the prior efforts focused on the implementation issues of using database triggers and assignment of identifications for each element, as well as other sets of updates using XQuery. These prior attempts have been unable to solve several issues. First, these previous attempts at XML updates can include XML data changes that could violate constraints inherent in or defined in the DTD. Second, the issue of how such violations would be addressed in the relational correspondence with the RDBMS have not been perfected. Third, the previous attempts at implementation of XML updates does not support the order properties in the DTD. Fourth, the previous attempts at updates cannot move an element into different places in the XML database.

SUMMARY OF THE INVENTION

Mapping and Loading Overview

According to the invention, a relational schema definition is examined for XML data, a relational schema is created out of a DTD, and XML data is loaded into the generated relational schema that adheres to the DTD. In this manner, the data semantics implied by the XML are maintained so that more accurate and efficient management of the data can be performed.

Starting with a DTD for an XML document containing data (rather than analyzing the relationships between the actual elements of the XML data), all of the information in the DTD is captured into metadata tables, and then the metadata tables are queried to generate the relational schema. Then, the data contained in the XML document can be loaded into the generated relational schema. This method can be described by three broad steps:

First, the DTD is stored as metadata (i.e., a transformation and/or recasting of the data contained in the DTD) in tables—i.e., the metadata is used to describe the information of the DTD associated with the XML documents. This approach provides flexibility to manipulate the DTD by standard SQL queries.

Second, a relational schema is generated from the metadata stored in the metadata tables. This step provides additional flexibility in that, although the relational schema can be directly mapped from the metadata tables according to the invention, the metadata tables can also be queried to do optimizing or restructuring on the metadata tables representative of the XML data structure stored in the DTD.

Third, data contained in the XML document is loaded into the tables as defined by the relational schema (which is generated in the previous step), by using the associated metadata tables.

According to the invention, the inventive metadata-driven approach includes the following beneficial characteristics:

For Storing: All of the information contained in the DTD is captured in the metadata tables. It is anticipated that the XML document and the DTD can be reconstructed from the relational data and metadata as needed.

For Mapping: The generated relational schema is rich in relationships that are useful in processing queries.

For Loading: Mappings between the XML document and the final relational schema are captured in the metadata tables. It is contemplated that the relational data can be synchronized with XML data, which means whenever there is a data update in the relational data, the effect is also reflected in the XML data, and vice versa.

Metadata Extraction and Storage

In one aspect, the invention relates to a method for generating a schema for a relational database corresponding to a document having a document-type definition and data complying with the document-type definition. The document-type definition has content particles representative of the structure of the document data including one or more of the following content particles: elements, attributes of elements, nesting relationships between elements, grouping relationships between elements, schema ordering indicators, existence indicators, occurrence indicators and element ID referencing indicators. The method also contemplates loading the data into the relational database in a manner consistent with the relational schema.

The method comprises the steps of: extracting metadata from the document-type definition representative of the document-type definition; generating the schema for the relational database from the metadata, wherein at least one table is thereby defined in the relational database corresponding to at least one content particle of the document-type definition via the metadata, and at least one column is defined in each of the at least one table corresponding to another of at least one content particle of the document-type definition; and loading the document data into the at least one table of the relational database according to the relational schema.

Metadata Extraction

The extracting step of the inventive method can further comprise the steps of: generating an item metadata table corresponding to element type content particles in the document-type definition; creating at least one default item in the item metadata table; generating a row in the item metadata table corresponding to each of the element type content particles of the document-type definition; generating an attribute metadata table corresponding to attribute type content particles in the document-type definition; creating a default attribute value in the attribute metadata table corresponding to any default items in the item metadata table;

generating a row in the attribute metadata table corresponding to each of the attribute type content particles of each element type stored in the item metadata table; generating a nesting metadata table corresponding to nesting relationship content particles in the document-type definition; and generating a row in the nesting metadata table corresponding to each relationship between items identified in the item metadata table.

In some embodiments of the invention, the generated nesting table row can indicate the cardinality between a pair of items. The cardinality can be one of one-to-one and one-to-many. The generated nesting table row can indicate a relationship between a parent item and a child item. The generated nesting table row can indicate the position of the child item in a definition of the parent item.

Metadata Table Schema Generation

In other embodiments of the invention, the generating step can further comprise the steps of: creating a table in the schema of the relational database corresponding to each row of the metadata item table; generating at least one default field in the table of the schema; altering the schema of the relational database to add a column to each table in the schema corresponding to each row of the metadata attribute table related to the particular metadata item table row; altering the tables in the schema of the relational database to add links between tables in the schema corresponding to a relationship identified in each row of the metadata nesting table; altering the tables in the schema of the relational database by adding a foreign key to a parent table if the identified relationship is a one-to-one relationship; and altering the tables in the schema of the relational database by adding a foreign key to a child table if the identified relationship is a one-to-many relationship.

Metadata Loading

In additional embodiments of this invention, the loading step can further comprise the steps of: initializing a link table; determining whether each item in the metadata nesting table contains a group type; initializing a pattern-mapping table; directly mapping a link into the link table for each item in the metadata nesting table that does not contain a group type; creating an additional link table containing a mapping of a link pattern for each group type identified in the metadata item table; retrieving a preselected set of rows corresponding to each item in the metadata item table; mapping a create tuple loading action in the pattern mapping table corresponding to each item in the item metadata table; mapping an update tuple loading action in the pattern mapping table corresponding to each attribute in the attribute metadata table; mapping a create tuple loading action in the pattern mapping table corresponding to each group in a link; mapping an assign action tuple loading action in the pattern mapping table corresponding to each pair in the same link corresponding to each link in the link pattern table; and forming a tree structure with the document data; and traversing the formed tree and updating the at least one relational database table according to the rows of the pattern mapping table.

Metadata Table Clean Up and Optimization

In yet further embodiments of this invention, the method can also comprise the step of optimizing the metadata. This optimizing step can further comprise the steps of: eliminating duplicate particle references in the metadata; and simplifying references to corresponding elements, links and attributes in the metadata.

Implementation of Metadata Extraction and Storage

In other aspects of the invention, a system is provided for generating a schema for a relational database corresponding to a document having a document-type definition and data complying with the document-type definition and loading the data into the relational database in a manner consistent with the relational schema.

The key inventive features of the system include an extractor adapted to read a document-type definition that extracts metadata from the document-type definition representative of the document-type definition; a generator operably interconnected to the extractor for generating the schema for the relational database from the metadata, wherein at least one table is thereby defined in the relational database corresponding to at least one content particle of the document-type definition via the metadata, and at least one column is defined in each of the tables corresponding to another content particle of the document-type definition; and a loader operably interconnected to the generator for loading the document data into the table(s) of the relational database according to the relational schema.

Extractor Implementation

In various embodiments of the extractor for the system, the extractor can generate an item metadata table corresponding to element type content particles in the document-type definition. The extractor can create at least one default item in the item metadata table. The extractor can generate a row in the item metadata table corresponding to each of the element type content particles of the document-type definition. The extractor can generate an attribute metadata table corresponding to attribute type content particles in the document-type definition. The extractor can generate a row in the attribute metadata table corresponding to each of the attribute type content particles of each element type stored in the item metadata table. The extractor can generate a nesting metadata table corresponding to nesting relationship content particles in the document-type definition. The extractor can generate a row in the nesting metadata table corresponding to each relationship between items identified in the item metadata table.

Generator Implementation

In various embodiments of the generator for the system described herein, the generator can create a table in the schema of the relational database corresponding to each row of the metadata item table. The generator can alter the schema of the relational database to add a column to each table in the schema corresponding to each row of the metadata attribute table related to the particular metadata item table row. The generator can alter the tables in the schema of the relational database to add links between tables in the schema corresponding to a relationship identified in each row of the metadata nesting table. The generator can alter the tables in the schema of the relational database by adding a foreign key to a parent table if a relationship identified between a pair of tables is a one-to-one relationship. The generator can alter the tables in the schema of the relational database by adding a foreign key to a child table if a relationship identified between a pair of tables is a one-to-many relationship.

Loader Implementation

In various aspects of the loader of this system, the loader can initialize a link table and/or a pattern-mapping table. The loader can determine whether each item in the metadata nesting table contains a group type content particle. The loader can directly map a link into the link table for each item in the metadata nesting table that does not contain a group type. The loader can create an additional link table containing a mapping of a link pattern for each group type identified in the metadata item table. The loader can retrieve a preselected set of rows corresponding to each item in the metadata item table. The loader can map a create tuple loading action in the pattern mapping table corresponding to each item in the item metadata table. The loader can map an update tuple loading action in the pattern mapping table corresponding to each attribute in the attribute metadata table. The loader can map a create tuple loading action in the pattern mapping table corresponding to each group in a link; and map an assign action tuple loading action in the pattern mapping table corresponding to each pair in the same link corresponding to each link in the link pattern table. The loader can form a tree structure with the document data. The loader can traverse the formed tree and update the relational database table(s) according to the rows of the pattern mapping table.

Optimizer Implementation

In other embodiments of the system, the system can also be provided with an optimizer for refining the metadata. The optimizer can eliminate duplicate particle references in the metadata. The optimizer can simplify references to corresponding elements, links and attributes in the metadata.

Terms

In other embodiments of the invention, the document can be an XML document. The document-type definition can be a DTD. The data can be tagged data.

Updating XML Storage in a Relational Database

In a further aspect, the invention relates to a method for synchronizing and updating a relational database containing existing data with supplemental data, the relational database having a set of tables defined by a relational schema, the supplemental data comprising formatted data having a document type definition representative of the relational schema and represented in a document object, the method comprising the steps of receiving at least one proposed data update representative of the supplemental data from a source external to the relational database; and propagating the received at least one proposed data update into the relational database in a manner which ensures compliance with both the relational database relational schema and the document type definition without requiring reloading the existing data in the relational database.

Update Primitives

In various embodiments, the invention relates to providing at least one update primitive for accomplishing the step of propagating the received at least one proposed data update. The formatted data can be tagged-format data. The method can also further comprise the step of selectively calling the at least one update primitive and validating an output of the at least one update primitive against the document type definition. The at least one update primitive can further comprise at least one of a create root element primitive, a modify element primitive, a delete leaf element primitive and a move element primitive. The create root element primitive can create a new unattached root element in the document object representative of the at least one proposed data update. The modify element primitive can modify a specified attribute of an identified element of the document object representative of the at least one proposed data update. The delete leaf element primitive can remove an identified element of the document object representative of the at least one proposed data update. The move element primitive can change the document object location of an identified element of the document object representative of the at least one proposed data update.

In various other embodiments, the method can also further comprise the step of calling both the create element primitive and the move element primitive to create a new element in the document object and to attach the newly-created element within the document object at a desired location within the document object when the at least one proposed data update calls for the creation of a new element. A location of a particular element in the document object can be identified by a path. The path can be formed in an XPath syntax. The method can also further comprise the step of converting an object identifier of a particular document object into a path. The method can also further comprise the step of traversing the document object in a child-to-parent direction to build the path. The path can comprise at least one node indicator comprising a label value and a position value corresponding to the document object. Successive node indicators can be separated by a preselected delimiter. The position value can correspond to a lateral sibling location in the document object. The label value can be selected based upon a node type of a predetermined node.

Updating XML Relational Database System

In another aspect, the invention relates to a system for synchronizing and updating a relational database containing existing data with supplemental data, the relational database having a set of tables defined by a relational schema, the supplemental data comprising formatted data having a document type definition representative of the relational schema and represented in a document object. A translator is provided for receiving at least one proposed data update representative of the supplemental data from a source external to the relational database and an execution device is operably connected to the translator for propagating the received at least one proposed data update into the relational database in a manner which ensures compliance with both the relational database relational schema and the document type definition without requiring reloading the existing data in the relational database.

Validation/Attribute Constraints

In further embodiments of the invention, the method can also further comprise the step of validating the at least one proposed data update to ensure the at least one proposed data update is compliant with the document type definition. The method can also further comprise the step of determining whether at least one of a type constraint and an attribute constraint remain valid when at least one of a new value of a document object attribute value is set and a new document object is created. The method can also further comprise the step of determining whether a cross-reference index is unique within the document object during the step of validating the at least one proposed data update. The method can also further comprise the step of determining whether a default value is required during the creation of a new element in accordance with the at least one proposed data update during the step of validating the at least one proposed data update.

Quantifier Constraint

The method can also further comprise the step of determining whether an enumerated value is required by the at least one proposed data update and determining whether a proposed value therefore is contained in a specified enumeration during the step of validating the at least one proposed data update. The method can also further comprise the step of checking a nesting relationship between a former and a new location of an element when an element is moved in accordance with the at least one proposed data update during the step of validating the at least one proposed data update. The method can also further comprise the step of determining a quantitative relationship between the at least one proposed data update and the relational database and determining whether the at least one proposed data update complies with such quantitative relationship as determined by the document type definition. The method can also further comprise the step of checking a quantifier constraint of a nesting relationship between elements implicated by the at least one proposed data update and determining whether the at least one proposed data update violates that quantifier constraint. The method can also further comprise the step of preventing the propagation step from occurring if the at least one proposed data update fails the validation step.

In another aspect, the invention relates to a method for both generating a relational schema for a relational database corresponding to a document having a document-type definition and data complying with the document-type definition, the document-type definition having content particles representative of the structure of the data and loading the data into the relational database in a manner consistent with the relational schema, the method comprising the steps of: extracting metadata representative of the document-type definition from the document-type definition; generating the relational schema from the metadata, thereby defining via the metadata at least one table in the relational database corresponding to at least one of the content particles of the document-type definition; and loading the data into the at least one table according to the relational schema and in a manner driven by the metadata.

In other aspects, the invention relates to a system for both generating a relational schema for a relational database corresponding to a document having a document-type definition and data complying with the document-type definition, the document-type definition having content particles representative of the structure of the data and loading the data into the relational database in a manner consistent with the relational schema. An extractor is provided for creating metadata representative of the document-type definition from the document-type definition. A generator is provided for forming the relational schema from the metadata, thereby defining via the metadata at least one table in the relational database corresponding to at least one of the content particles of the document-type definition. A loader is provided for loading the data into the at least one table according to the relational schema and in a manner driven by the metadata.

In various embodiments, the invention also relates to the step of loading data from the document into the relational schema of the relational database. The method can also further comprise the step of updating the relational database with at least one proposed update from a second document containing related data without requiring the reloading of the data already in the relational database. The method can also further comprise the step of validating the at least one proposed update with respect to the document-type definition. The method can also further comprise the step of preventing the at least one proposed update from being loaded into the relational database if the validating step fails. The method can also further comprise the step of validating the at least one proposed update further comprises the step of comparing at least one of a data type constraint, an attribute constraint, a link reference constraint, a nesting relationship constraint and a quantifier constraint of the at least one proposed update against that required by the document-type definition prior to the step of loading the data from the at least one proposed update into the relational database.

Other objects, features, and advantages of the invention will be apparent from the ensuing description in conjunction with the accompanying drawings.

DESCRIPTION OF THE PREFERRED EMBODIMENT

According to the invention, a relational schema is created out of a DTD, metadata is extracted from the DTD that describes the DTD and that illustrates how the DTD maps to the schema, and XML data is loaded into the generated relational schema that adheres to the DTD according to the metadata. In this manner, and as a direct result of the metadata analysis and storage, the data semantics implied by the XML are maintained so that more accurate and efficient management of the data can be performed.

Starting with a DTD for XML documents containing data (rather than analyzing the relationships between the actual elements of the XML data), all of the information in the DTD is captured into metadata tables, and then the metadata tables are queried to generate the relational schema. Then, the data contained in the XML document can be loaded into the generated relational schema. This method can be described by three broad steps:

First, the DTD is stored as metadata in tables—i.e., the metadata is used to describe the information of the DTD associated with the XML documents. This approach provides flexibility to manipulate the DTD by standard SQL queries.

Second, a relational schema is generated from the metadata stored in the metadata tables. This step provides additional flexibility in that, although the relational schema can be directly mapped from the metadata tables according to the invention, the metadata tables can also be queried to do optimizing or restructuring on the metadata tables representative of the XML data structure stored in the DTD.

Third, the data contained in the XML document is extracted from the document and stored into the tables defined by the relational schema, which is generated in the previous step, by using the associated metadata tables.

According to the invention, the inventive metadata-driven approach includes the following beneficial characteristics:

For Storing: All of the information contained in the DTD is captured in the metadata tables. It is anticipated that the XML document and the DTD can be reconstructed from the relational data and metadata as needed.

For Mapping: The generated relational schema is rich in relationships that are useful in processing queries.

For Loading: Mappings between the XML document and the final relational schema are captured in the metadata tables. It is contemplated that the relational data can be synchronized with XML data, which means whenever there is a data update in the relational data, the effect is also reflected in the XML data, and vice versa.

It will be understood that it has been assumed that there exists only one external DTD file for compliant XML documents and that the file has no nested DTDs, and that there is no internal DTD in the XML files. Of course, to the extent that XML documents are encountered that include these items, this requirement can be achieved by pre-processing XML documents with nested or internal DTDs as needed.

FIG. 1

Figure 1:
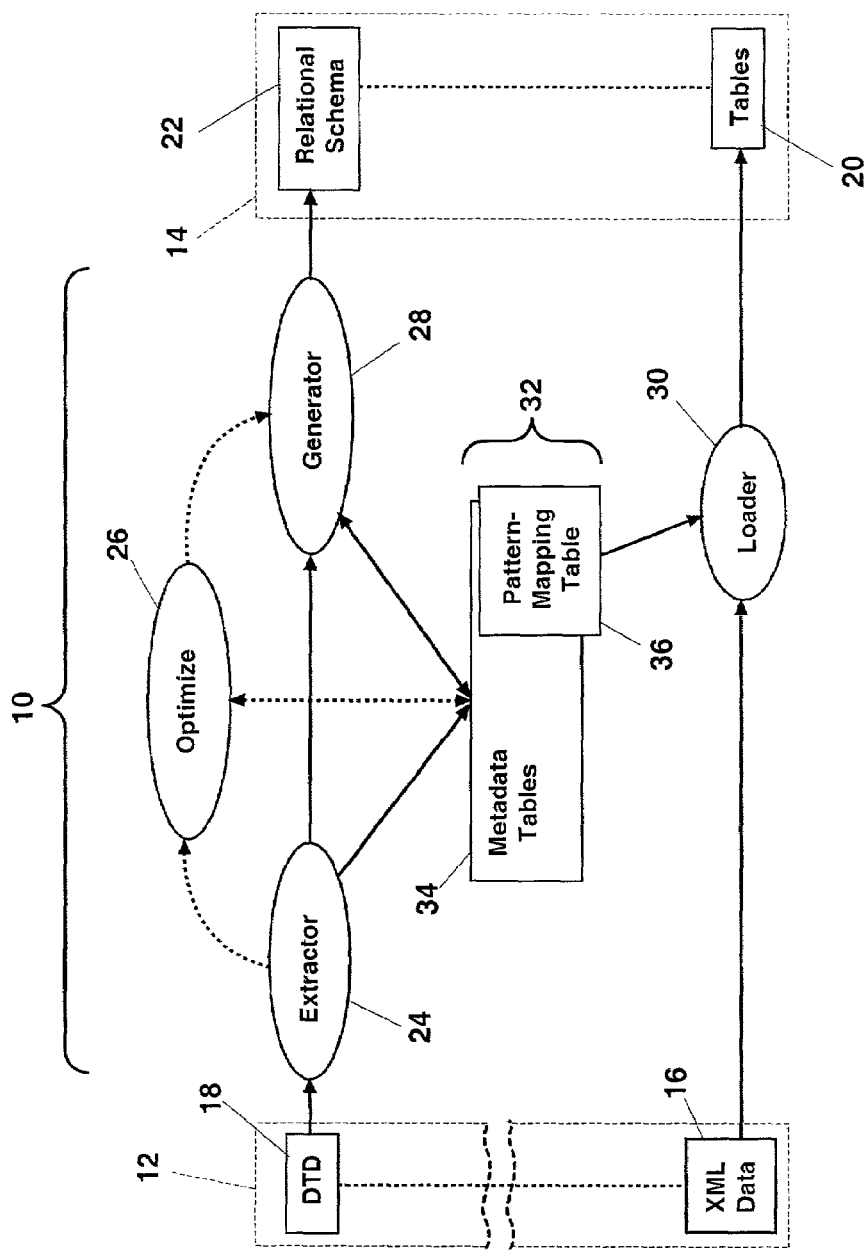
FIG. 1 is a schematic view detailing a system for generating a relational schema from a document type definition, forming a relational database from the relational schema and loading the contents of an extensible document into the relational database according to the relational schema.

Turning now to the drawings and to FIG. 1 in particular, a system 10 is shown for automatically loading a document 12 into a relational database 14. As can be clearly seen from FIG. 1, the document 12 comprises a first data portion 16 and a second document definition portion 18. It will be understood that the document 12 is preferably an XML document, the first data portion 16 is preferably a compliant set of tagged data normally found in a document formatted in the XML language, and the tags are compliant with the second document definition portion 18 that comprises a document-type definition (DTD) as is well known in the art (the document 12 is shown surrounded by a broken line in FIG. 1 indicating a possible separated of the DTD 18 and the data 16 since the DTD 18 can be provided separately from the XML data 16 as is also well known). As can also be clearly seen from FIG. 1, the relational database 14 comprises a first data storage portion 20 and a second data definition portion 22. It will be understood that the relational database 14 can be any of the well-known relational databases. The first data storage portion 20 is typically, and preferably, a set of tables in the relational database 14. The second data definition portion 22 preferably comprises a relational schema as is typically used to model, outline or diagram the interrelationship between tables in a relational database.

It is an important feature of this invention that the DTD 18 (i.e., the second document definition portion 18) is loaded by the system 10 and used in metadata format to generate the relational schema of the second data definition portion 22. Then, the XML data stored in the first data portion 16 of the XML document 12 is loaded by the system 10 into the tables making up the first data storage portion 20.

In order to accomplish these functions, the system 10 comprises an extractor 24, an optimizer 26, a generator 28 and a loader 30 all of which are interconnected to a storage unit 32. As contemplated by this invention, the storage unit 32 comprises at least a metadata table storage portion 34 and a pattern mapping table storage portion 36.

According to the method of this invention, which will be hereinafter described in greater detail, the system 10 reads the DTD 18 with the extractor 24 and stores data representative of the DTD 18 in metadata tables in the metadata tables storage portion 34. From the data stored in metadata tables, the generator 28 generates the relational schema 22 in the relational database 14. In an optional loop, the optimizer 26 can massage the data stored in the metadata tables 34 to create a more efficient set of inputs for the generator 28 which, in turn, results in the generation of a more efficient relational schema 22.

Next, once the relational schema 22 has been generated by the generator 28, a pattern-mapping table 36 is generated from the metadata tables and fed as an input to the loader 30 (in addition to the input of the XML data 16 from the document 12) which, in turn, provides an input to load the tables 20 and the relational database 14 with the XML data 16 stored in the document 12.

FIG. 1A

Figure 1A:
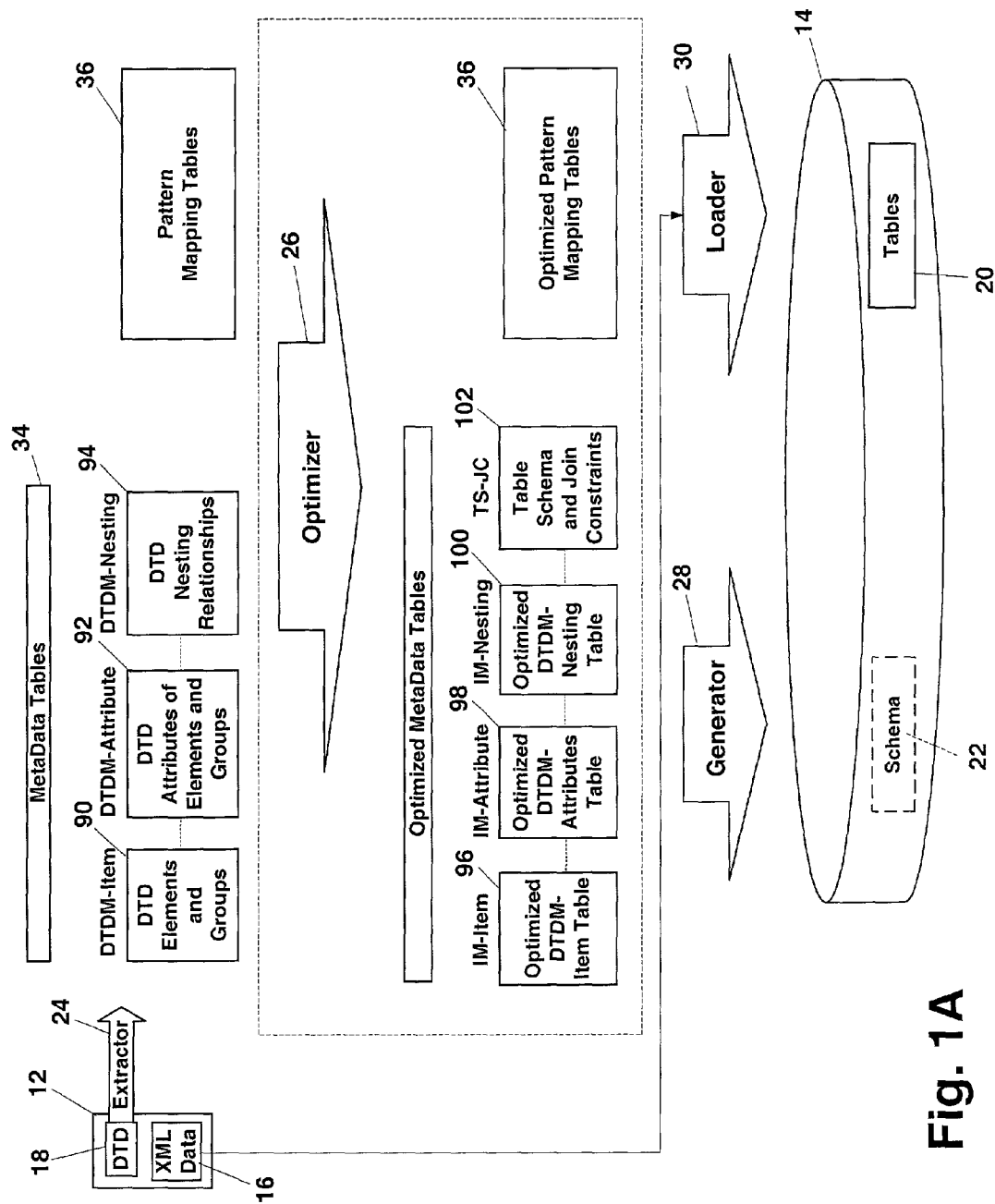
FIG. 1A is a diagrammatic representation of the system of FIG. 1 showing the extraction of a document-type definition from an extensible document, the generation of a relational schema therefrom and the loading of data contained in the extensible document into the relational database.

The automatic loading of an XML document 12 into a relational database 14 according to a document-type definition 18 contained in the XML document 12 is shown in greater detail in FIG. 1A. One feature of this invention is the importation of the information contained in the document-type definition 18 to the extractor 24 to create the metadata tables 34 (referred to herein as DTDM, short for document-type definition metadata). As can be seen from FIG. 1A, the metadata tables 34 comprise a DTDM-Item table 90 generally made up of elements and groups defined in the DTD 18, a DTDM-Attribute table 92 generally made up of Attribute of elements and groups contained in the DTD 18, and a DTDM-Nesting table 94 generally made up of nesting relationships contained in the DTD 18 as identified by the extractor 24.

The metadata tables 34 are then fed to the generator 28 and, optionally, the optimizer 26, to create the link pattern and pattern mapping tables 36. It should be understood that the optimizer 26 is entirely optional and can be omitted without departing from the scope of this invention. When used, the optimizer 26 provides the additional benefits discussed herein. The tables 36 comprise an IM-Item table 96 which contains mapping information relating to the DTDM-Item table 90, an IM-Attribute table 98 that contains mapping information relating to the DTDM-Attribute table 92, an IM-Nesting table 100 that contains mapping information relating to the DTDM-Nesting table 94, and a TS-JC table 102 for containing table schema and join constraint information for assisting in the generation of the table schema 22 for the relational database 14. It will be understood that the metadata tables 34 are preferably necessary for generation of the table schema 22. However, it has been found that the generation of the link pattern and pattern mapping tables 36 can result in the generation of a more efficient table schema 22 for the relational database 14. Then, either the metadata tables 34 or, if the optimizer 26 is employed, the pattern and pattern mapping tables 36 are fed to the loader 30 to create and fill the tables 20 and the relational database 14 according to the generated table schema 22 therein.

FIG. 1B

Figure 1B:
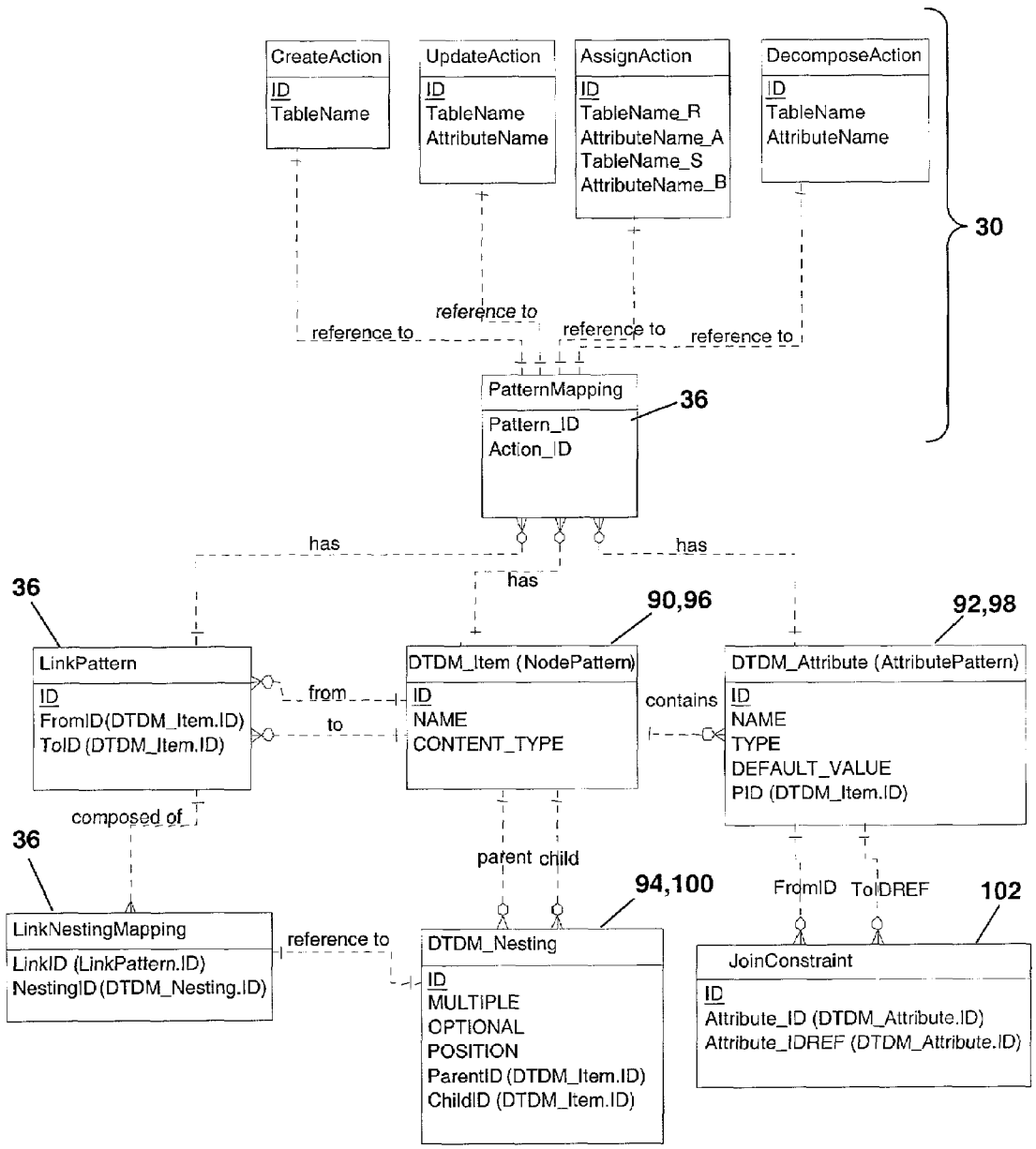
FIG. 1B is a schematic representation of interaction between tables created in the system and method shown in FIGS. 1 and 1A.

A schematic representation of the tabular interaction according to this invention is shown in FIG. 1B wherein the tables shown in FIG. 1B refer to the components of the invention shown in FIGS. 1 and 1A with like reference numerals. Dashed lines interconnecting the illustrated tables indicate a relationship between a field of one table with a field in the connected table.

Turning now to FIGS. 2–13, the method of automatically loading XML data into a relational database according to a relational schema defined by a document-type definition will now be described.

FIG. 2

Figure 2:
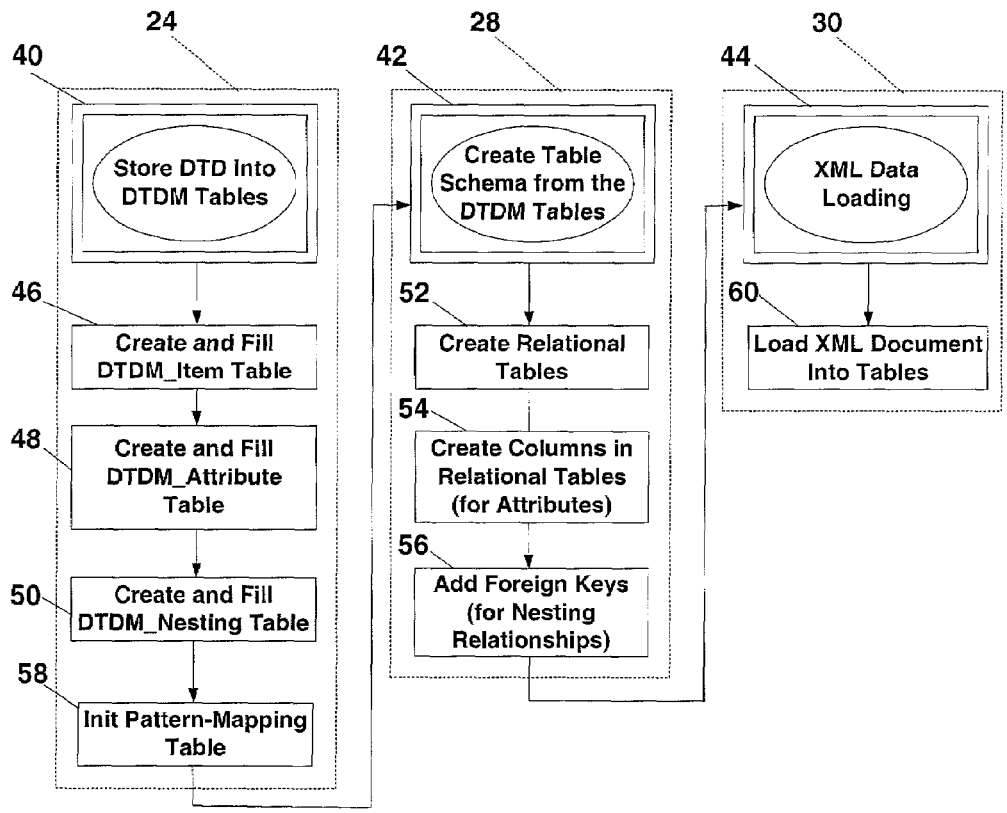
FIG. 2 is a flowchart detailing three broad method steps according to the invention schematically shown in FIGS. 1, 1A and 1B, namely, storing the document-type definition into metadata tables, creating a relational database table schema from the metadata of the metadata tables, and loading data contained in an extensible document into tables contained in the formed relational schema.

FIG. 2 describes broad method steps of the invention, shown mainly by the steps surrounded by a double-line frame, wherein step 40 indicates that data representative of the DTD 18 is stored (via the extractor 24) into the metadata tables storage portion as metadata representative of the DTD 18 which is referred to as the DTDM tables 34.

Step 42 indicates the second broad method step of this invention wherein the relational schema 22 is generated (via the generator 28) from the DTDM tables.

Step 44 indicates the final broad method step of this invention wherein the XML data 16 from the document 12 is loaded (via the loader 30) into the tables 20 of the relational database 14 according to the relational schema 22 generated in step 42.

FIG. 2 also describes more detailed method steps for each of the broad method steps 40, 42 and 44.

Figure 3:
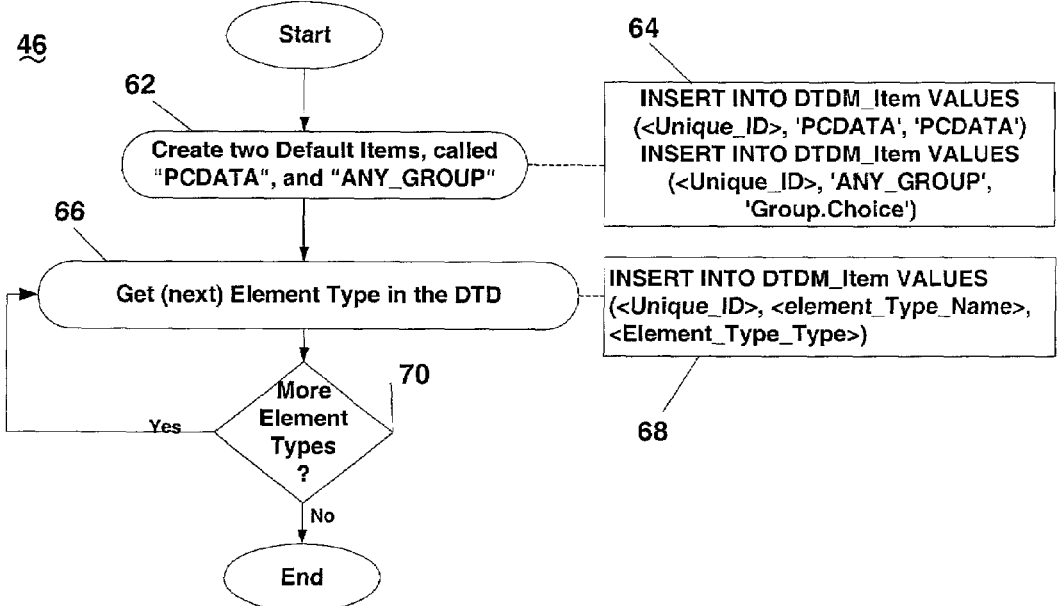
FIG. 3 is a flowchart detailing the step for storing the document-type definition into metadata tables shown in FIG. 2 in which a metadata item table is created and filled with element-types declared in the document-type definition.
Figure 4:
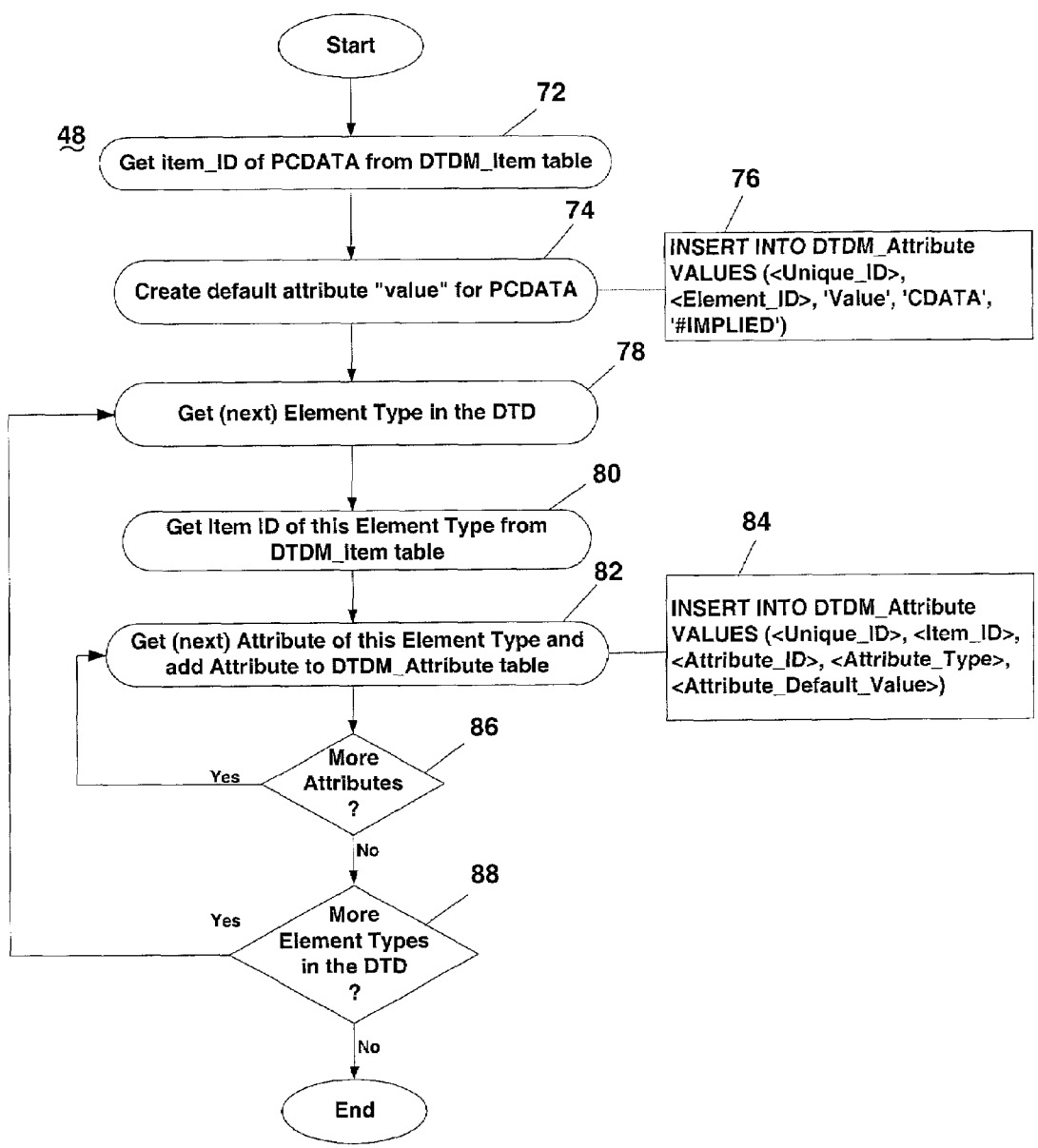
FIG. 4 is a flowchart detailing another step of the method shown in FIG. 2 of storing the document-type definition information into metadata tables in which a metadata attribute table is created and filled with attributes defined in the document-type definition.
Figure 5:
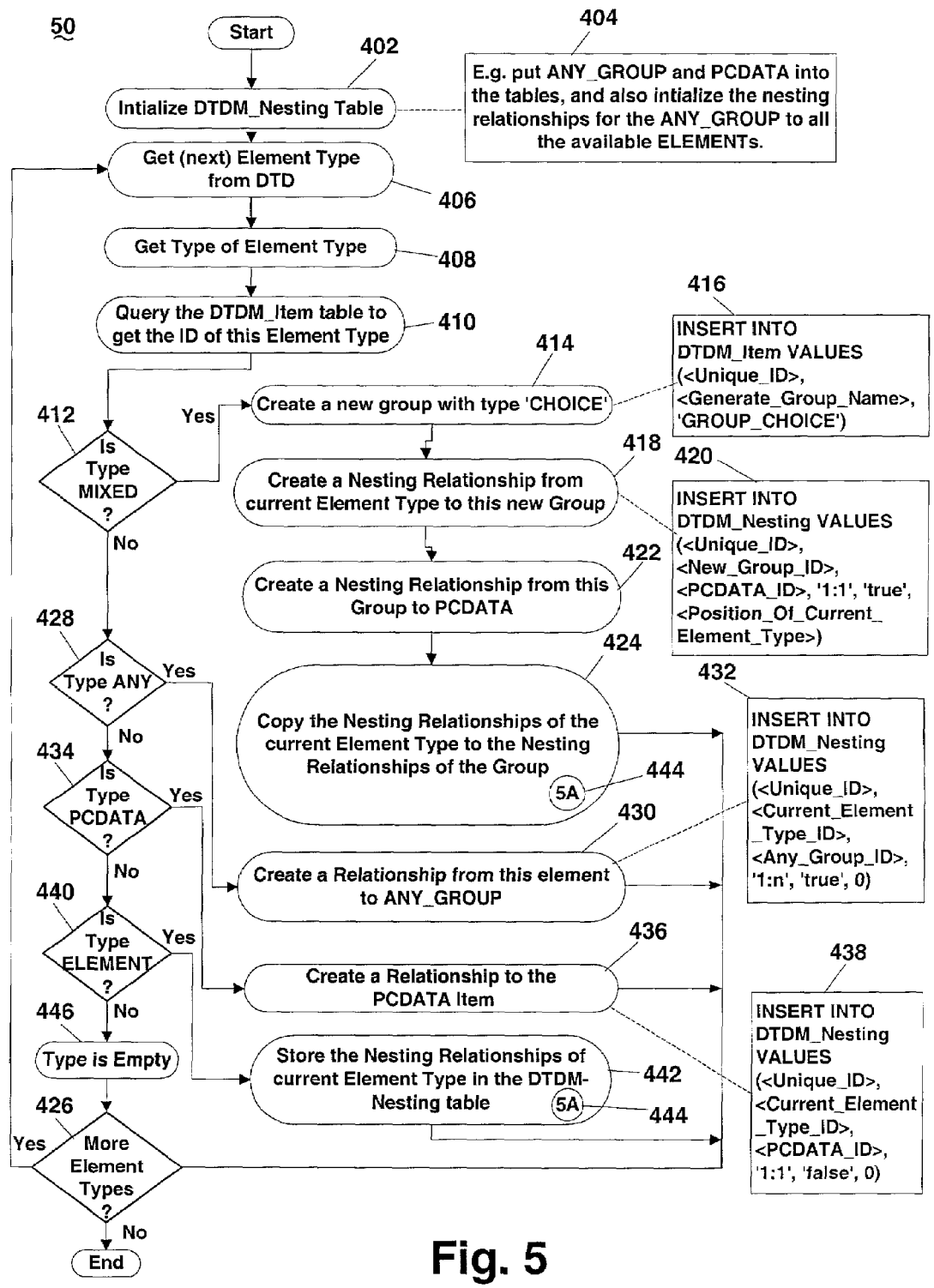
FIG. 5 is a flowchart showing another step of the method shown in FIG. 2 of storing the document-type definition table into metadata tables including the step of building groups and forming a metadata nesting table from the metadata item table formed in FIG. 3.
Figure 9:
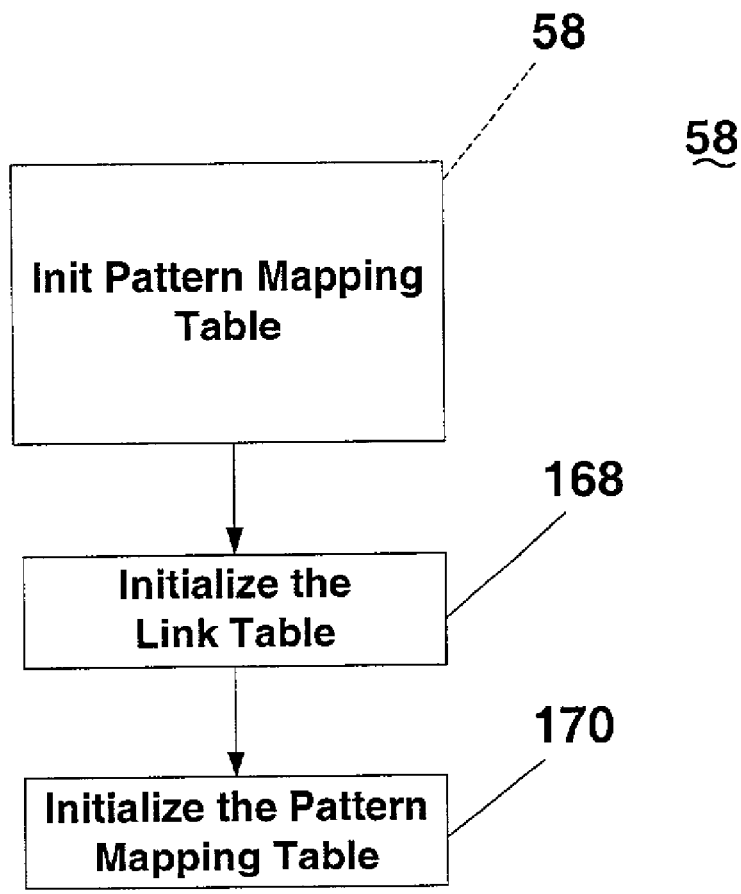
FIG. 9 is a flowchart corresponding to the initialization of the pattern mapping table as described in FIGS. 1, 1A, 1B and 2.
Figure 10:
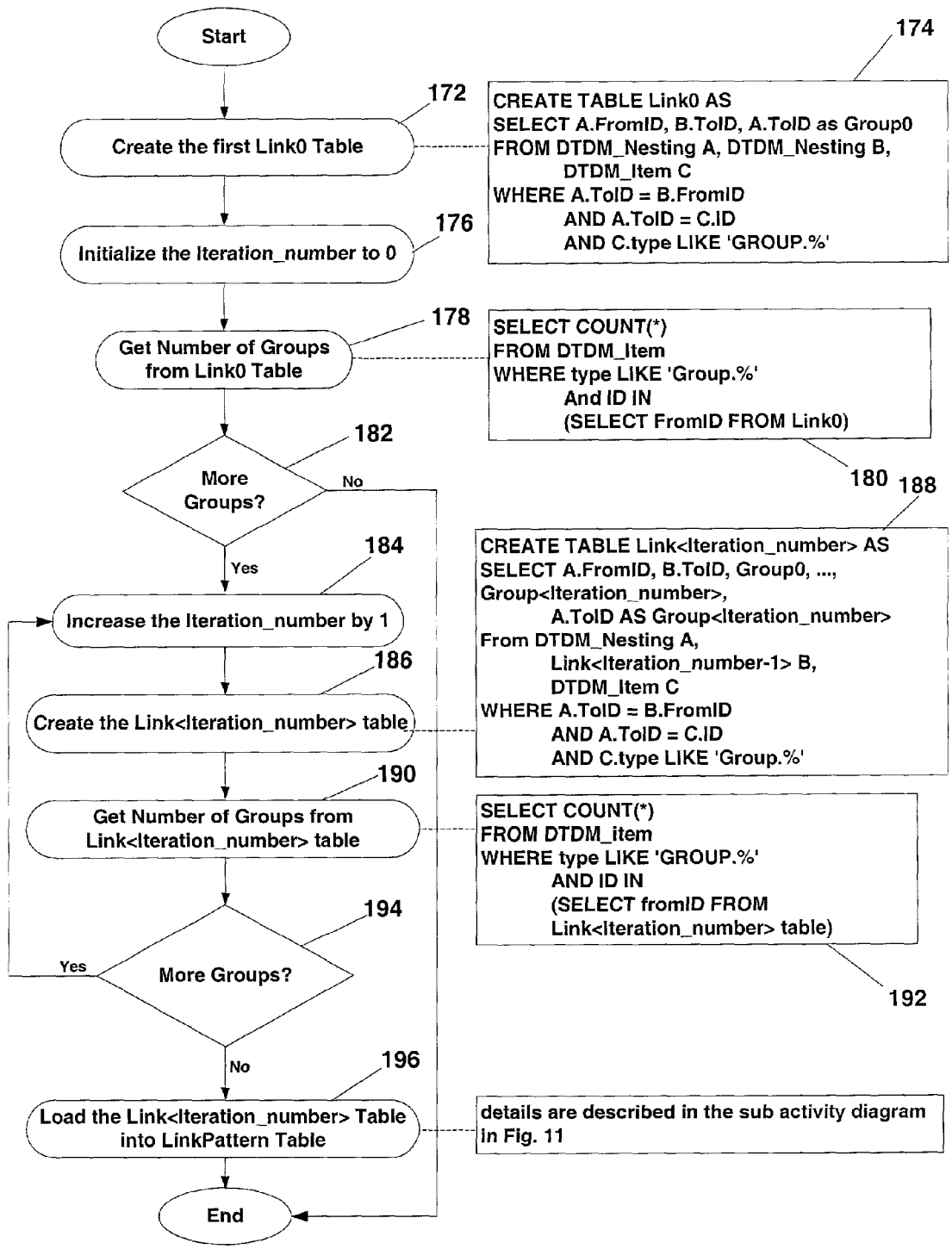
FIG. 10 is a flowchart corresponding to the method step of FIG. 9 in which at least one link table is initialized.
Figure 11:
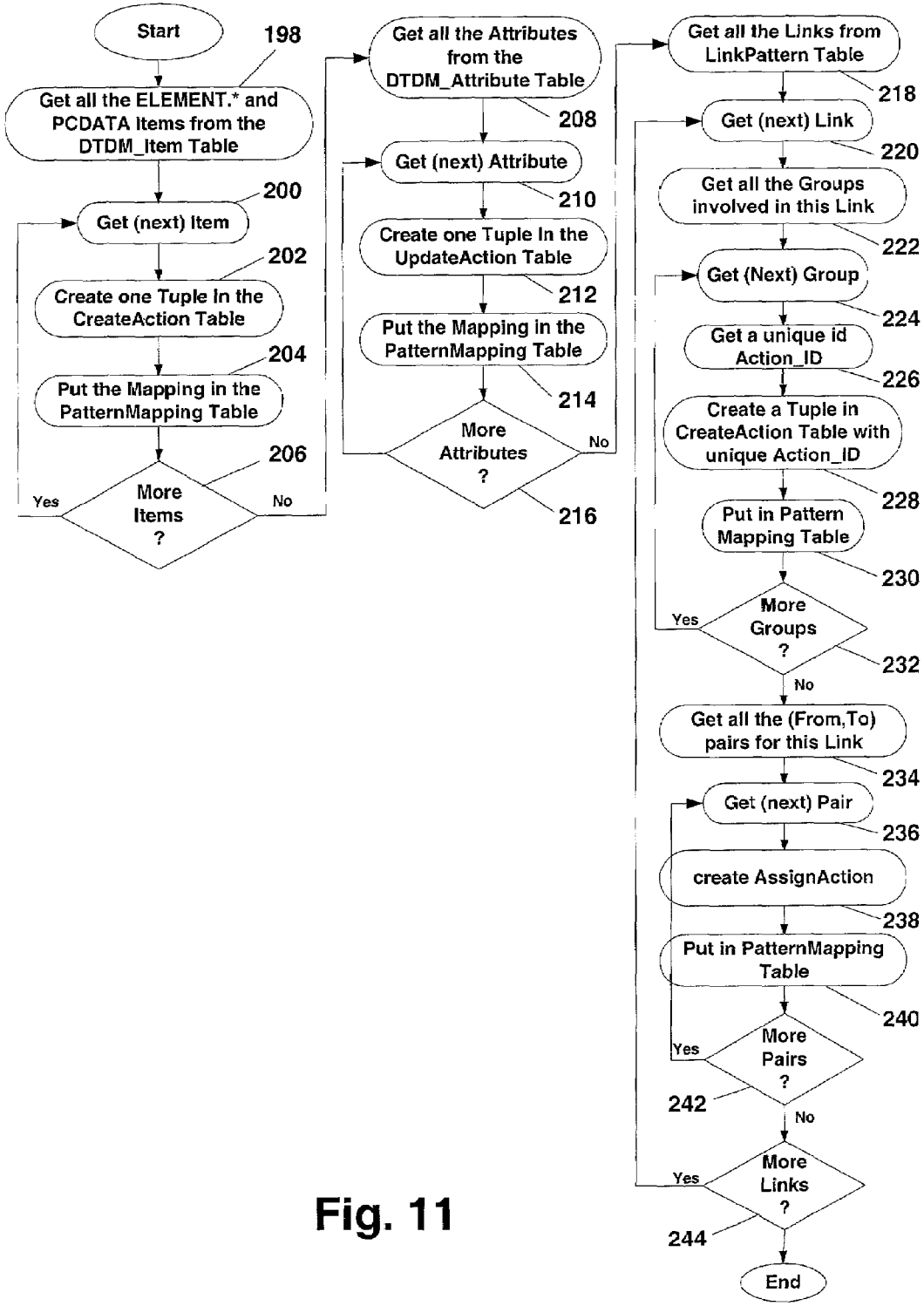
FIG. 11 is a flowchart corresponding to a method step in FIG. 9 in which the pattern mapping table is initialized from the data contained in the metadata tables formed according to the method steps of FIG. 2.

Namely, step 40 of storing the DTD 18 into the DTDM tables 90, 92 and 94 preferably comprises steps of creating and filling the DTDM-Item table 90 in the metadata tables 34 (shown by reference number 46 and described in greater detail in FIG. 3), creating and filling a DTDM-Attribute table 92 in the metadata tables 34 (shown by reference number 48 and described in greater detail in FIG. 4), creating and storing a DTDM-Nesting table 94 in the metadata tables 34 (shown by reference number 50 and described in greater detail in FIG. 5), and initializing a pattern mapping table (shown by reference number 58 and described in greater detail in FIGS. 9–11).

Figure 6:
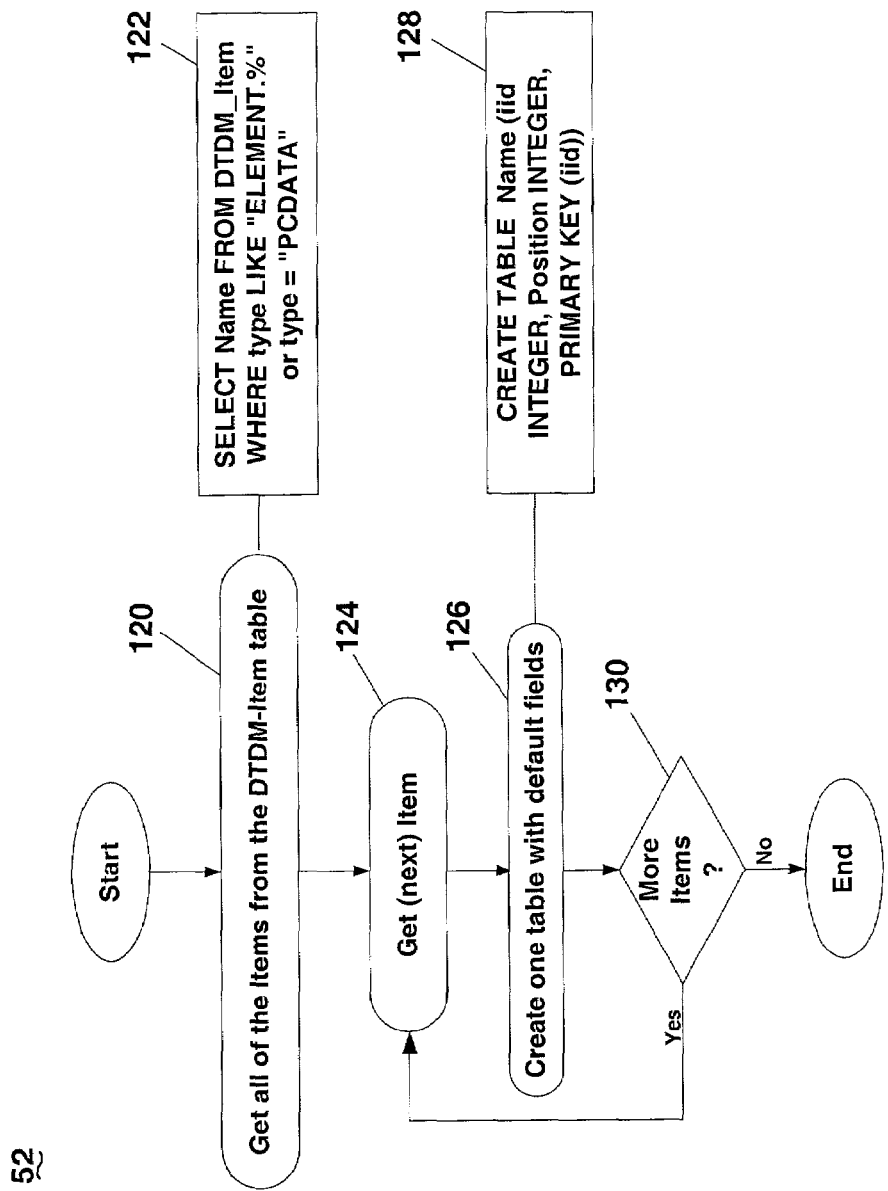
FIG. 6 is a flowchart detailing the step of the method of FIG. 2 in which a relational database schema is generated from the metadata tables including the step of forming tables for each element type in the metadata item table formed in FIG. 3 with default fields provided therein.
Figure 7:
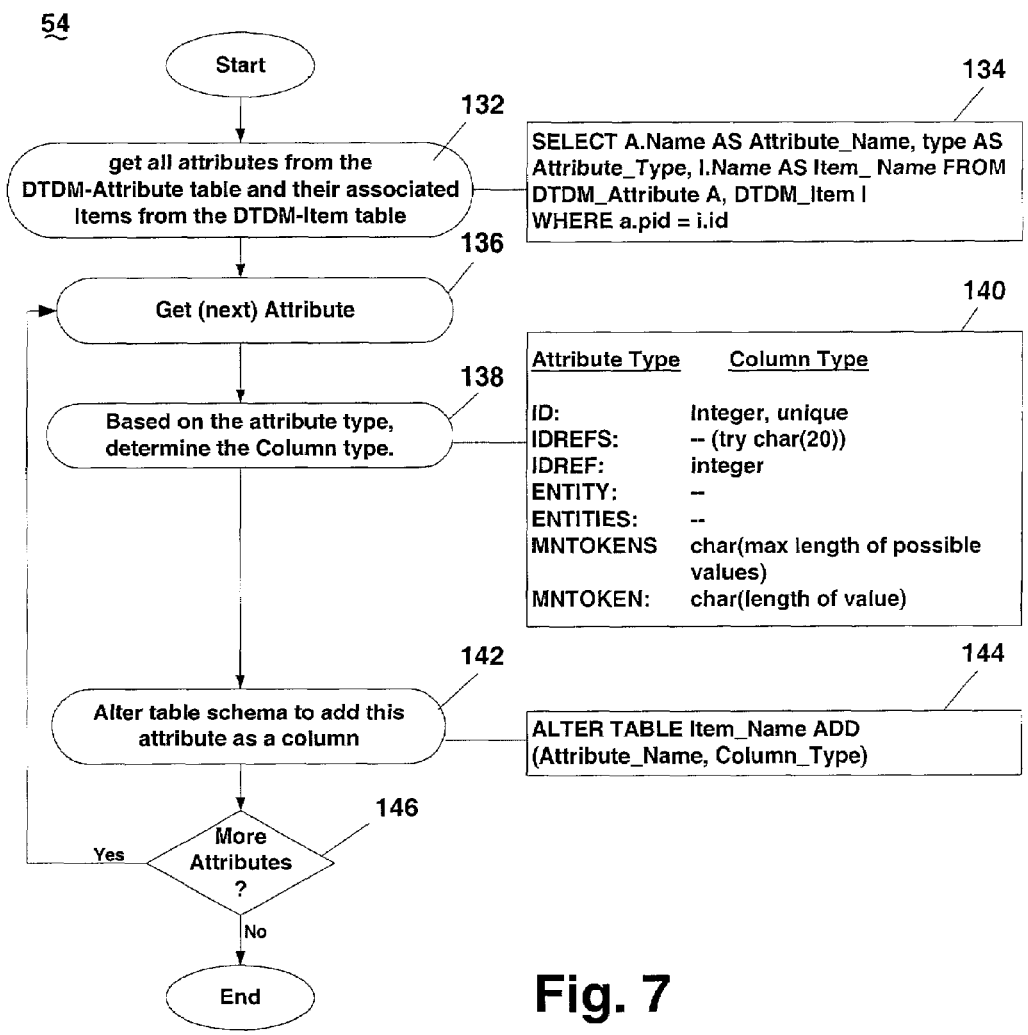
FIG. 7 is a flowchart detailing another method step from the method shown in FIG. 2 in which tables are created to form a relational table schema from the metadata tables in which columns are added to the tables formed in the method shown in FIG. 6 for each of the attributes defined in the metadata attribute tables formed in FIG. 4.
Figure 8:
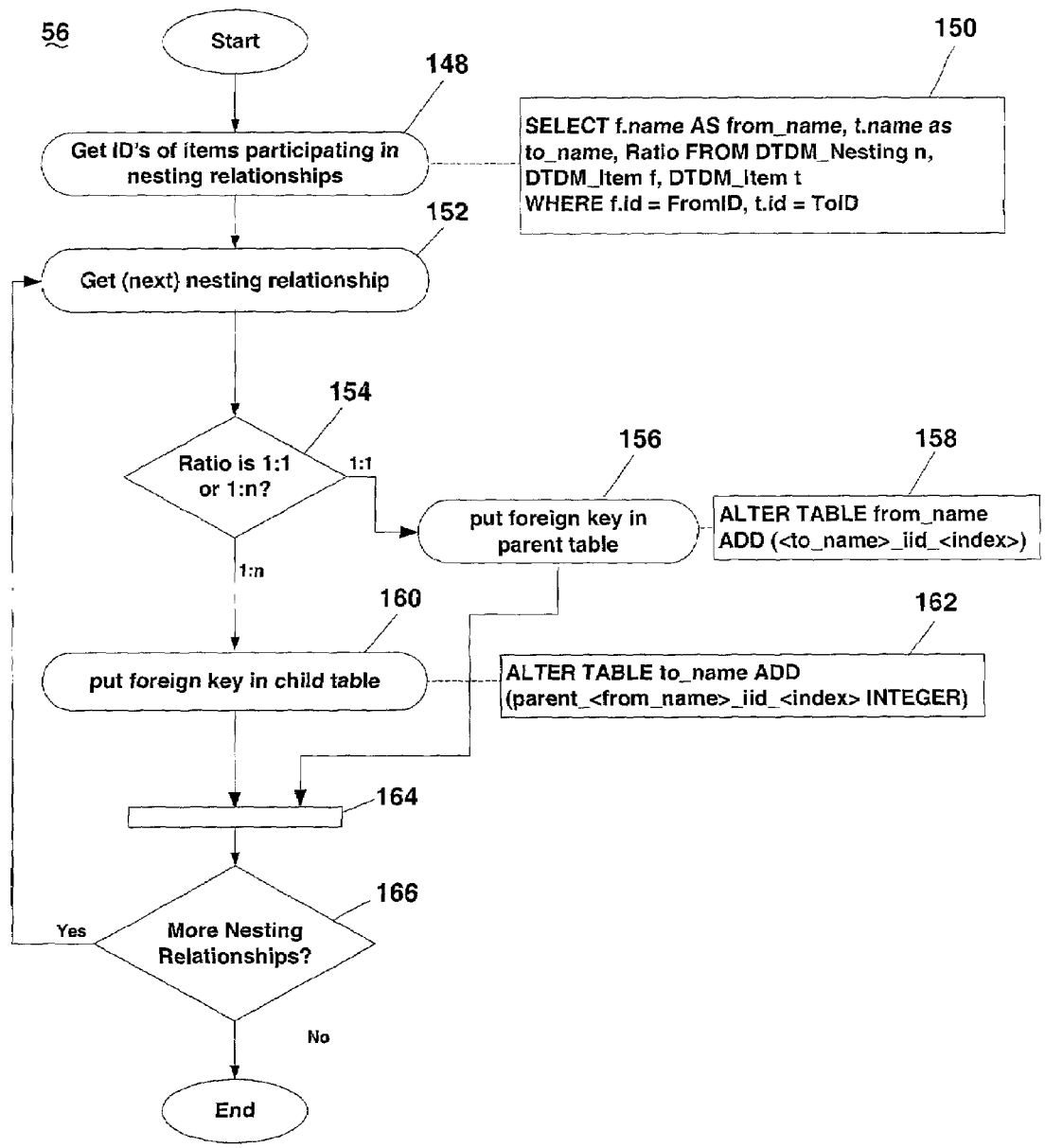
FIG. 8 is a flowchart detailing a method step corresponding additionally to the method step in FIG. 2 in which a relational schema is created from the metadata tables in which nesting relationships are determined between the attributes of the various tables and index columns are added to the various tables in the schema corresponding to those nesting relationships identified in the method step in FIG. 2 in which the metadata nesting table is constructed.

Step 42 of creating the relational table schema 22 from the metadata tables 34 preferably comprises the steps of creating tables in the relational database 14 (shown by reference number 52 and described in greater detail in FIG. 6), adding columns to the tables created in step 52 to correspond to attributes from the metadata tables 34 created in step 48 (shown by reference number 54 and described in greater detail in FIG. 7), and adding nesting relationships indicated by the DTDM-Nesting table 94 stored in the metadata tables 34 in step 50 (shown by reference number 56 and described in greater detail in FIG. 8).

Figure 12:
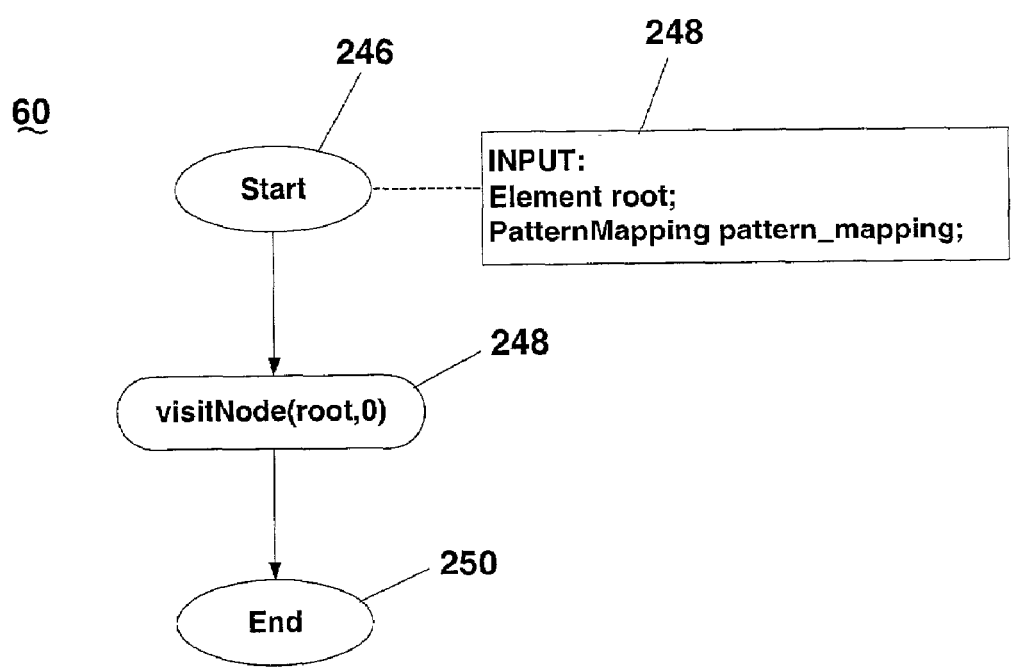
FIG. 12 is a flowchart corresponding to the method step of FIG. 2 corresponding to loading data contained in an extensible document into the relational tables formed in the method steps of FIG. 2.
Figure 13:
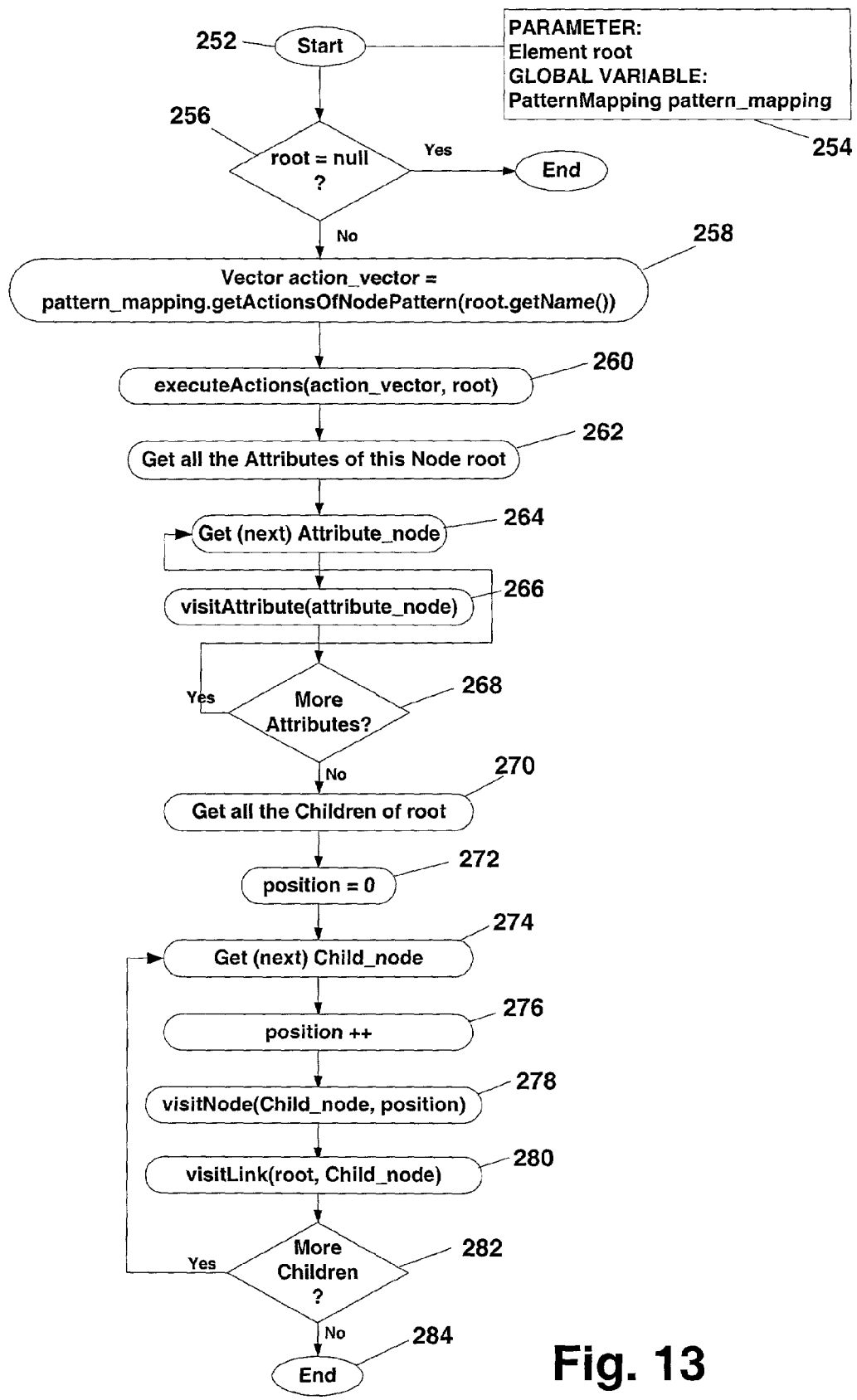
FIG. 13 is a flowchart corresponding to the traversal of a node tree defined in the flowchart shown in FIG. 12 for traversing the node tree and inserting data into the relational table schema formed in the method steps of FIG. 2.

Step 44 of loading the XML data 16 of the document 12 into the tables 20 of the relational database 14 according to the relational schema 22 generated in step 42 preferably comprises the step of loading the XML data 16 contained in the document 12 into the tables 20 of the relational database 14 according to the relational schema 22 generated herein (shown by reference number 60 and described in greater detail in FIGS. 12–13).

It will be understood that the focus of the metadata extraction steps begins with three empty DTDM tables 34—the DTDM-Item table 90, the DTDM-Attribute table 92, and the DTDM-Nesting table 94, the function and features of which will be explained in detail below.

The DTD 18 is first stored into the metadata tables 34 so that it can be optionally restructured, and then the relational schema 22 can be generated from the metadata tables 34. The storing stage identifies the characteristics of the DTD 18, and stores it as the metadata tables 34. The (optional) restructuring stage can identify the multi-valued attributes of the DTD 18, and can also identify items that could be represented as attributes. Mapping the DTD 18 into the relational schema 22 is achieved by applying mapping rules defining transformations over the metadata tables 34 storing the DTD 18.

One initial step is identifying the types of the objects that will be found in these types of data-containing XML documents 12. Three kinds of metadata have been identified as being relevant for storing these properties: items, attributes, and relationships. The three metadata tables 34 for storing the items, attributes and relationships defined in the DTD 18 and the properties of the DTD 18 captured by each table 90, 92 and 94 are defined as will be hereinafter described. Every item, attribute and nesting relationship in the tables 90, 92 and 94 is preferably assigned a unique ID as will be described in greater detail below.

An item represents an object in the DTD 18 that contains, or is contained by, other objects. An attribute is a property of an item. An item can have multiple unique attributes. The attributes of an element in a DTD are all the attributes of the corresponding item in the metadata generated by the invention described herein. A nesting relationship is used to show the hierarchical relationships between two items. It denotes that a child item is directly nested in a parent item.

FIG. 3

The step of creating and filling the DTDM-Item table 90 identified by reference number 46 in FIG. 2 will now be described in greater detail with respect to FIG. 3. As illustrated in FIG. 3, processing moves to step 62 in which, initially, a pair of default items are created in the DTDM-Item table 90 referred to as "PCDATA" and "GROUP" (also referred to as ANY_GROUP in the figures). Proposed SQL statements that could accomplish this task are shown in the note associated with step 62 referred to by reference number 64. Once these initial default items are created in step 62, processing moves to step 66 which initiates a loop for each Element type declaration in the DTD 18. For each of the Element type declarations, a row is created in the DTDM-Item table 90 as shown by the proposed SQL statement in note 68. Processing then moves to decision block 70 in which it is determined whether any additional Element type declarations exist in the DTD 18. If so, processing returns to step 66. If not, processing ends.

The DTDM-Item table 90 preferably stores element types and groups. The table 90 captures the existence property of an element as the Type of the item. It also captures a grouping property by creating a new group item for each group.

| DTDM-Item Table Field Contents | |
|---|---|
| Fields | Meaning |
| ID | Internal ID for Items. |
| Name | Element Type or Group Name. |
| Type | Defines the type of this item within this domain: PCDATA, ELEMENT.ELEMENT, EMPTY, ELEMENT.ANY, ELEMENT.MIX, and GROUP |

The Type field defines the type of an item, i.e., type of the element content in an element type declaration. ELEMENT.ELEMENT means an element content. ELEMENT.MIX means a mix content. ELEMENT.EMPTY means an EMPTY content. ELEMENT.ANY means an ANY content. There are two new item types, i.e., PCDATA and GROUP. PCDATA, means a PCDATA definition, and GROUP means a group definition.

FIG. 4

The step of creating and filling the DTDM-Attribute table 92 identified by reference number 48 in FIG. 2 will now be described in greater detail with respect to FIG. 4. As shown in FIG. 4, processing moves to step 72 in which the Item_ID of PCDATA is retrieved from the DTDM-Item table 90. Processing then moves to step 74 in which default attribute values for PCDATA are created in the DTDM-Attribute table 92. A proposed SQL statement for accomplishing this task is provided in note 76 associated with step 74. Processing then moves to step 78, which initiates a loop for each element type declaration in the DTD 18.

Processing then moves to step 80 in which the Item_ID for each of the element type declarations in the DTDM-Item table 90 is retrieved. Processing then moves to step 82, which initiates a loop for each attribute of this particular element type. For each attribute of this element type declaration, a row is inserted into the DTDM-Attribute table 92 providing attribute information corresponding to the elements of the DTDM-Item table 90. A proposed SQL statement for accomplishing this task is provided in note 84 associated with step 82.

After each row insertion into the DTDM-Attribute table 92, processing moves to decision block 86 to determine whether additional attributes exist for this element type. If so, processing returns to step 82 to process additional attributes. If not, processing moves to decision block 88 to determine whether additional elements exist in the DTD 18 (i.e., as stored in the DTDM-Item table 90). If so, processing returns to step 78. If not processing ends.

The DTDM-Attribute table 92 stores attributes of elements or groups.

| | DTDM-Attribute Table Field Contents |
|---|---|
| Fields | Meaning |
| ID | Internal ID of this attribute. |
| PID | ID of parent items of this attribute. |
| Name | Name of this attribute, e.g., AuthorIDs, id. |
| Type | Type of the attribute, e.g., ID and IDREFS. |
| Default | A keyword or a default literal value of this attribute, e.g., #IMPLIED. |

Note that, for now, the ID/IDREF(s) attributes that represent the element reference properties are stored simply as attributes. Later, during a mapping stage, the element reference property will be captured and stored in an additional metadata table, denoted as the TC-JS table 102 in FIG. 1A (and JoinConstraint 102 in FIG. 1B).

FIG. 5

The step of creating and storing the DTDM-Nesting table 94 identified by reference number 50 in FIG. 2 will now be described in greater detail with respect to FIG. 5. Processing moves to step 402 in which the DTDM-Nesting table 94 is initialized. Pseudopodia indicative of the steps performed in step 402 are given in note 404 associated with step 402. Processing then moves to step 406, which initiates a loop for every element type declaration found in the DTD 18. Processing then moves to step 408, which retrieves the type, i.e., MIXED, PCDATA, ANY, ELEMENT, and EMPTY of the particular element type being examined in the loop initiated at step 406. Processing then moves to step 410 in which the DTDM-Item table 90 is queried to return the identification (ID) of the element type identified in step 408.

Processing then moves to decision block 412 which determines whether the current element type is of type MIXED. If so, processing moves to step 414 in which a new group is created in the DTDM-Item table 90 with type CHOICE, wherein a proposed SQL statement to accomplish this task is shown in note 416 associated with step 414. Processing then moves to step 418 in which a nesting relationship is created from the current element type to the newly-created group as shown by the proposed SQL statement in note 420 associated with step 418. Processing then moves to step 422 in which a nesting relationship is created from this group to element type PCDATA. Processing then moves to step 424 in which all of the nesting relationships from this group to its children are created by function fill_DTDM-Nesting_Item shown in detail in FIG. 5A (via indicator 5A referred to by numeral 444). Processing then moves to decision block 426 in which it is determined whether there are additional element types in the DTD 18 to be processed for the loop initiated at step 406. If so, processing returns to step 406.

If the test performed at decision block 412 fails, processing moves to decision block 428 which determines whether the current element type is of type ANY. If so, processing moves to step 430 in which one relationship from the current element is created to the item titled ANY_GROUP. A proposed SQL statement to accomplish this task is identified in note 432 associated with step 430 in FIG. 5. Processing then moves to decision block 426, which has been previously described.

If the test performed at decision block 428 fails, processing moves to decision block 434 which determines whether the current element type is of type PCDATA. If so, processing moves to step 436 in which a relationship to the previously-created PCDATA item is created in accordance with the proposed SQL statement shown in note 438 associated with step 436 in FIG. 5. Processing then moves to decision block 426, which has been previously described.

If the test performed at decision block 434 fails, processing moves to decision block 440 which determines whether the current element type is of type ELEMENT. If so, processing moves to step 442 which calls a function titled fill_DTDM-Nesting_Item (element_type,−1), the details of which are described in FIG. 5A (by the connector identified with 5A and indicated by numeral 444). After this function has completed, processing moves to decision block 426, which has been previously described.

If the test performed at decision block 440 fails, processing moves to step 446 which notes that the current element type is EMPTY. Processing then moves to decision block 426, which has been previously described.

Once all of the elements have been processed, i.e., all of the element type declarations as identified in the loop initiated at step 406 have been processed, processing ends.

FIG. 5A

Figure 5A:
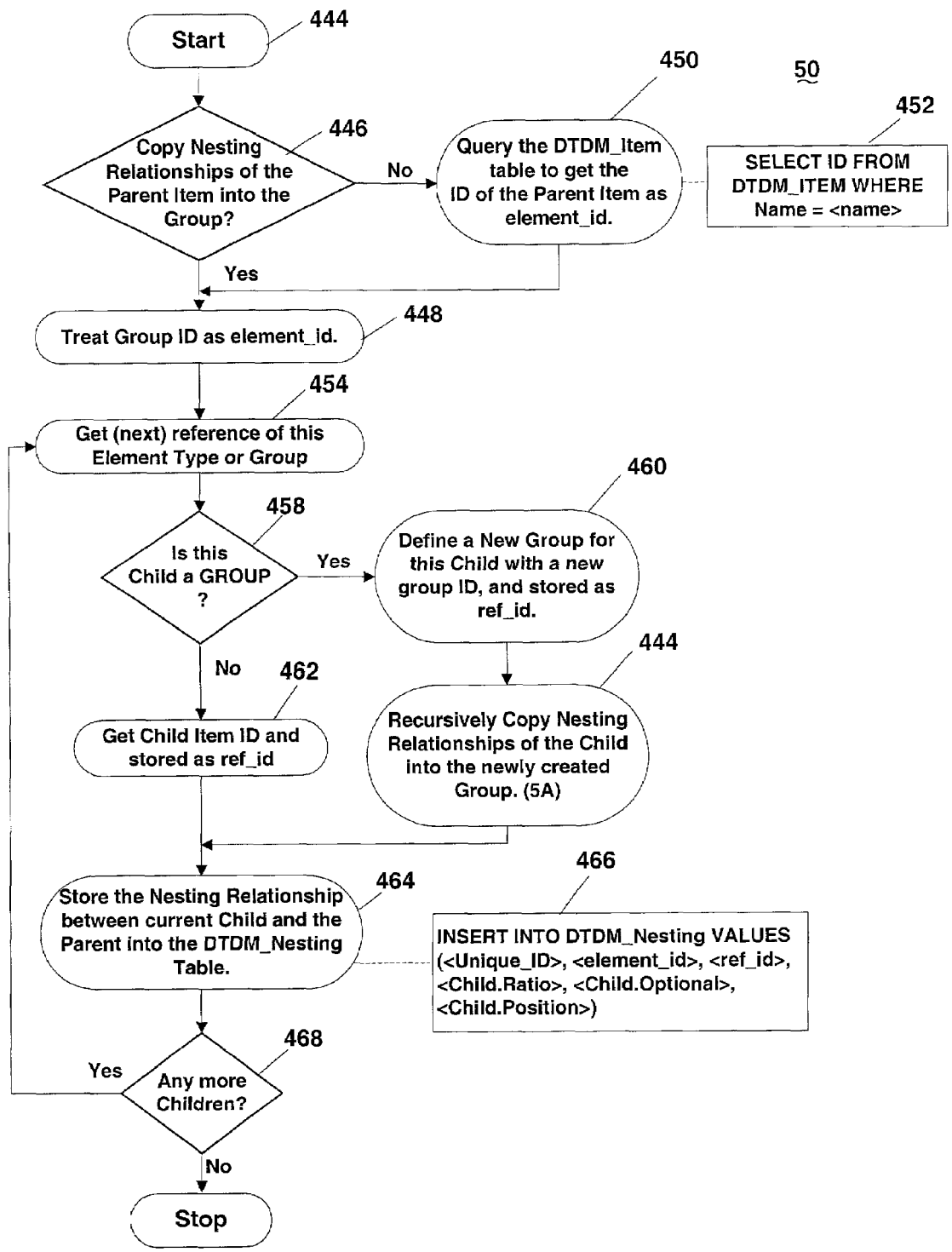
FIG. 5A is a flow chart detailing a portion of the flow chart of FIG. 5 corresponding to the steps to be performed when an element type is encountered during generation of the metadata nesting table.

The contents of the function (i.e., fill_DTDM-Nesting-_Item) identified by the "5A" connectors 444 of FIG. 5 are described in greater detail with respect to FIG. 5A. Once this function is called, processing moves to decision block 446 in which it is determined whether the nesting relationships of the parent item are to be copied into the group. If so, processing moves directly to step 448 in which the group_ID is treated as an element_ID. If not, processing moves to step 450 in which the DTDM-Item table 90 is queried to determine the ID of the parent item (i.e., element type or group) as element_ID. A proposed SQL statement to accomplish this task is shown in note 452 associated with step 450 in FIG. 5A. In either case, processing then moves to step 454, which initiates a loop for the group or element identified in step 448 as element_ID. Processing then moves to step 456, which retrieves the object reference to the current element type or group being processed. Processing then moves to decision block 458, which determines whether the element type or group corresponding to the object reference identified in step 456 is of type GROUP. If so, processing moves to step 460, which retrieves the group ID and stores this ID in variable ref_ID. If not, processing moves to step 462 in which the type is determined to be an element type declaration. Following either step 460 or step 462, processing then moves to step 464 in which the previously-determined object reference is stored into the DTDM-Nesting table 92 in a manner consistent with note 466 which shows a proposed SQL statement for accomplishing this task. Processing then moves to decision block 466 in which it is determined whether any additional references need to be processed. If so, processing returns to step 454. If not, processing terminates and returns to continue processing at the point FIG. 5 was left via connector 444.

The DTDM-Nesting table 94 captures relationships between different items, i.e., nesting, schema ordering, and occurrence properties.

| DTDM-Nesting Table Field Contents | |
|---|---|
| Fields | Meaning |
| ID | Internal ID of this nesting relationship. |
| FromID | ID of parent item of this nesting relationship. |
| ToID | ID of child item of this nesting relationship. |
| Ratio | Cardinality between the parent element and child element. |
| Optional | Used to indicate whether a child element. True if existence of the child is optional, (i.e., *, ?). False otherwise. |
| Index | The schema order of the child element. |

Fields FromID and ToID reference a parent item and a child item that participate in a nesting relationship. The Index field captures the schema ordering property; it denotes the position of this child item in the parent item's definition. In a sequence group, each child item will have a different value for indices (i.e., 1, 2, . . . ); for all children in a choice group, the index fields will all be the same (i.e., 0).

The occurrence property for a child element is captured by a combination of the Ratio and Optional fields. The Ratio field shows cardinality between the instances of the parent item and of the child item. Note that, since the nesting relationships are always from one element type to its sub-elements in the DTD 18, there are only one-to-one or one-to-many nesting relationships in the Ratio column. The many-to-one and many-to-many relationships are not captured by the Ratio field but rather are captured by ID/IDREF(S) attributes in the DTD. The Optional field has value of true or false depending on whether this relationship is defined as optional in the DTD. The following table shows how the Ratio and Optional fields combine to represent the occurrence properties:

| Occurrence Property Indicators | | |
|---|---|---|
| Occurrence Property | Ratio | Optional |
| No Indicator | 1:1 | false |
| ? | 1:1 | true |
| + | 1:n | false |
| * | 1:n | true |

The steps for extracting the metadata tables 90, 92 and 94 can be summarized as follows:

Create one PCDATA Item. This one item will represent all occurrences of #PCDATA in the DTD. The PCDATA item will be used to convert all element-to-PCDATA relationships, such as found in a mixed content definition, to element-to-element relationships, thus unifying these two types of nesting relationships. A PCDATA item has one attribute called value that is used to capture the text value of this PCDATA item.

Create an item for each element type declaration. Tuples in the DTDM-Item table 90 are the elements directly defined by the DTD 18.

Create an item for each grouping relationship in each element type declaration. For each element type declaration in a DTD 18, a group item is created for each group in the item, and the group in the element type declaration is replaced with the corresponding group item. In Example 1, items 14 to 16 represent the groups (author*|editor), (author, affiliation?), and (book|monograph) respectively. Defining each group as an item is used to convert nested groups into nesting relationships between items.

For example, the definition of element book shows that book is composed of booktitle, and a group of authors or an editor. A new item G1 would thereby be defined for the group (author*|editor), the element definition of book would be changed to <!ELEMENT book (booktitle, G1)>.

Store nesting relationships. After defining the PCDATA item and all group items, the hierarchical definitions of elements can be described as nesting relationships between two items. An element definition is a sequence (or choice) of n sub-elements stored as n nesting relationships with index fields in the DTDM-Nesting table 94.

For example, the element definition <!ELEMENT book (booktitle, G1)> has two nesting relationships, i.e., between items book and booktitle, and between items book and G1. These nesting relationships are shown in the DTDM-Nesting table 94 constructed in accordance with the DTD 18 of Example 1 (with IDS 1 and 2).

Store attributes. For items with attributes defined, those attributes are stored in the DTDM-Attribute table 92. For example, the attribute AuthorIDs of item Contactauthors is stored in DTDM-Attribute table 92 (with ID 1) constructed in accordance with Example 1.

Store the ANY element type definitions. An ANY-typed element can contain a mix of PCDATA and any defined element types, and thus can have relationships with all other element types. To capture that relationship, a choice group item is created called ANY GROUP (AG). Every element type definition with content ANY expresses its relationships with all other element types with a one-to-many nesting relationship with the AG item. Using Example 1, row 17 in the DTDM-Item table 90 is the AG group, and nesting relationships with ID 24 through 36 are between this AG group and each of the other element items and the PCDATA item, i.e., between this AG group and items 1 through 13, respectively, in the example described herein conforming to the DTD 18 of Example 1. The Affiliation item, which is an ANY element type declaration, has a one-to-many nesting relationship to the AG group (see line 23 in the DTDM-Nesting table 94 below).

Once the metadata has been extracted and mapped from the DTD 18 shown in Example 1 in the Background section, the metadata tables 34 have the following structure:

The DTDM-Item table 90:

| ID | Name | Type |
|----|------|------|
| 1  | PCDATA | PCDATA |
| 2  | book | ELEMENT.ELEMENT |
| 3  | booktitle | ELEMENT.MIX |
| 4  | article | ELEMENT.ELEMENT |
| 5  | title | ELEMENT.MIX |
| 6  | contactauthors | ELEMENT.EMPTY |
| 7  | monograph | ELEMENT.ELEMENT |
| 8  | editor | ELEMENT.ELEMENT |
| 9  | author | ELEMENT.ELEMENT |
| 10 | name | ELEMENT.ELEMENT |
| 11 | firstname | ELEMENT.MIX |
| 12 | lastname | ELEMENT.MIX |
| 13 | affiliation | ELEMENT.ANY |
| 14 | G1 | GROUP |
| 15 | G2 | GROUP |
| 16 | G3 | GROUP |
| 17 | AG | GROUP |

The DTDM-Attribute table 92:

| ID | PID | Name | Type | Default |
|----|-----|------|------|---------|
| 1 | 6 | authorIDs | IDREFS | #REQUIRED |
| 2 | 8 | name | CDATA | #REQUIRED |
| 3 | 9 | id | ID | #REQUIRED |
| 4 | 1 | value | PCDATA | #REQUIRED |

The DTDM-Nesting table 94:

| ID | FromID | ToID | Ratio | Optional | Index |
|----|--------|------|-------|----------|-------|
| 1  | 2  | 3  | 1:1 | false | 1 |
| 2  | 2  | 14 | 1:1 | false | 2 |
| 3  | 14 | 9  | 1:n | true  | 0 |
| 4  | 14 | 8  | 1:1 | false | 0 |
| 5  | 3  | 1  | 1:1 | false | 0 |
| 6  | 4  | 5  | 1:1 | false | 1 |
| 7  | 4  | 15 | 1:n | false | 2 |
| 8  | 15 | 9  | 1:1 | false | 1 |
| 9  | 15 | 13 | 1:1 | true  | 2 |
| 10 | 4  | 6  | 1:1 | true  | 3 |
| 11 | 5  | 1  | 1:1 | false | 0 |
| 12 | 7  | 5  | 1:1 | false | 1 |
| 13 | 7  | 9  | 1:1 | false | 2 |
| 14 | 7  | 8  | 1:1 | false | 3 |
| 15 | 8  | 16 | 1:n | true  | 1 |
| 16 | 16 | 2  | 1:1 | false | 0 |
| 17 | 16 | 7  | 1:1 | false | 0 |
| 18 | 9  | 10 | 1:1 | false | 1 |
| 19 | 10 | 11 | 1:1 | true  | 1 |
| 20 | 10 | 12 | 1:1 | false | 2 |
| 21 | 11 | 1  | 1:1 | false | 0 |
| 22 | 12 | 1  | 1:1 | false | 0 |
| 23 | 13 | 17 | 1:n | true  | 1 |
| 24 | 17 | 1  | 1:1 | false | 0 |
| 25 | 17 | 2  | 1:1 | false | 0 |
| 26 | 17 | 3  | 1:1 | false | 0 |
| 27 | 17 | 4  | 1:1 | false | 0 |
| 28 | 17 | 5  | 1:1 | false | 0 |
| 29 | 17 | 6  | 1:1 | false | 0 |
| 30 | 17 | 7  | 1:1 | false | 0 |
| 31 | 17 | 8  | 1:1 | false | 0 |
| 32 | 17 | 9  | 1:1 | false | 0 |
| 33 | 17 | 10 | 1:1 | false | 0 |
| 34 | 17 | 11 | 1:1 | false | 0 |
| 35 | 17 | 12 | 1:1 | false | 0 |
| 36 | 17 | 13 | 1:1 | false | 0 |

Any discussion based on examples (and, specifically, Example 1) refer to the above metadata table examples.

The rules used for mapping the DTD 18 are described (as stored as described above), into the relational schema 22 are described in the following. The basic idea behind these rules is that each item is to be mapped into a relational table 20 in the database 14 according to generated schema 22.

As discussed previously, the elements in XML documents are ordered. This order is retained in the newly-generated relational table schema. Groups are not directly shown in the XML document, so they do not have an order property.

FIG. 6

The step of creating tables 20 in the relational database 14 (identified by reference number 52 in FIG. 2) will now be described in greater detail with respect to FIG. 6. Turning to FIG. 6, processing moves to step 120 in which a query of the DTDM-Item table 90 is performed to return all of the item types stored in the DTDM-Item 90 table. A proposed SQL statement to accomplish this task is shown in note 122 associated with step 120 in FIG. 6. Processing then moves to step 124, which initiates a loop for every item returned in the recordset selected in step 120. Processing within the loop then moves to step 126 wherein a table 20 is created in the relational database 14 with some key-type default fields, wherein the table name created in the database 14 corresponds to the Name field in the DTDM-Item table 90 as returned in the recordset in step 120. A proposed SQL statement to accomplish this task is shown in note 128 associated with step 126 in FIG. 6. Processing then moves to decision block 130, which determines whether additional items exist for processing. If so, processing returns to step 124. If not, processing ends.

These steps perform a first mapping on the DTDM-Item table 90. That is, for each ELEMENT.* and PCDATA-typed item defined in the DTDM-Item table 90, a table is created with two default columns: "iid" and "order". For each Group-typed item, a table is created with only an "iid" column.

The metadata tables 34 are queried to get all non-group items by:

SELECT name, type FROM DTDM-Item WHERE type LIKE "ELEMENT.%" OR type="PCDATA"

After the name and type of the item are retrieved, the following queries are performed to create the tables from the query recordset returned. So, for the type of "ELEMENT.*" and "PCDATA" item in the query recordset result, the following query is issued to create a table for each of them, (e.g., an item called ItemTable with a default primary key "iid" and a column called "order" in an INTEGER format):

CREATE TABLE ItemTable (iid INTEGER, order INTEGER, PRIMARY KEY iid)

For items of other types, a table will be created in the form such as:

CREATE TABLE ItemTable (iid INTEGER, PRIMARY KEY iid)

After identifying the basic tables and their required columns, any other columns that are appropriate for those tables must be determined. First, columns are added, which represent the attributes of its parent item, to each table corresponding to that item. Second, the columns of the various tables are interconnected according to the detected nesting relationships therebetween.

FIG. 7

The step of adding columns in the tables created in step 52 for attributes in the DTDM-Attribute table 92 (as identified by reference number 54 in FIG. 2) will now be described in greater detail with respect to FIG. 7. As shown in FIG. 7, processing moves to step 132 in which a join query of the DTDM-Attribute table 92 with the DTDM-Item table 90 is performed to return all of the attributes of an item from data contained in the DTDM-Attribute table 92 and the DTDM-Item tables 90. A proposed SQL statement to accomplish this task is shown in note 134 associated with step 132 in FIG. 7.

Processing then moves to step 136, which initiates a loop for every Attribute returned in the recordset selected in step 132. Processing then moves to step 138 in which, based upon the attribute type of the particular row in the recordset returned in step 132, a column-type variable is determined. A list of applicable column types is shown in note 140 associated with step 138 in FIG. 7.

Processing then moves to step 142 in which the relational database schema 22 is altered to add this attribute and its type to its parent table. A proposed SQL statement to accomplish this task is shown in note 144 associated with step 142 in FIG. 7. Processing then moves to decision block 146 to determine whether additional attributes need to be processed. If so, processing returns to step 136. If not, processing ends.

In this part of the inventive method herein, these steps perform a second mapping on the DTDM-Attribute table 92. For each tuple in the DTDM-Attribute table 92, a column is created, named with the "Name" property of the tuple in the relational table that is identified by the pid index of the tuple. All of the column domains are preferably strings, since the DTD 18 preferably only has one data type, i.e., CDATA, PCDATA. In this invention, it is not necessary to perform additional parsing on the data values to determine their data types, although doing so would not depart from the scope of this invention.

More generally and by way of summary, the above described steps illustrate that the metadata tables 34 are queried to get all attributes for a given item name X (see step 132 and its associated note 134):

SELECT A.name, A.type FROM DTDM-Item I, DTDM-Attribute A WHERE I.name=X AND I.id=A.pid Then, those attributes returned in the above recordset are placed in the definition of the tables created in the first mapping by issuing the following queries (see step 142 and its associated note 144):

ALTER TABLE ItemTable ADD ($A_1$.name $A_1$.type, $A_2$.name $A_2$.type, . . . )

Here, the $A_1$, $A_2$, etc. names and types are the tuples selected from the query issued in connection with step 132 (as described in note 134).

FIG. 8

The step of determining and adding nesting relationships to the relational schema 22 (identified by reference number 56 in FIG. 2) will now be described in greater detail with respect to FIG. 8. Turning to FIG. 8, processing moves to step 148 in which a query of the DTDM-Nesting table 94 is performed to return all of the nesting relationships of an item from the data contained in the DTDM-Nesting table 94 and the DTDM-Item table 90 (i.e., to extract all of the item IDs involved in each nesting relationship). A proposed SQL statement to accomplish this task is shown in note 150 associated with step 148 in FIG. 8.

Processing then moves to step 152 which initiates a loop for every nesting relationship returned in the recordset selected in step 148. Processing then moves to decision block 154 which determines whether the ratio of elements in the particular nesting relationship is a 1-to-1 or a 1-to-n relationship. If the decision block 154 determines that the ratio is 1-to-1, processing moves to step 156 in which a foreign key is inserted in the parent table of the relationship. A proposed SQL statement to accomplish this task is shown in note 158 associated with step 156 in FIG. 8. If the decision block 154 determines that the ratio is 1-to-n, processing moves to step 160 in which a foreign key is inserted into the child table in the relationship. A proposed SQL statement to accomplish this task is shown in note 162 associated with step 160 in FIG. 8. In either case, processing then moves to re-connector 164 and then to decision block 166 which determines whether additional nesting relationships need to be processed. If so, processing returns to step 152. If not, processing ends.

Again, in a general summary, a third mapping is thereby performed on the metadata tables 34 in connection with the process shown in FIG. 8. For each tuple R in the DTDM-Nesting table 94, the table corresponding to the from item is labeled as S and the table corresponding to the to item as T participating in R. Then if R is a one-to-one nesting relationship, the iid of T is stored as a foreign key in S (i.e., store T_iid as a column in S); if R is a one-to-many nesting relationship, the iid of the item S is stored as a foreign key, named P_T_iid (P means parent, so it can be thought of as a reverse link), in T.

If the Optional field of this relationship R in the DTDM-Nesting table 94 is false, then a NOT NULL constraint is added on the definition of the table.

If there is more than one relationship between the two items S and T, then indices are placed after each column name, e.g., _T_iid_1.

The metadata tables 34 are queried to get pairs of items of all of the nesting relationships (see, e.g., note 150 associated with step 148 in FIG. 8):

SELECT F.name, T.name FROM DTDM-Item F, DTDM-Item T, DTDM-Nesting WHERE F.id=N.fromid AND T.id=N.toid.

In accordance with the invention, this relationship mapping depends upon the ratio inherent to the nesting relationship, so that the corresponding table is updated in the following manner:

If a one-to-one relationship is detected at decision block 154:

ALTER TABLE FromItem ADD (ToItem_iid)

If a one-to-many relationship is detected at decision block 154:

ALTER TABLE ToItem ADD (parent_FromItem_iid)

In this approach, many-to-many relationships between different elements are captured by joins on attributes of type ID and IDREF(S). Different combinations of the ID/IDREF(s) attribute represent different cardinalities between two elements. The following table represents the possible relationships between two elements depending upon their ID/IDREF(S) attributes (e.g., of note, the contactauthors and author elements in Example 1 listed in the Background section have a many-to-many relationship):

|  |  | x | | |
|---|---|---|---|---|
| x:y | | ID | IDREF | IDREFS* |
| y | ID | n/a | n:1 | n:m |
|  | IDREF | 1:n | n/a | n/a |
|  | IDREFS* | m:n | n/a | n/a |

*Or multiple IDREF type of attributes

A fourth mapping is performed on the metadata tables 34 for the ID type of attributes. For the ID type of attributes, those attributes are designated as a key of their parent tables.

A fifth mapping is performed on the metadata tables 34 for the IDREF(S) type of attributes. For the IDREF(S) type of attributes, join constraints will be added to show meaningful joins between those tables. Each combination of attributes with type ID and type IDREF(S) is stored as one tuple in a TS-JC table 102 (short for Table Schema/Join Constraints). The FromColumn and ToColumn store the ID of the attribute of type IDREF(s) and of type ID, respectively.

The TS-JC table 102 stores these equi-join conditions representing the element reference properties:

| Fields | Meaning |
|---|---|
| ID | Internal ID of this join condition. |
| FromColumn | Column Join from. |
| ToColumn | Column Join to. |
| Occurrence | Times of Join. |

The metadata tables 34 are queried to retrieve all of the attributes having type ID by the query:

SELECT I.name, A.name FROM DTDM-Item I, DTDM-Attribute A WHERE I.id=A.pid AND A.type="ID"

All of the attributes having type IDREF (S) are retrieved by the query:

SELECT I.name, A.name FROM DTDM-Item I, DTDM-Attribute A WHERE I.id=A.pid AND (A.type="IDREF" OR A.type="IDREFS")

Then, those retrieved recordset items are placed into the TS-JC table 102. The result after performing these mappings on the metadata tables 34 (specifically as updated per Example 1), is shown in the following tables which show essentially a data dictionary of the relational schema 22 for the relational database 14 and also the TS-JC table 102. The data dictionary lists the table names and the columns in each table.

The relational database data dictionary would look as follows if the metadata for Example 1 is employed:

| Table Name | Required Columns | Data Columns | Relationship Columns |
|---|---|---|---|
| PCDATA | iid, order | Value | |
| book | iid, order | | booktitle__iid, G1__iid |
| booktitle | iid, order | PCDATA__iid | |
| article | iid, order | | title__iid, contactauthor__iid |
| title | iid, order | PCDATA__iid | |
| contactauthors | iid, order | authorsIDs | |
| monograph | iid, order | | title__iid, author__iid, editor__iid |
| editor | iid, order | name | |
| author | iid, order | id | parent__G1__iid, name__iid |
| name | iid, order | | firstname__iid, lastname__iid |
| firstname | iid, order | PCDATA__iid | |
| lastname | iid, order | PCDATA__iid | |
| affiliation | iid, order | | |
| G1 | iid | | editor__iid |
| G2 | iid | | parent__article__iid, author__iid, affiliation__iid |
| G3 | iid | | parent__editor__iid, book__iid, monograph__iid |
| AG | iid | | Parent__affiliation__iid, PCDATA__iid, book__iid, booktitle__iid, article__iid, title__iid, contactauthors__iid, monograph__iid, editor__iid, author__iid, name__iid, firstname__iid, lastname__iid, affiliation__iid |

The TS-JC table 102 would appear as follows:

| ID | FromColumn | ToColumn | Occurrence |
|---|---|---|---|
| 1 | author.id | contactauthors.authorIDs | |

From the examples shown above, it can be seen that there are several relationships between different tables and also, the IDREFS type attribute of the DTD 18, e.g., authorIDs, is not fully represented by the schema 22 proposed above.

Two restructuring techniques (i.e., as part of the optional optimizer 26) can be employed according to the invention on the metadata tables 34 to address these shortcomings. First, multiple-value attributes can be identified. Second, elements that should be attributes of other elements can be identified.

In the DTD 18 (and, of course, any DTD), some attribute types can contain multiple values, e.g. IDREFS, NMTOKENS, ENTITIES. Such attributes can be analogized to a set rather than an attribute, and it is desired to represent their values as sets. In stead of treating the whole attribute as a unitary string of some undetermined length, the values of that attribute are accessed individually. Hence, it is desired to identify these multiple-value types of attributes and convert them into separate tables to access those values. Of course, the transformation of attribute types other than IDREFS would be handled in a similar manner.

By way of example, assuming that a DTDM-Item E has a multiple-value attribute A. For each A, another item named E:A is created. There is only one attribute in this item named value. A one-to-many relationship is then created between the item E and the item E:A. The attribute A is then removed from the attribute list of the item E. The following paragraphs describe this type of mapping in detail.

It can be seen from the above metadata expression of Example 1 that the attribute authorIDs of item contactauthors is of type IDREFS. So, a new item contactauthors_authorIDs is created and the attribute authorIDs with type IDREFS is changed into the attribute value of item contactauthors_authorIDs with type IDREF. This allows the expression of multiple values of attribute authorIDs by a new table.

In a DTD, there are one-to-one relationships between different elements. If an element of type A contains only an EMPTY content element, then a later element of type B can be considered to act as a complex attribute of an earlier one. Hence, a technique is proposed to convert these kinds of "complex attribute"-elements into a real attribute which is referred to herein as an inline attribute process.

Inlining an attribute means, if item A to item B has a 1:1 nesting relationship and item B has no child item, then all of the attributes of item B can be inlined into item A. Then, the attribute X of item B is inlined into A as B_X. This inline technique cannot be applied to one-to-many relationships, because multiple occurrences of the attributes could exist.

After inlining the attributes by the process discussed above, the number of nesting relationships is consequently reduced, hence the table schema 22 is simpler. It can be appreciated that a group item could also contain other items, so, after inlining attributes, the group item could have attributes which are converted from its children items.

The inlining process includes multiple iterations, until no additional items can be inlined. In terms of operations on the metadata tables 34, starting from the PCDATA element (leaves), items in the DTDM-Nesting table 94 are searched for that have never appeared in the "FromID" field, and only appeared in "ToID" field with "Ratio" as "1:1".

In order to apply the inline operation, the item B has to have no child items, and the relationship between item A and item B must be one-to-one, as follows:
SELECT ID
FROM Nesting N
WHERE ToID IN
   (SELECT UNIQUE ToID as PID,
   FROM Nesting
   EXCEPT
   SELECT UNIQUE FromID as PID
   FROM Nesting) AND
   NOT EXIST
   (SELECT *
   FROM Nesting
   WHERE ToID=N.ToID AND Ratio="1:n");

For example, using the metadata tables generated in response to Example 1, there are two proposed iterations. During the first iteration, only item 1 (PCDATA) is returned. During the second iteration, item 3 (booktitle), 5 (title), 11 (firstname) and 12 (lastname) are returned. Then, there no more items satisfy the above conditions.

After inlining the attributes, the GROUP, or ATTRIBUTE typed items can be removed which, of course, have no relationship with other items, from the DTDM-Item table 90. However, the items of type ELEMENT.* or PCDATA cannot be removed, because the elements and PCDATA are required during the database data loading phase discussed hereafter in detail. After loading the data from the document 12, those tables can be removed to reduce the degree of redundancy of data.

There is an additional refinement to make the schema 22 more meaningful. That is, in the table schema 22, all of the attribute names of "*.PCDATA.value" are simplified into "*" Then, a query can be performed in simpler semantic like:
SELECT booktitle FROM book rather than
SELECT booktitle.PCDATA_value FROM book The tables following this paragraph show the metadata tables 34 after being restructured as discussed above. Compared to the initial version of the metadata tables 34 above, it can be seen that, the number of nesting relationships in the DTDM-Nesting table 94) has been reduced to half, while the number of attributes has been increased. This results in bigger tables and less joins across the tables, which is beneficial for join query performance, and is easier to understand.

The restructured DTDM-Item Table 90 (also referred to herein as the IM-Item table 96):

| ID | Name | Type |
|---|---|---|
| 1 | PCDATA | PCDATA |
| 2 | book | ELEMENT.ELEMENT |
| 3 | booktitle | ELEMENT.MIX |
| 4 | article | ELEMENT.ELEMENT |
| 5 | title | ELEMENT.MIX |
| 6 | contactauthors | ELEMENT.EMPTY |
| 7 | monograph | ELEMENT.ELEMENT |
| 8 | editor | ELEMENT.ELEMENT |
| 9 | author | ELEMENT.ELEMENT |
| 10 | name | ELEMENT.ELEMENT |
| 11 | firstname | ELEMENT.MIX |
| 12 | lastname | ELEMENT.MIX |
| 13 | affiliation | ELEMENT.ANY |
| 14 | G1 | GROUP |
| 15 | G2 | GROUP |
| 16 | G3 | GROUP |
| 17 | AG | GROUP |
| 18 | contactauthors_authorsIDs | ATTRIBUTE |

The restructured DTDM-Attribute table 92 (also referred to herein as the IM-Attribute table 98):

| ID | PID | Name | Type | Default |
|---|---|---|---|---|
| 1 | 18 | value | IDREF | #REQUIRED |
| 2 | 8 | name | CDATA | #REQUIRED |
| 3 | 9 | id | ID | #REQUIRED |
| 4 | 1 | value | PCDATA | #REQUIRED |
| 5 | 3 | PCDATA_value | PCDATA | #REQUIRED |
| 6 | 5 | PCDATA_value | PCDATA | #REQUIRED |
| 7 | 11 | PCDATA_value | PCDATA | #REQUIRED |
| 8 | 12 | PCDATA_value | PCDATA | #REQUIRED |
| 9 | 17 | PCDATA_value | PCDATA | #REQUIRED |
| 10 | 2 | booktitle | PCDATA | #REQUIRED |
| 11 | 17 | booktitle | PCDATA | #REQUIRED |
| 12 | 4 | title | PCDATA | #REQUIRED |
| 13 | 7 | title | PCDATA | #REQUIRED |
| 14 | 17 | title | PCDATA | #REQUIRED |
| 15 | 10 | firstname | PCDATA | #REQUIRED |
| 16 | 17 | firstname | PCDATA | #REQUIRED |
| 17 | 10 | lastname | PCDATA | #REQUIRED |
| 18 | 17 | lastname | PCDATA | #REQUIRED |
| 19 | 9 | name_firstname | PCDATA | #REQUIRED |
| 20 | 9 | name_lastname | PCDATA | #REQUIRED |
| 21 | 17 | name_firstname | PCDATA | #REQUIRED |
| 22 | 17 | name_lastname | PCDATA | #REQUIRED |

The restructured DTDM-Nesting table 94 (also referred to herein as the IM-Nesting table 100):

| ID | FromID | ToID | Ratio | Optional | Index |
|----|--------|------|-------|----------|-------|
| 2  | 2      | 14   | 1:1   | false    | 2     |
| 3  | 14     | 9    | 1:n   | true     | 0     |
| 4  | 14     | 8    | 1:1   | false    | 0     |
| 7  | 4      | 15   | 1:n   | false    | 2     |
| 8  | 15     | 9    | 1:1   | false    | 1     |
| 9  | 15     | 13   | 1:1   | true     | 2     |
| 10 | 4      | 6    | 1:1   | true     | 3     |
| 13 | 7      | 9    | 1:1   | false    | 2     |
| 14 | 7      | 8    | 1:1   | false    | 3     |
| 15 | 8      | 16   | 1:n   | true     | 1     |
| 16 | 16     | 2    | 1:1   | false    | 0     |
| 17 | 16     | 7    | 1:1   | false    | 0     |
| 22 | 12     | 1    | 1:1   | false    | 0     |
| 23 | 13     | 17   | 1:n   | true     | 1     |
| 25 | 17     | 2    | 1:1   | false    | 0     |
| 27 | 17     | 4    | 1:1   | false    | 0     |
| 29 | 17     | 6    | 1:1   | false    | 0     |
| 30 | 17     | 7    | 1:1   | false    | 0     |
| 31 | 17     | 8    | 1:1   | false    | 0     |
| 32 | 17     | 9    | 1:1   | false    | 0     |
| 36 | 17     | 13   | 1:1   | false    | 0     |
| 37 | 6      | 18   | 1:n   | false    | −1    |

The following data dictionary representative of the table schema 22 is thereby generated in accordance with this inventive method:

| Table Name | Required Columns | Data Columns | Relationship Columns |
|------------|------------------|--------------|----------------------|
| PCDATA | iid, order | value | |
| book | iid, order | booktitle | G1_iid |
| booktitle | iid, order | PCDATA_value | |
| article | iid, order | title | contactauthor_iid, |
| title | iid, order | PCDATA_value | |
| contactauthors | iid, order | | |
| monograph | iid, order | title | author_iid, editor_iid, |
| editor | iid, order | name | |
| author | iid, order | id, name_firstname, name_lastname | parent_G1_iid |
| name | iid, order | firstname, lastname | |
| firstname | iid, order | PCDATA_value | |
| lastname | iid, order | PCDATA_value | |
| affiliation | iid, order | | |
| G1 | iid | | editor_iid |
| G2 | iid | | parent_article_iid, author_iid, affiliation_iid |
| G3 | iid | | parent-editor_iid, book_iid, monograph_iid |
| AG | iid | PCDATA_value, booktitle, title, firstname, lastname, name_firstname, name_lastname | parent_affiliation_iid, book_iid, article_iid, contactauthors_iid, monograph_iid, editor_iid, author_iid, affiliation_iid |
| contactauthors.authorIDs | idd | value | PARENT_contactauthors_idd |

The TS-JC table 102 follows:

| ID | FromColumn | ToColumn | Occurrence |
|----|------------|----------|------------|
| 1  | author.id  | contactauthors.authorIDs.value | |

Now, the details of this inventive metadata-driven method that loads an XML document 12 into the relational schema 22 generated above will be discussed.

The loading process has two general phases as depicted in FIG. 1. First, the pattern-mapping table is generated that is used to capture the mapping between a DTD 18 and the relational schema 22. This includes generating an initial pattern-mapping table 36, and updating this pattern-mapping table to keep track of the actions during the restructuring of metadata tables 34. Second, XML documents 12 are loaded that comply with the DTD 18 using the pattern-mapping table 36.

An example of a compliant data portion 16 of the XML document 12 is shown below:

EXAMPLE 2

A Valid XML Document Complying with the DTD of Example 1

```
<!xml version="1.0">
<!DOCTYPE article SYSTEM "book.dtd">
<article>
    <title>XML Relation Mapping</title>
    <author id = "xz">
        <name>
            <firstname>Xin</firstname>
            <lastname>Zhang</lastname>
        </name>
    </author>
    <affiliation>
      Department of Computer Science
      Worcester Polytechnic Institute
      Worchester, MA 01609-2280
    </affiliation>
    <author id = "gm">
        <name>
            <firstname>Gail</firstname>
            <lastname>Mitchell</lastname>
        </name>
    </author>
    <affiliation>
      Verizon Laboratories Incorporated
      40 Sylvan Rd.
      Waltham, MA 02451
    </affiliation>
    <author id = "w1">
        <name>
            <firstname>Wang-chien</firstname>
            <lastname>Lee</lastname>
        </name>
    </author>
    <affiliation>
      Verizon Laboratories Incorporated
      40 Sylvan Rd.
      Waltham, MA. 02451
    </affiliation>
    <contactauthors authorIDs="xz gm w1">
</article>
```

FIGS. 12–14

Figure 14:
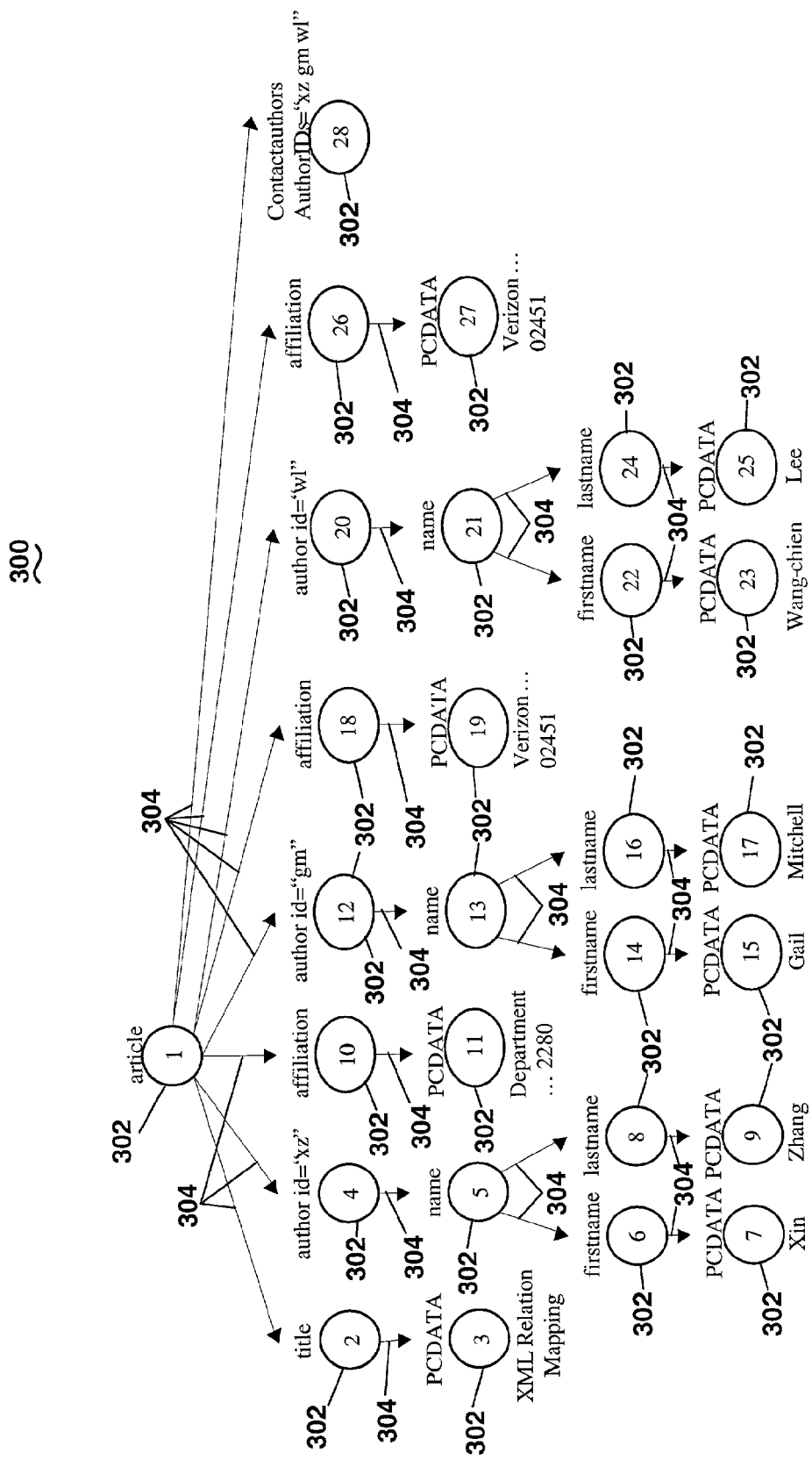
FIG. 14 is an example of a node free discussed with respect to FIGS. 12–13 having data and complying with a document-type definition corresponding to Example 1 described in the Background section herein.

With reference to the drawings and, specifically, to FIGS. 12–14, an XML tree model 300 is proposed herein, followed by the introduction of the concept of patterns detected during the importation of the data, the definition of the loading actions, the description of the generation of a pattern-mapping table, the provision of details of the loading algorithm, and finally by a loading example. It will be understood that various examples of DOM trees are shown throughout this description, and that items and elements common to these various trees 300 are shown by like reference numerals.

By way of explanation, it is known to parse XML documents into a document object model (DOM)-complaint XML tree structure. Here, a simplified DOM model is proposed for illustration purposes. This model (of the type shown in FIG. 14) is composed of nodes 302 and edges 304. Every node 302 of the tree corresponds to one element in the XML document 12. An edge 304 corresponds to a nesting relationship between elements. The relationships between elements with ID/IDREF typed attributes are not shown in this model.

Every node 302 preferably has a type and possibly one or more attributes. Every attribute preferably has a name and its corresponding value. The PCDATA node has only one attribute, named "value". FIG. 14 depicts the XML document 12 defined in Example 2 in terms of this tree model 300. For internal nodes 302, the element type is written above the node followed by any attributes and their values. All leaf nodes 302 have type PCDATA, and have their values in the "value" attribute below the node 302. Arcs between nodes 302 illustrate nesting relationships between the nodes 302. In addition, every node 302 has its document order on it (contained within it (i.e., the order by which a tree traversal routine encounters a particular node 302).

In the model of FIG. 14, other known types of nodes, e.g., notation, comments, etc., as considered in the well known DOM model have not been included, because this invention focuses primarily on the elements and their attributes.

When the XML tree model of FIG. 14 is examined, it can be observed that there are three kinds of objects in the tree—nodes, links, and attributes. Different types of nodes, links and attributes are stored in different parts of the relational tables 20 generated for the relational database 14 in accordance with the previously generated relational schema 22. A pattern associated therewith is preferably the type of node, link and/or attribute and are referred to herein as a node pattern, a link pattern, and an attribute pattern.

The node pattern is identical to one item, of whose type is ELEMENT.* or PCDATA, in the DTDM-Item table 90. It is represented as its item name in the pattern-mapping table 36. The attribute pattern is identical to one attribute in the DTDM-Attribute table 92 and is represented as its full attribute name (including its associated item name) in the pattern-mapping table 36. The link pattern is used to show all possible links between two types of elements that are permitted by the DTD 18 and is represented in the tables below as two element types with an arrow ("→") in the middle.

There are two types of nesting relationships captured in the DTDM-Nesting table 94, i.e., the test for determining such is whether the relationship involves a group typed item or not. If a nesting relationship does not involve a group-typed item, then it can be directly mapped into a link between the two items participating in that relationship. For a nesting relationship that involves group typed items, the following steps are proposed to generate the link patterns:

A temporary table link is created by doing a self-join of the DTDM-Nesting table 94 on the group typed items:
CREATE Table link AS
SELECT A.FromID, B. ToID
FROM DTDM-Nesting A, DTDM-Nesting B, DTDM-Item C
WHERE A.ToID=B. FromID AND A.ToID=C.ID and C.type='GROUP'

For example, nesting relationship pairs (2,3), (2,4) for GroupID=14 can be determined from the metadata tables 34 according to the example described previously.

Further self-joins are performed on the table link until all the FromID and ToID indices are not group typed items. It is contemplated that as many as n−1 iterations may need to occur until all possible self-joins are performed (for a maximum of n level groups).

Accordingly, the links in are located in this generated link table are the remainder of the link patterns needed.

The following tables provide the pattern-mapping table 36 with all of the patterns from the metadata tables 34 generated according to the DTD 18 provided in Example 1 and discussed throughout. By way of clarification, different types of patterns have been separated by a solid line in the following table in the following order: (1) node patterns; (2) attribute patterns; and (3) link patterns.

| Pattern |
| --- |
| PCDATA |
| book |
| booktitle |
| article |
| title |
| contactauthors |
| monograph |
| editor |
| author |
| name |
| firstname |
| lastname |
| affiliation |
| contactauthors.authorIDs |
| editor.name |
| author.id |
| PCDATA.value |
| book→booktitle |
| book→author |
| book→editor |
| booktitle→PCDATA |
| article→title |
| article→author |
| article→affiliation |
| article→contactauthors |
| title→PCDATA |
| monograph→title |
| monograph→author |
| monograph→editor |
| editor→book |
| editor→monograph |
| author→name |
| name→firstname |
| name→lastname |
| firstname→PCDATA |
| lastname→PCDATA |
| affiliation→PCDATA |
| affiliation→book |
| affiliation→booktitle |
| affiliation→article |
| affiliation→contactauthors |
| affiliation→monograph |
| affiliation→editor |
| affiliation→author |
| affiliation→name |
| affiliation→firstname |
| affiliation→lastname |
| affiliation→affiliation |

Patterns are used to identify the type of nodes, links and attributes. Then, the inventive process contemplates the definition of loading actions as will be described below. These loading actions describe how to fill the data in the pattern mapping tables into relational tables 20 for the relational database 14. These loading actions are summarized below as create, update, assign and decompose.

create(T) creates a tuple in table T with a new "iid" and an optional "order" if handling an element.

update(T:A) updates a column A of the current tuple in table T with the value of the attribute in the XML tree (like the one shown in FIG. 14).

assign(T:A; S:B) assigns a column A in table T with another attribute B in table S.

decompose(T:A) decomposes multiple tuples for a multi-value attribute and stores those values into column A in table T. For example, if a multi-value attribute has value "v1 v2", then it will create two tuples with value "v1" and "v2" respectively.

The possible mappings between the pattern detected and the loading actions are described in the following paragraphs.

When a node is encountered, one new tuple is created in the corresponding table.

When an attribute is encountered, two possible cases result. First, this attribute can be mapped into a column, e.g., update (T.A), and then the column of the tuple in the specific table is updated. Second, this attribute can be mapped into a table, and then multiple tuples in the specific table can be created for each value in this attribute.

When a link is encountered, three possible cases result. First, the foreign key in one table can be updated with the key value in another table. Second, if there is a group in this link, then a new tuple is created in the group table as well as the corresponding foreign keys are updated. Third, if the child node is inlined in the parent node, then all of the attributes of the child table are copied into the parent table. The details of how to generate those actions are discussed below.

| Pattern | Actions |
| --- | --- |
| Node: T | create(T) |
| Attri-bute:T.A | update(T.A) |
| | \| decompose decompose(T.value), assign(T_A.parent.T_iid, T.iid)) |
| Link: A→B | assign(A.iid, B.iid) |
| | \| (create(G), assign(A.G_iid, G.iid), assign(G.B_iid, B.iid) |
| | \| (create(G), assign(A.G_iid, G.iid), assign(B.parent_G_iid, G.iid) |
| | \| (create(G), assign(G.parent_A_iid, A.iid), assign(G.B_iid, B.iid) |
| | \| (create(G), assign(G.parent_A_iid, A.iid), assign(B.parent_G_iid, G.iid) |
| | \| assign(A.attribute, B.attribute) |

As described with respect to FIG. 14, an XML document 12 in the DOM model 300 consists of nodes 302 and links 304, but it is desired to load the XML data 16 into the relational tables 20 according to the generated schema 22 of the relational database 14. Therefore, mappings are needed between the XML document 12 and the relational tables 20 of the relational database 14.

Beneficially, those needed mappings are captured in the pattern-mapping table 36, which capture the mapping between patterns to the loading actions. Because some of the actions create tuples, and some actions use those tuples, the order in the mapping field of the pattern-mapping table 36 is very important.

FIGS. 9–11

The pattern-mapping table 36 is generated right after the metadata is loaded, and modified during the restructuring. The generation of the pattern-mapping table 36 during each step of the schema-generation process will now be discussed as indicated by the step of initializing the pattern mapping table 36 identified by reference number 58 in FIG. 2 with reference to FIGS. 9–11.

Turning to FIG. 9, the process of initializing the pattern mapping table as identified in FIG. 2 by reference number 58 can be described by two general steps: first, initializing the link table as shown by reference number 168 and then initializing the pattern mapping table as shown by reference number 170.

Turning to FIG. 10, the step of initializing the link table identified by reference number 168 in FIG. 9 is described in further detail. Processing moves to step 172 in which a first link table is created (e.g., the initial link table is referred to as Link0). A proposed SQL statement to accomplish this task is shown in note 174 associated with step 172 in FIG. 10.

Processing then moves to step 176 and which a variable to control the number of iterations is initialized, namely, iteration_number equals zero. Processing then moves to step 178 in which the number of groups from the link table, i.e., the recordset returned in step 172, is retrieved. A proposed SQL statement to accomplish this task is shown in note 180 associated with step 178 in FIG. 10.

Processing then moves to decision block 182 in which it is determined whether additional groups (beyond the first) need to be processed. If not, processing ends. If so, processing moves to step 184 in which the iteration control number iteration_number is incremented. Processing then moves to step 186 in which additional link tables are created (i.e., Link1, Link2, Link3 . . . ) for each of the additional iterations. A proposed SQL statement to accomplish this task is shown in note 188 associated with step 186 in FIG. 10.

Processing then moves to step 190 in which the number of groups is selected from the next newly-created link table. A proposed SQL statement to accomplish this task is shown in note 192 associated with step 190 in FIG. 10. Processing then moves to decision block 194 to determine whether additional groups need to be processed. If so, processing returns to step 184. If not, processing moves to step 196 in which the most recently-created link table is loaded into the link pattern table which is reflected in the process steps of FIG. 11. After step 196, processing ends.

Turning to FIG. 11, processing moves to step 198 in which all of the ELEMENT and PCDATA items from the DTDM-Item tables 90 are returned in the recordset. Processing then moves to step 200 which initiates a loop for each item returned in the recordset generated in step 198. Processing then moves to step 202 in which one tuple corresponding to these items is created in a CreateAction table (see FIG. 1B for the interrelation of the CreateAction table with the rest of the pattern mapping tables 36). Processing then moves to step 204 in which mapping corresponding to the tuple generated in step 202 is inserted into the pattern-mapping table 36. Processing then moves to decision block 206 in which it is determined whether additional items of the recordset returned in step 198 need to be processed. If so, processing returns to step 200. If not, processing moves to step 208 in which a query is performed on the DTDM-Attribute table 92 to return a recordset containing all of the attributes thereof. Processing then moves to step 210 in which a loop is initiated for each attribute returned in the recordset generated in step 208. Processing then moves to step 212 in which a tuple is created in an UpdateAction table (see FIG. 1B for the interrelation of the UpdateAction table with the rest of the pattern mapping tables 36). Processing then moves to step 214 in which mapping corresponding to the tuple generated in step 212 is inserted into the pattern mapping table. Processing then moves to decision block 216 which determines whether additional attributes of the recordset generated in step 208 need to be processed according to the loop 210. If so, processing returns to step 210. If not, processing moves to step 218.

In step 218, a query is performed on a LinkPattern table (see FIG. 1B for the interrelation of the LinkPattern table with the rest of the pattern mapping tables 36) to return a recordset containing all of the links thereof. Processing then moves to step 220 in which a loop is initiated for each link returned in the recordset generated in step 218. Processing then moves to step 222 in which a query is performed to determine all of the groups involved in this particular link. Processing then moves to step 224 in which a loop is initiated for the name of each group.

Processing then moves to step 226 in which a query is performed to determine a unique identifying action_ID. Once this unique action_ID is determined, processing moves to step 228 in which a tuple is created in the CreateAction table with the unique action_ID. Processing then moves to step 230 in which the tuple is inserted into the pattern matching table 36. After which, processing moves to decision block 232 in which it is determined whether additional groups need to be processed for the name of each group. If so, processing returns to step 224. If not, processing moves ahead to step 234. At step 234, a query is performed to determine all of the (from, to) pairs for this particular link of the loop initiated at step 220. This can be stored in the form of a recordset. Processing then moves to step 236 which initiates a loop for each pair generated in the recordset developed at step 234. Processing then moves to step 238 in which an assigned action is created corresponding to that (from, to) pair. Processing then moves to 240 in which this assigned action is inserted into the pattern mapping table 36 corresponding to the data developed in step 238.

Processing then moves to decision block 242 in which it is determined whether additional pairs need to be processed in the loop initiated at step 236. If so, processing returns to step 236. If not, processing moves to decision block 244 in which it is determined whether additional links need to be processed in the loop initiated at step 220. If so, processing returns to step 220. If not, processing ends.

By way of summary, the pattern mapping tables 36 are initialized by putting the generated pattern and the corresponding actions together. For all of the node patterns, e.g., T, put action create (T). For all of the attribute patterns, e.g., T.A, put action update (T.A). For the link pattern, e.g., A→B, there are different cases. If the link pattern is not related to a group, then based on the mapping rule, if the relationship is one-to-one, then put assign(A.B_iid, B.iid), if the relationship is one-to-many, then put assign(B.parent_A_iid, A.iid). If the link pattern is related to a group G, then put G first, then handle the relationship between A→G and G→B separately as described before.

There are two types of reorganizations of metadata mentioned herein. One type is intended for identity sets—the result of which is to convert some attributes into items. The effect of this operation on the pattern-mapping table 36 follows. If an attribute A of item I is changed into item I_A with attribute value, then the corresponding actions for that attribute is preferably changed as follows:

decompose(I_A.value),
assign(I.A.parent_I_iid, I.iid)

For example, the contactauthors.authorIDs is changed to an item named contactauthors_authorIDs. Hence the action for attribute pattern contactauthors.authorIDs changes to:

decompose(contactauthors.authorIDs.value),
assign(contactauthors_authorIDs.parent contactauthors_iid,
contactauthors.iid)

The second type is for inline attributes, which essentially copies the attribute of one item into another item. Hence, if we assume item B is inlined as attributes of item A, and B has C1, ..., Cn as attributes then all of the assigned loading actions are queried for in the format of assign(A.B_iid, B.iid), which generates a one-to-one relationship between items A and B. Then, all of the attributes of item B are retrieved from the DTDM-Attribute table 92. Then, for every attribute $C_i$ of Item B, the action is replaced with:

assign(A.B.$C_1$, B.$C_1$),
assign(A.B.$C_2$, B.$C_2$),
...
assign(A.B.$C_n$, B.$C_n$), For example, if PCDATA is inlined, then, for the booktitle→PCDATA link pattern, the following actions result:

assign(booktitle.PCDATA_value, PCDATA.value)

The schema now needs to be cleaned up by replacing all actions with a *(.*)+.PCDATA_value pattern with *(.*)+.

The pattern mapping table 36 generated from the metadata described in the example follows:

| Pattern | Actions |
| --- | --- |
| PCDATA | create(PCDATA) |
| book | create(book) |
| booktitle | create(booktitle) |
| article | create(article) |
| title | create(title) |
| contactauthors | create(contactauthors) |
| monograph | create(monograph) |
| editor | create(editor) |
| author | create(author) |
| name | create(name) |
| firstname | create(firstname) |
| lastname | create(lastname) |
| affiliation | create(affiliatiOn) |
| contactauthors.authorIDS | update (contactauthor.authorIDs) |
| editor.name | update(editor.name) |
| author.id | update(author.id) |
| PCDATA.value | update(PCDATA.value) |
| book→booktitle | assign(book.booktitle_iid, booktitle.iid) |
| book→author | create(G1), assign(book.G1_iid, G1.iid), assign(author.parent_G1_iid = G1.iid) |
| book→editor | create(G1), assign(book.G1_iid, G1.iid), assign(G1.editor.iid, editor.iid) |
| booktitle→PCDATA | assign (booktitle.PCDATA_iid, PCDATA.iid) |
| article→title | assign(article.title_iid, title.iid) |
| article→author | create(G2), assign(G2.parent_article_iid, article.iid), assign(G2.author_iid, author.iid) |
| article→affiliation | create(G2), assign(G2.parent_article_iid, article.iid), assign(G2.affiliation_iid, affiliation.iid) |
| article→contactauthors | assign (article.contactauthors_iid, contactauthors.iid) |
| title→PCDATA | assign(title.PCDATA_iid, PCDATA.iid) |
| monograph→title | assign(monograph.title_iid, title.iid) |
| monograph→author | assign(monograph.author_iid, author.iid) |

-continued

| Pattern | Actions |
|---|---|
| monograph→editor | assign(monograph.editor__iid, editor.iid) |
| editor→book | create(G3), assign(G3.parent__editor__iid, editor.iid), assign(G3.book__iid, book.iid) |
| editor→monograph | create(G3), assign(G3.parent__editor__iid, editor.iid) assign(G3.monograph__iid, monograph.iid) |
| author→name | assign(author.name__id, name.iid) |
| name→firstname | assign(name.firstname__iid, firstname.iid) |
| name→lastname | assign(name.lastname__iid, lastname.iid) |
| firstname→PCDATA | assign(firstname.PCDATA__iid, PCDATA.iid) |
| lastname→PCDATA | assign(lastname.PCDATA__iid, PCDATA.iid) |
| affiliation→PCDATA | create(AG), assign(A.G.parent__affiliation__iid, affiliation.iid), assign(AG.PCDATA__iid, PCDATA.iid) |
| affiliation→book | create(AG), assign(AG.parent__affiliation__iid, affiliation.iid), assign(AG.book__iid, book.iid) |
| affiliation→booktitle | create(AG), assign(AG.parent__affiliation__iid, affiliation.iid), assign(AG.booktitle__iid, booktitle.iid) |
| affiliation→article | create(AG), assign(AG.parent__affiliation__iid, affiliation.iid), assign(AG.article__iid, article.iid) |
| affiliation→title | create(AG), assign(AG.parent__affiliation__iid, affiliation.iid), assign(AG.title__iid, title.iid) |
| affiliation→contractauthors | create(AG), assign(AG.parent__affiliation__iid, affiliation.iid), assign(AG.contactauthors__iid, contactauthors.iid) |
| affiliation→monograph | create(AG), assign(AG.parent__affiliation__iid, affiliation.iid), assign(AG.monograph__iid, monograph.iid) |
| affiliation→editor | create(AG), assign(AG.parent__affiliation__iid, affiliation.iid), assign(AG.editor__iid, editor.iid) |
| affiliation→author | create(AG), assign(AG.parent__affiliation__iid, affiliation.iid), assign(AG.author__iid, author.iid) |
| affiliation→name | create(AG), assign(AG.parent__affiliation__iid, affiliation.iid), assign(AG.name__iid, name.iid) |
| affiliation→firstname | create(AG), assign(AG.parent__affiliation__iid, affiliation.iid), assign(AG.firstname__iid, firstname. iid) |
| affiliation→lastname | create(AG), assign(AG.parent__affiliation__iid, affiliation.iid), assign(AG.lastname__iid, lastname.iid) |
| affiliation→affiliation | create(AG), assign(AG.parent__affiliation__iid, affiliation.iid), assign(AG.affiliation__iid, affiliation.iid) |

Then, the following pattern-mapping table results:

| Pattern | Actions |
|---|---|
| PCDATA | create(PCDATA) |
| book | create(book) |
| booktitle | create(booktitle) |
| article | create(article) |
| title | create(title) |
| contactauthors | create(contactauthors) |
| monograph | create(monograph) |
| editor | create(editor) |
| author | create(author) |
| name | create(name) |
| firstname | create(firstname) |
| lastname | create(lastname) |
| affiliation | create(affiliation) |
| contactauthors.authorIDS | decompose(contactauthors__authorIDs.value), assign(contactauthors__authorIDs.parent__.contactauthors__iid, contactauthors.iid) |
| editor.name | update(editor.name) |
| author.id | update(author.id) |
| PCDATA.value | update (PCDATA.value) |
| book→booktitle | assign(book.booktitle__iid, booktitle.iid) |
| book→author | create(G1), assign(book.G1__iid, G1.iid), assign(author.parent__G1__iid = G1.iid) |
| book→editor | create(G1), assign(book.G1__iid, G1.iid), assign(G1.editor.iid, editor.iid) |
| booktitle→PCDATA | assign(booktitle.PCDATA__value, PCDATA.value) |
| article→title | assign(article.title, title.PDATA__value) |
| article→author | create(G2), assign(G2.parent__article__iid, article.iid), assign(G2.author__iid, author.iid) |
| article→affiliation | create(G2), assign(G2.parent__article__iid, article.iid), assign(G2.affiliation__iid, affiliation.iid) |
| article→contactauthors | assign(article.contactauthors__iid, contactauthors.iid) |
| title→PCDATA | assign(title.PCDATA__value, PCDATA.value) |
| monograph→title | assign(monograph.title, title.PCDATA__value) |
| monograph→author | assign(monograph.author__iid, author.iid) |
| monograph→editor | assign(monograph.editor__iid, editor.iid) |
| editor→book | create(G3), assign(G3.parent__editor__iid, editor.iid), assign(G3.book__iid, book.iid) |
| editor→monograph | create(G3), assign(G3.parent__editor__iid, editor.iid) assign(G3.monograph__iid, monograph.iid) |
| author→name | assign(author.name__firstname, name.firstname), assign(author.name__lastname, name.lastname) |
| name→firstname | assign(name.firstname, firstname.PCDATA__value) |
| name→lastname | assign(name.lastname, lastname.PCDATA__value) |
| firstname→PCDATA | assign(firstname.PCDATA__value, PCDATA.value) |
| lastname→PCDATA | assign(lastname.PCDATA__value, PCDATA.value) |
| affiliation→PCDATA | create(AG), assign(A.G.parent__affiliation__iid, affiliation.iid), assign(AG.PCDATA__iid, PCDATA.iid) |
| affiliation→book | create(AG), assign(AG.parent affiliation iid, affiliation.iid), assign(AG.book__iid, book.iid) |
| affiliation→booktitle | create(AG), assign(AG.parent affiliation iid, affiliation.iid), assign(AG.booktitle__iid, booktitle.iid) |
| affiliation→article | create(AG), assign(AG.parent affiliation iid, affiliation.iid), assign(AG.article__iid, article.iid) |
| affiliation→title | create(AG), assign(AG.parent affiliation iid, affiliation.iid), assign(AG.title__iid, title.iid) |
| affiliation→contactauthors | create(AG), assign(AG.parent affiliation iid, affiliation.iid), assign(AG.contactauthors__iid, contactauthors.iid) |
| affiliation→monograph | create(AG), assign(AG.parent affiliation iid, affiliation.iid), assign(AG.monograph__iid, monograph.iid) |
| affiliation→editor | create(AG), assign(AG.parent affiliation iid, affiliation.iid), assign(AG.editor__iid, editor.iid) |
| affiliation→author | create(AG), assign(AG.parent affiliation iid, affiliation.iid), assign(AG.author__iid, author.iid) |
| affiliation→name | create(AG), assign(AG.parent affiliation iid, affiliation.iid), assign(AG.name__firstname, name.firstname), assign (AG.name__lastname, name.lastname) |
| affiliation→firstname | create(AG), assign(AG.parent affiliation iid, affiliation.iid), assign(AG.firstname, firstname.PCDATA-value) |
| affiliation→lastname | create(AG), assign(AG.parent affiliation iid, affiliation.iid), assign(AG.lastname, lastname.PCDATA__value) |
| affiliation→affiliation | create(AG), assign(AG.parent affiliation iid, affiliation.iid), assign(AG.affiliation__iid, affiliation.iid) |

FIGS. 12–14

The step of loading the XML data 16 of the document 12 into the tables 20 of the relational database 14 (identified by reference number 60 in FIG. 2) will now be described in greater detail with respect to FIGS. 12–13. Turning to FIG. 12, the step of loading the document 12 into the tables 20 of the relational database 14 generally involves traversing the element tree shown in FIG. 14. A simple recursive function is shown by example in FIGS. 12–13 which initiates with step 246 and receives input of the type shown in the note 248 associated with step 246 in FIG. 12. This process then calls a function visit node with the arguments of (root, 0). This function essentially assists the loader 30 in walking through the element tree. Processing then moves to step 250 where this process ends. Turning to FIG. 13, the steps performed in the visit_node function are shown in greater detail in which processing moves to step 252 which receives input shown in a note 254 associated with step 252 in FIG. 13. Processing then moves to decision block 256 in which it is determined whether the variable root is equal to a null value. If so, processing ends. If not, processing moves to step 258 in which a vector variable action_vector is set equal to a method result of the function called therein.

Processing then moves to step 260, which calls a function to execute all actions relative to the particular root and vector of the particular node 302 at issue. Processing then moves to step 262, which queries the appropriate attributes table to return a recordset containing all attributes of the particular node 302 being visited. Processing then moves to step 264, which initiates a loop for each of the attributes of the particular node and, in turn, processing moves to step 266 in which each attribute of that node is visited. Processing moves to decision block 268, which determines whether additional attributes need to be processed for this node 302. If so, processing returns to step 264. If not, processing moves to step 270.

At step 270, all of the children of the particular node 302 being visited are determined. Then processing moves to step 272, which initializes a position variable. Processing then moves to step 274, which initiates a loop for each child of the particular node 302 being visited. At step 276, the position variable initiated at step 272 is incremented. Processing then moves to step 278, which calls a function to visit each of the nodes 302 comprising children of the particular node (essentially this traverses the tree in a style shown in FIG. 14). Next, each of the links corresponding to the particular node 302 are visited in step 280. Processing then moves to decision block 282 which determines whether additional children need to be processed for this node 302. If yes, processing returns to step 274. If not processing terminates at step 284.

In general, to load an XML document 12, a created XML tree is traversed, such as that shown in FIG. 14, although this could include any tree-like structure, e.g., a parser tree in addition to the DOM model shown in FIG. 14, in depth-first and use the pattern-mapping table 36 collected during the mapping of the DTD 18 to determine the disposition of each node 302 and its data.

All of the nodes 302 are visited to the lowest levels of the tree model 300 and all of the edges 304 are visited on the way up to the root node (number 1). For every node 302 (or link), its node 302 (or link) pattern is retrieved and the pattern mapping table 36 is queried for the corresponding actions on the tables 20 of the relational database 14. The following listing depicts pseudo-code for the loading algorithm:

```
MODULE data_loading
VARIABLES:
    PatternMappingTable plt;
    RelationalTables rt;
    XMLTree xt;
BEGIN
    VisitNode(xt.getRoot ( )) ;
END
PROCEDURE visitNode
IN
    Node n;
BEGIN
    IF n is NULL
        return;
    ENDIF
    GTE action from the plt based on pattern node n.
    doAction(action) ;
    FOR all the attribute a
        GET action list from the plt based on
        pattern attribute a.
        FOR EACH action
        doAction (action) ;
        END FOR
        FOR ALL the children d of Node n
            visitNode(d) ;
                visitLink(n, d) ;
        END FOR
END FOR
END visitNode
PROCEDURE visitLink
IN:
    Node from, to;
BEGIN
    get action list from the pit based on
    link pattern from → to.
    FOR each action
    doAction(action)
    END FOR
END visitLink
PROCEDURE doAction
IN
    Action act;
BEGIN
    IF action is create(T)
        CREATE a new tuple in that
            table T with the iid and order
    ELSE IF action is update(T.A)
        UPDATE the current tuple of the
            corresponding table T with the
            value of that attribute A.
    ELSE IF action is assign(T.A, S.B)
        UPDATE the last tuple in table T
            field A with value in the
            last tuple of table S column B.
    ELSE IF action is decompose(T.A)
        CREATE multiple tuples in the current table,
            each attribute has a single value.
    END IF
END doAction
END MODULE
```

After the pattern-mapping table 36 is generated, the pattern-mapping table 36 can be used to load the XML data 16 into the relational schema 22.

The XML document 12 shown herein relating to Example 1 and as shown as a tree structure in FIG. 14 can be used as an example of how the relational database 14 can be loaded with the data 16 including the step of traversing the node tree 300 shown in FIG. 14.

First (and with reference to FIG. 14 and the pattern-matching table 36 generated in accordance with Example 1), node 1 is encountered, which is an article type node. In response, the element pattern "article" is queried in the pattern mapping table 36. From the pattern mapping table 36, a recordset result may be returned which may include: "create (article)". This implicates the loading action create discussed earlier—therefore, one new tuple is created in table "article" with two fields: iid: 1, and order: 1.

Next, the first child of node 1 is visited, which is of type "title". Again, the pattern matching table 36 is queried once again which would return the pattern "create(title)". A new tuple is thereby created in table "title", with two fields: iid: 1, and order: 2. Then, the child of this node is visited, which is node 3 of type PCDATA. Again the pattern mapping table 36 is queried, and, responsively, a new tuple is created in the PCDATA table with three fields: iid: 1, order: 3. Then, any value attributes of the node are visited. By again querying the attribute portion of the pattern mapping table 36, the value: "XML Relation Mapping" will be filled into the "PCDATA" table in the column "value".

Then, the link between node 3 and node 2 is visited, which is the link pattern "title→PCDATA". The corresponding action "assign(title.PCDATA_value, PCDATA.value)" would be returned. Therefore, the "value" field of this tuple is placed in PCDATA, i.e., "XML Relation Mapping" into the "title" table, so that the field in table "title" is updated with the value "XML Relation Mapping".

Then, the link between node 2 and node 1 is visited, upon which the link pattern "article→title" would be returned from the pattern matching table 36. The corresponding action is "assign(article.title, title.PCDATA_value)". Hence, the "title" field in the tuple in "article" table is updated with the value "XML Relation Mapping". Of course, the loading of the remainder of the nodes in the DOM tree 300 in FIG. 14 would follow in due course to load the entire contents of the data 16 in the document 12.

It should be noted that, because the elements of the data are the basic units in the XML document 12, the system 10 should still store the data of the corresponding elements into their tables during the loading process. However, in the case of inline attributes, if the element is in-lined into an attribute, then the table of that element is no longer used after the loading. Therefore, those unused tables could be deleted after loading the data. The following table shows the result of the data loading in the relational tables:

article

| iid | Order | title | contactauthor.idd |
|---|---|---|---|
| 1 | 1 | XML Relation Mapping | 1 | contactauthors

| iid | Order |
|---|---|
| 1 | 48 | author

| iid | order | id | name_firstname | name_lastname | parent_GI_idd |
|---|---|---|---|---|---|
| 1 | 4 | xz | Xin | Zhang | |
| 2 | 12 | gm | Gail | Mitchell | |
| 3 | 20 | wl | Wang-chien | Lee | |

G2

| iid | parent_article.iid | author.idd | affiliation.idd |
|---|---|---|---|
| 1 | 1 | 1 | 1 |

-continued

| 2 | 1 | 2 | 2 |
| 3 | 1 | 3 | 3 | contactauthors.authorIDS

| iid | Value | Parent_contactauthors_idd |
|---|---|---|
| 1 | xz | 1 |
| 2 | gm | 1 |
| 3 | wl | 1 | affiliation

| iid | Order |
|---|---|
| 1 | 10 |
| 2 | 18 |
| 3 | 26 |

AG

| iid | PCDATA.value | book-title | title | first-name | last-name | name.first-name |
|---|---|---|---|---|---|---|
| 1 | Department . . . 2280 | | | | | |
| 2 | Verizon . . .02451 | | | | | |
| 3 | Verizon . . . 02451 | | | | | |

AG (continued)

| name.last-name | parent_affiliation.idd | book.idd | contact-authors.idd | monograph.idd | editor.idd | author.idd |
|---|---|---|---|---|---|---|
| 1 | | | | | | |
| 2 | | | | | | |
| 3 | | | | | | |

The following summarizes the metadata tables 34 used and described in this application and discusses these tables as they relate to the invention.

TABLE

| | Description |
|---|---|
| | Storing Original DTD |
| DTDM-Item | Stores the Elements and Groups of the original DTD. |
| DTDM-Attribute | Stores the Attributes of the Elements or Groups of the original DTD. |
| DTDM-Nesting | Stores the Nesting relationships of the original DTD. |
| | Storing Converted DTD |
| IM-Item | Stores the Elements and Groups of a converted DTD. |
| IM-Attribute | Stores the Attributes of the Elements or Groups of a converted DTD. |
| IM-Nesting | Stores the Nesting relationship of a converted DTD. |
| | Storing Table Schemas |
| TS-JC | Stores the Join Constraint information |
| | Keeping Track of Mapping from Original DTD into Converted DTD |
| Pattern | Keeps the patterns. |
| Pattern-Mapping | Keeps the mapping from patterns on the table schema. |

By way of further summary, the present invention contemplates an XML to a relational database mapping approach. This approach is based on storing the DTD 18 into metadata tables 34 and manipulating these tables 34 to generate metadata tables describing a relational schema, and then to generate the relational schema 22 therefrom. Several techniques have been discussed, e.g., identifying sets, inline attributes, and to identify more aspects of XML document generation, and to refine the metadata generated therein. Benefits of the present invention include:

Integrity. The DTD 18 is stored in metadata tables 34: This ensures an integrity constraint when modifying the DTD 18.

Simplicity. The automatic loading of an XML document 12. The pattern-mapping table 36 keeps track of the items and links during all of the steps of refinement of the metadata. Hence, the loading process can load the XML document 12 directly based upon the pattern-mapping table 36.

Capture of semantics and more user-friendly query interface. The identifying sets articulating refinement further expresses multiple-value attributes into tables, in which a user can access each value instead of being able to access the whole value. For example, by breaking the IDREFS type attribute into tables with an IDREF typed column, normal joins can be performed to determine the referenced elements. Not only does this approach have the benefits of using an element type as a table name, but also the inline attribute refinement determines the extra attributes of some element types, which were originally treated as a single element type. For example, booktitle becomes the attribute of book, instead of two tables titled booktitle and book connected by joins. Not only does this keep better semantics in the mapping, but also in the refinement of the mapping. The metadata thereby has been further improved for a better query interface (e.g, being able to query title instead of title.PCDATA_value).

A reusable and scalable method. The mapping approach is anticipated to be useful for the reuse of DTDs and XML documents that have many different DTDs since this mapping approach is performed by the queries on the metadata tables.

Flexibility. Different XML relational mapping could be represented by manipulations on the metadata tables. Hence, the inventive approach extends the automatic loading described herein to work for different kinds of mapping algorithms and even for different types of databases.

Extensible. The present invention has a great deal of potential than merely for mapping and loading of data, as it could also be used for optimizing query performance, extending the query capability on the XML document, reconstructing the XML data for a different DTD, and integrating with other XML data or relational data.

It has been determined by the applicants that a DTD can specify important properties of an XML document including: grouping, nesting, occurrence, element referencing, etc. In order to capture these rich relationships between elements into the relational schema of a relational database, the metadata model proposed herein consists of item, attribute, and nesting relationships. The inventive mapping approach, based on the metadata tables generated herewith, can successfully capture the relationships between elements into constrains in a relational database. For example, the nesting properties are captured as foreign key constraints between different tables. The metadata approach also makes the automatic loading of XML documents into relational tables possible and quite easy.

XML Data Update Synchronization System

For the second portion of this application, a running example of a DTD and a conforming XML document of a simple telephone bill application is employed as set forth below. Like or similar items used between the embodiments of the invention shown in FIGS. 1–14 and those shown with respect to FIGS. 15–30 employ like reference numerals to indicate these common elements.

As can be seen, one invoice contains an account number, a bill period, a list of carriers, a list of itemized calls, and the total balance of this invoice.

The DTD is set forth below in Example 3:

```
<!ELEMENT invoice      (account_number,
                        billperiod,
                        carrier+,
                        itemized_call*,
                        total) >
<!ELEMENT account_number (#PCDATA)>
<!ELEMENT billperiod (#PCDATA)>
<!ELEMENT carrier (#PCDATA)>
<!ELEMENT itemized_call EMPTY>
<!ATTLIST              itemized_call
                       no ID #REQUIRED
                       date CDATA #REQUIRED
                       number_called CDATA #REQUIRED
                       time CDATA #REQUIRED
                       rate (NIGHT|DAY) #REQUIRED
                       min CDATA #REQUIRED
                       amount CDATA #REQUIRED>
<!ELEMENT              total (#PCDATA)>
```

EXAMPLE 3

Example DTD of a Telephone Billing Application

An example of corresponding XML data validated to the above DTD is set forth below as Example 4:

```
<invoice>
<account_number>555 777-3158 573 234 3</account_number>
<bill_period>Jun 9–Jul 8, 2000</bill_period>
<carrier>Sprint </carrier>
<itemized_call no="1" date="JUN 10" number called="973 555-8888"
    time="10:17pm"     rate="NIGHT"     min="1"
    amount="0.05"/>
<itemized_call no="2" date="JUN 13" number called="973 650-2222"
    time="10:19pm"     rate="NIGHT"     min="1"
    amount="0.05"/>
<itemized_call no="3" date="JUN 15" number called="206 365-9999"
    time="10:25pm"     rate="NIGHT"     min="3"
    amount="0.15"/>
<total>$0.25</total>
</invoice>
```

EXAMPLE 4

Example XML Validated to the DTD of Example 3 (Above)

FIG. 15

Figure 15:
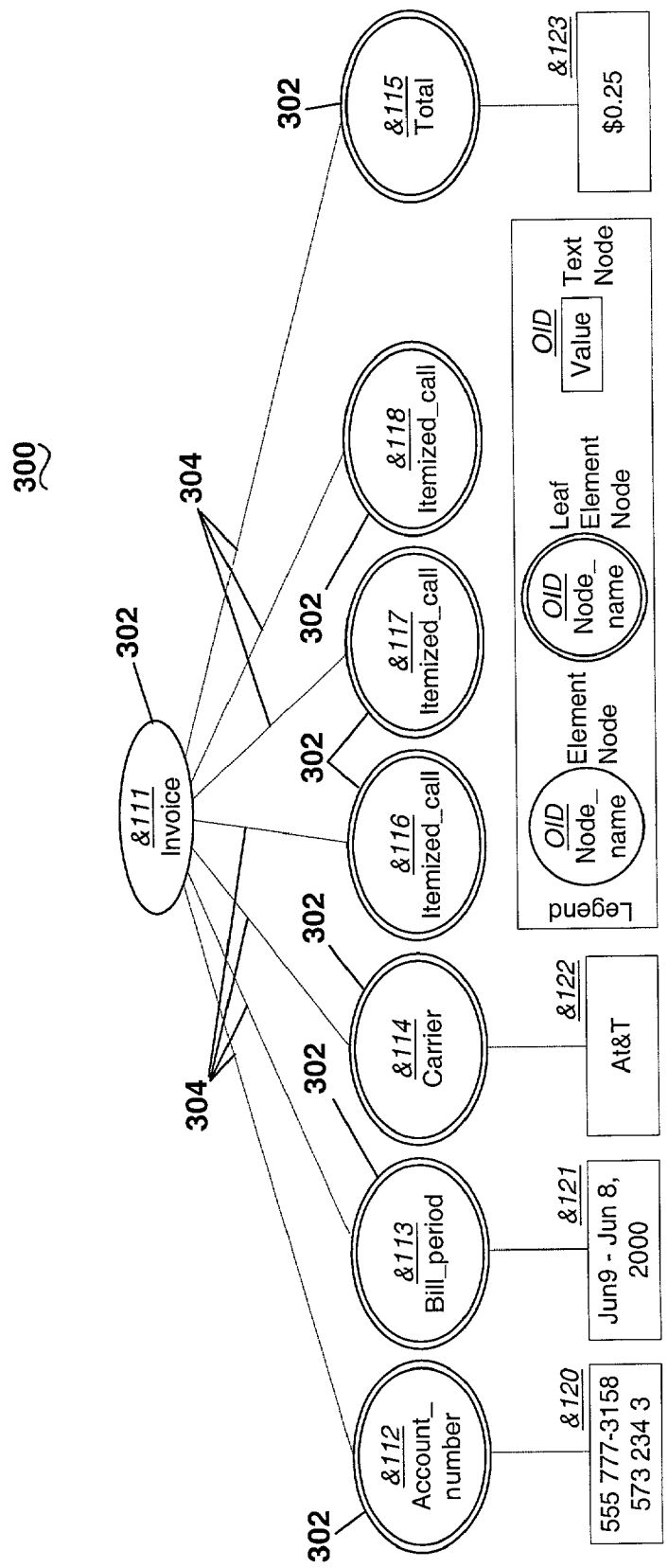
FIG. 15 is a tree representative of another example of XML data compliant to a DTD document in the form of a document object model (DOM) tree.

FIG. 15 is a tree representative of another example of XML data compliant to a DTD document in the form of a document object model (DOM) tree.

The example XML in Example 4 can be represented graphically as a document object model (DOM) tree 300 as set forth in FIG. 15. It will be understood that the attributes of the XML tags have been omitted for purposes of clarity and the ability to set forth the DOM tree in a sufficient space and, if these attributes were included, the DOM tree of FIG. 15 would be similar in nature to that shown with respect to the first examples in FIG. 14. Edges 304 thereof illustrate the nesting relationship between parent and child elements 302.

The DTD-compliant XML data can be queried using various query languages to return a particular recordset representative of the desired data. It will be understood that any reasonable RDBMS-querying language can be employed without departing from the scope of this invention. Examples of appropriate querying languages include SQL, Quilt, XQL, XML-QL, XML Query Language (XQuery), and the like. It has been determined that the XQuery language is a preferable language for use in applications of the type described herein. Accordingly, an example of XQuery language appropriate for querying the XML is set forth below as Example 5:

<mybill>
   FOR $invoice IN /invoice
   LET $amount :=sum($invoice/itemized-call/@amount)
      WHERE $invoice/itemized
   call/@number LIKE '973%' RETURN <total>$amount</total>
</mybill>

EXAMPLE 5

Example XQuery Language for Querying the XML Example in Example 4 (Above) Showing a Query for Getting the Sum of all Amounts Spent to Call the Area Code 973 in the Telephone Bill It will be understood that an appropriately-formed XQuery expression can include the following principle forms:

FLWR expressions: A FLWR expression is composed of FOR, LET, WHERE, and RETURN clauses. A FOR-clause is used for iterations. For each iteration it will bind one or more variables. A LET clause will bind variables without iterations. For example: $invoice and $amount in Example 5. The variables bond in FOR and LET-clauses are filtered by the predicates specified in the WHERE clause. For example: $invoice/itemized_call/@number LIKE '973%' in Example 5. The RETURN clause generates the output of the FLWR expression, e.g., <total>$amount</total> in Example 5.

Path expressions: These expressions use the abbreviated syntax of the well-known convention XPath, e.g., the element "/invoice" in Example 5.

Element constructors: An element constructor consists of a start tag and an end tag, e.g., <mybill> . . . </mybill> in Example 5 wraps the query result into new XML elements.

For the purposes of brevity, further details of XQuery are not illustrated, such as expressions involving operators and functions, conditional expressions, quantified expressions, filtering, functions, user-defined datatypes, operations on datatypes, and querying relational data as these items would be within the purview of one skilled in the art.

FIG. 16

Figure 16:
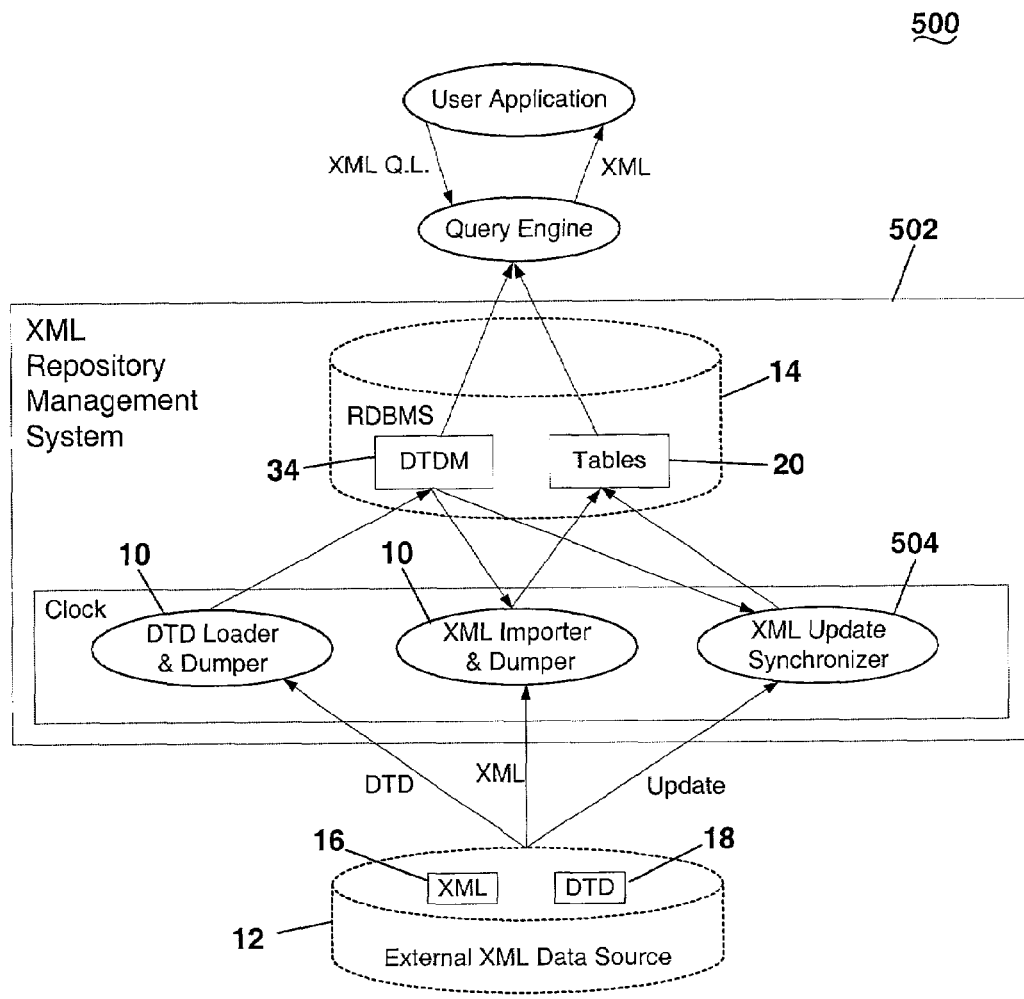
FIG. 16 is a schematic view of a RDBMS loader and data synchronizer according to the invention comprising a DTD Loader, an XML Importer and Dumper and an XML Update Synchronizer for receiving XML data from an external source and updating a relational database formed earlier from an XML document compliant to a DTD.

FIG. 16 is a schematic view of a RDBMS loader and data synchronizer 500 according to the invention. The loader and data synchronizer 500 comprises an XML repository management system 502 which stores a RDBMS 14 having metadata tables and generated relational tables 34 and 20, respectively. The repository system 502 includes a DTD Loader and an XML Importer and Dumper which can include, at least in part, the system and method described above with respect to FIGS. 1–14. The repository system 502 also includes an update synchronizer 504 for receiving XML data from an external source 12 and updating a relational database 20 formed earlier from an XML document 16 compliant to a DTD 18 (not necessarily the same source as the updating XML document shown in FIG. 16).

In this section, we introduce the basic architecture of the loader and data synchronizer 500, which acts as middleware between external updates to XML documents 16 and an information system's internal relational storage 20. FIG. 16 depicts the basic architecture of the loader and data synchronizer 500 composed of a DTD loader, XML importer, and XML update synchronizer.

As described above, the DTD Loader and Dumper loads a DTD, provided by an external source, into the RDBMS 14, and stores it as metadata in what is called the DTDM tables 34. The DTDM tables 34 are used by the other components of the system 500 to identify the relational schema 22 in which the XML data has been represented to facilitate the import, synchronization, or loading process as well as regenerating the DTDM tables 34 as DTD documents.

The XML Importer and Dumper imports external XML data 16 losslessly into the relational database 20 preferably using a fixed mapping approach, although other approaches are also feasible using some flexible mapping technology, as well as regenerating the relational tables 20, which have been previously loaded, out as XML documents.

The main feature of the invention outlined in FIGS. 15–30 is the XML update synchronizer 504 that is responsible for synchronizing external XML data sources 12 with internal relational data, such as that stored in the RDBMS 14. The update synchronizer 504 is based on the same mapping approach used by the XML importer as described above with respect to FIGS. 1–14. By way of summary, four XML update primitives are provided that can be used to notify the system 500 of updates to the external XML data sources 12. Those primitive changes are then propagated into updates to the relational data storage 20.

It is assumed that updates on external XML data sources 12 by third-party applications are submitted to the loader and data synchronizer system 500 expressed as either DOM updates with each element identified by an object ID or by a known query syntax (such as XQuery). Then, the loader and data synchronizer system 500 translates the DOM updates and/or XQuery updates into a small set of update primitives disclosed herein using an XPath expression as identification of XML elements for the update. Thereafter, the update primitives are propagated by the synchronizer system 500 to the internal relational data storage 20 as described below.

To import XML documents 12 into an RDBMS 14, one first step is to identify a relational schema 22 for the XML documents 12. It is assumed that each document 16 conforms to a DTD 18, and the DTD 18 is used to determine the schema 22 in a manner such as that described above with respect to FIG. 14. Information extracted from the DTD 18 is first stored in metadata tables as described below, and then a mapping protocol is applied for creating a relational schema 22 from this metadata.

The task of incremental validation of an XML update for a valid XML document 12 (with associated DTD 18) requires understanding the components of, and relationships within, the document 12 which have been set forth above.

These properties and relationships illustrate that a DTD not only defines element types for (conforming) XML documents, but also provides valuable information about relationships between elements. The challenges of mapping a DTD 18 to the relational model 14 arise from the mismatch in types of properties and relationships embedded in DTDs versus those that can be modeled by relations.

For example, a DTD 18 can specify optional elements and repeatability of elements by using quantifiers, whereas a relational schema cannot. Also, rows and columns in a relational table are not ordered (although a particular relational implementation may impose an order), whereas the order of elements in XML documents 12 must be maintained as specified in group property. Note that these kinds of properties and relationships specified by a DTD 18 are, in effect, constraints on the data that thus must be maintained the system 500 as well as enforced.

This information is captured in metadata, which is explicitly stored and thus queryable in a relational database 14. An additional benefit of this approach is that the model mapping between the DTD 18 and relational tables 14 can be tracked as metadata for use in data loading, query optimization, and updates as further explained below.

In order to be able to make use of the above characterized metadata and constraints expressed in DTDs, the DTD information is stored into relational tables as well as the XML data. This provides a uniform interface for tools such as the importer and synchronizer 10, 500 and 502 to access both data and metadata, namely, via an appropriate query language, such as SQL. It will be understood that the size of the DTD metadata is typically small in comparison to the size of the data in the XML documents to be imported. Hence, in most cases, the metadata can be completely cached in the memory to be accessed efficiently.

As discussed above, three relational tables, called the DTD Metadata (DTDM) tables, are used to store the DTD properties and constraints (the DTDM-Item table 90, the DTDM-Attribute table 92, and the DTDM-Nesting table 94). Every tuple in the DTDM tables has an unique internal identification stored in the ID field of each table. In addition, the DTDM-attribute table 92 has a PID field, which is stands for "parent ID" to reference to the parent item in the DTDM-item table 90.

The tables beneath this paragraph depict the three DTDM tables for our running Examples 3–4. For example, the itemized-calls item is stored as a tuple with an ID equals to 6 in the DTD-Item table 90. Its attribute date is stored as tuple with an ID equal to 2 in the DTD-Attribute table 92. The nesting relationship between the invoice item and the sub-items itemized-calls are stored as tuples with an ID equal to 4 in the DTDM-Nesting table 94. Also, it can be seen that the items account-number (with ID=3), bill period (with ID=4), carrier (with ID=5), itemized-calls (with ID=6), and total (with ID=7) are all siblings because they have same parent invoice (with ID=2). Please note that the ELEMENT.PCDATA item will always contain a PCDATA item as its one child. Hence in the DTD metadata model, PCDATA item is a leaf item.

The DTDM-Item table 90 according to Examples 3–4:

| ID | Name | Type |
|---|---|---|
| 1 | PCDATA | PCDATA |
| 2 | invoice | ELEMENT.ELEMENT |
| 3 | account_number | ELEMENT.PCDATA |
| 4 | bill_period | ELEMENT.PCDATA |
| 5 | carrier | ELEMENT.PCDATA |

-continued

| ID | Name | Type |
|---|---|---|
| 6 | itemized_calls | ELEMENT.EMPTY |
| 7 | total | ELEMENT.PCDATA |

The DTDM-Attribute table 92 according to Examples 3–4:

| ID | PIID | Name | Type | Default |
|---|---|---|---|---|
| 1 | 6 | no | ID | #REQUIRED |
| 2 | 6 | date | CDATA | #REQUIRED |
| 3 | 6 | number_called | CDATA | #REQUIRED |
| 4 | 6 | time | CDATA | #REQUIRED |
| 5 | 6 | rate | CDATA | #REQUIRED |
| 6 | 6 | min | CDATA | #REQUIRED |
| 7 | 6 | amount | CDATA | #REQUIBED |
| 8 | 1 | value | CDATA | #IMPLIED |

The DTDM-Nesting table 94 according to Examples 3–4:

| ID | FromID | ToID | Ratio | Optional | Index |
|---|---|---|---|---|---|
| 1 | 2 | 3 | 1:1 | false | 1 |
| 2 | 2 | 4 | 1:1 | false | 2 |
| 3 | 2 | 5 | 1:n | false | 3 |
| 4 | 2 | 6 | 1:n | true | 4 |
| 5 | 2 | 7 | 1:1 | false | 5 |
| 6 | 3 | 1 | 1:1 | false | 1 |
| 7 | 4 | 1 | 1:1 | false | 1 |
| 8 | 5 | 1 | 1:1 | false | 1 |
| 9 | 7 | 1 | 1.1 | false | 1 |

FIG. 17

Figure 17:
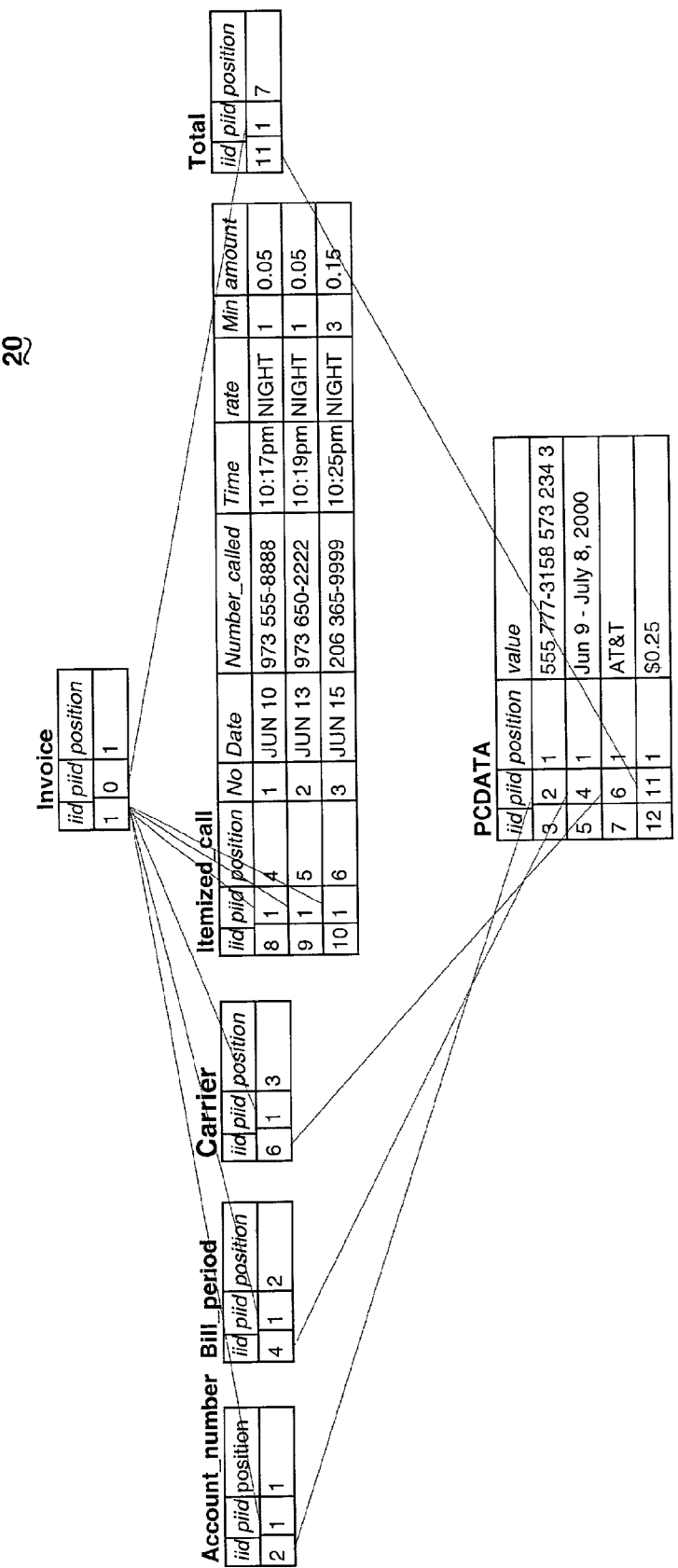
FIG. 17 is a set of relational tables generated from Examples 3–4 set forth below relating to a telephone billing system, wherein the relational tables can be imported from XML compliant to a DTD in the manner set forth according to the invention described in FIGS. 1–14.

FIG. 17 is a set of relational tables generated from Examples 3–4 set forth below relating to a telephone billing system, wherein the relational tables can be imported from XML compliant to a DTD in the manner set forth according to the invention described in FIGS. 1–14.

Once the application tables for this particular DTD have been created as shown in FIG. 17, then the XML importer traverses a DOM tree 300 of a parsed XML document 12 in depth-first order in one single pass, and uses the metadata mapping described above to move the XML data 16 into relational tables 20. FIG. 17 shows the data 16 loaded into the corresponding relational tables 20 for Examples 3–4. The dashed line shows the hierarchical relationships between tuples.

As can be seen in the relational schema 22 created thereby, the mapping captures all the elements and their attributes in the XML document 12. The iid and piid captures the nesting structure in the XML documents 12. Hence, the mapping approach is lossless. This can also be checked by comparing XML documents exported from the relational database 14 with the initally loaded XML documents for a large variety of XML documents and DTDs.

FIG. 18

Figure 18:
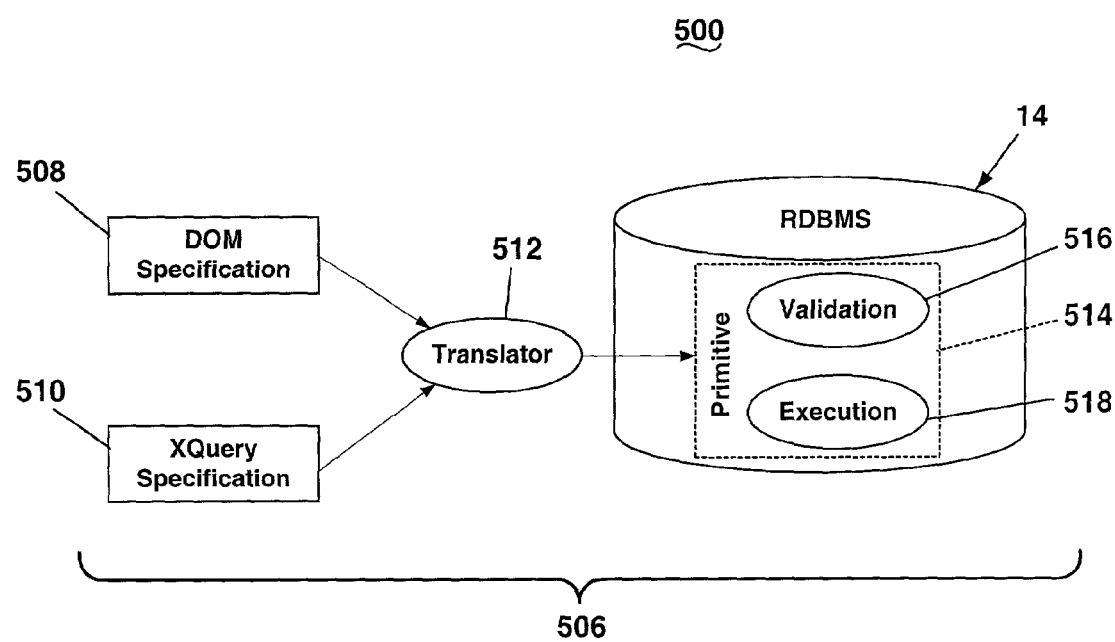
FIG. 18 is a schematic view of a process for propagating updates to a RDBMS according to the system and method set forth in FIG. 16 according to the invention.

FIG. 18 is a schematic view of a process for propagating updates to an RDBMS according to the system and method set forth in FIG. 16 according to the invention.

A synchronizer 506 in the loader and data synchronizer system 500 is responsible for incrementally updating the internal relational data storage to reflect updates to external XML documents 12. FIG. 18 depicts the overall procedure of the update process in the loader and data synchronizer 500. First, the user describes the desired updates in either the DOM update interface 508 or by an extended XQuery update statement 510. Second, a translator 512 translates the update specification 508, 510 into corresponding calls to update primitives 514 that are implemented in a software layer on top of the RDBMS. Each update primitive 514 is composed of two functionalities, namely, an (optional) incremental validation processor 516 and an update propagation processor 518.

The incremental validation processor 516 checks whether the update received from the translator 512 is confirming to the corresponding DTD 18 stored in the DTD metadata tables 90, 92 and 94. Once validated, the execution processor 518 modifies the relational tables 20 of the relational database 14 according to the specified update semantics 508, 510.

The update primitives 514 are now described in greater detail. The update primitives 514 have the following properties:

Data oriented. These update primitives are DTD preserving, i.e., they update XML data but not their DTDs.

Complete. The set completely covers all of the data updates a user could specify at the DOM level.

Consistent. The consistency of internal data storage with external XML data is guaranteed.

Valid. Any update will be validated against the DTD, trapping any incorrect update.

Atomic. The primitives are minimal and cannot be divided.

Interoperable. The primitives can be nested into each other in order to compose a complex update.

The loader and data synchronizer system 500 provides the following four update primitives 514 in terms of XML documents: CreateRootElement, ModifyElement, DeleteLeaf Element, and MoveElement.

According to the invention described herein, the XPath syntax has been extended to treat text as an XML element of type PCDATA. For example, /invoice[1]/carrier[1]/text( ) is converted to /invoice[1]/carrier[1]/PCDATA[1].

XPath syntax, used herein as an example, is used to identify each XML element. Each update primitive 514 returns an XPath expression as will be herein described. In the following update syntax, the return value names are expressed, while the return value types are all XPath expressions.

Create Root Element. The operation CreateRootElement (Element_Type, Attributelist):XPathNewRoot creates a new root element of type Element_Type with specific attributes and returns an XPath expression that uniquely identifies this new element. It is assumed that all of the root elements are ordered under the loader and data synchronizer system 500. At the time it is created, the new root element is not connected to any existing element yet. However, such a connection can be created later by the MoveElement primitive 514 discussed below.

For example, the following call CreateRootElement('PCDATA', {<value, 'Sprint'>}) will create a new PCDATA element, the XPath expression of the new element is: /PCDATA[1]. As can be seen, any element that is created is ordered by its creation order.

Modify Element. This operation ModifyElement (XPathElement, Attribute, Value): XPathElement modifies the attribute (identified by Attribute) of a specific element identified by XPathElement with Value. This function returns XPathElement, which identifies the modified element, as the XPath expression.

For example, the following call ModifyElement('/PCDATA[1]', 'value', 'Sprint PCS') will modify the element's value attribute from its old value, which is Sprint, to new value, which is 'Sprint PCS'. This primitive returns the XPath expression '/PCDATA[1]'.

Delete Leaf Element. This operation DeleteLeafElement (XPathElement):XPathParent deletes the leaf element identified by XPathElement and returns the XPath expression of the parent node of this to-be-deleted element.

For example, the following call DeleteLeafElement('/invoice[1]/carrier[1]/PCDATA[1]') will delete the PCDATA of the element carrier, and return its parent XPath, which is '/invoice[1]/carrier [1]'.

Move Element. The operation MoveElement(XPathFrom, XPathToParent, position):XPathTo moves the element identified by XPathFrom from its parent element to under the parent element identified by XPathToParent into the position position. It will return the new XPath XPathTo identifying the moved element.

As can be understood, an element can be inserted by employing a combination of the update primitives 514 CreateRootElement and MoveElement.

FIG. 19

Figure 19:
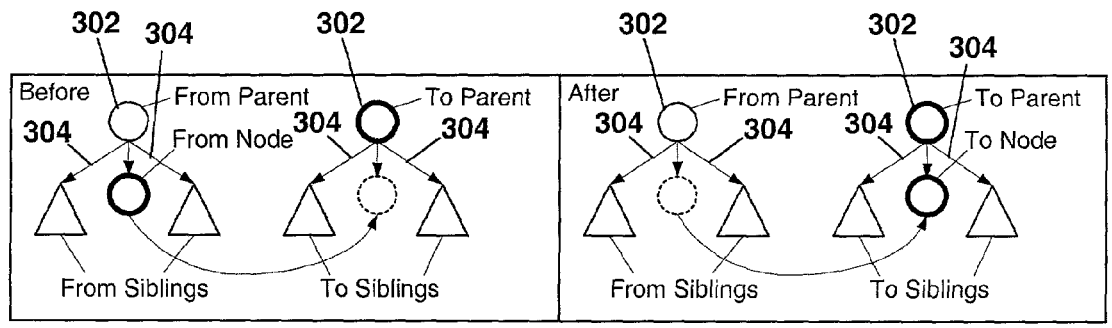
FIG. 19 is a before-and-after schematic view of a process for moving an element of one parent node in a DOM tree to another parent node in the DOM tree (shown by example in FIG. 15) for use in the system and method for updating a relational database with the system of FIGS. 16–18.

FIG. 19 is a before-and-after schematic view of a process for moving an element of one parent node in a DOM tree to another parent node in the DOM tree (shown by example in FIG. 15) for use in the system and method for updating a relational database with the system of FIGS. 16–18.

The MoveElement process is described in greater detail with respect to FIG. 19 wherein the from-node is moved from the from-parent-node to under the to-parent-node at a specific position. The XPathFrom identifies the from-node, and the from-parent-node and the from-siblings can be inferred from the from-node. The input parameter XPathToParent identifies the to-parent-node, and the to-node is identified by XPathToParent and the position. The to-siblings can be inferred from the to-node.

For example, the following call MoveElement( '/PCDATA[1]', '/invoice[1]/carrier[1]', 1) moves the element '/PCDATA[1]' at position 1 to under the element '/invoice [1]/carrier[1]'. It will return the new XPath identification, which is '/invoice [1]/carrier [1]/PCDATA[1]', for the moved element.

It will be understood that the XML updates can be nested within each other because each update primitive can return an XPath expression. Along these lines, the XPath expression can be replaced in the arguments of each update primitive with the return value from other update primitives.

For example, if the examples of the XML data updates primitives introduced earlier were merged into one complicated nested update, the XPath text would read accordingly:

MoveElement( ModifyElement( CreateElement('PCDATA', {<'value', 'Sprint'>}), 'value', 'Sprint PCS'), DeleteLeafElement('/invoice[1]/carrier[1]/PCDATA[1]'), 1)

This complex nested update replaces the original carrier 'AT&T', to the new carrier 'Sprint PCS', which is modified from 'Sprint'.

FIG. 20

Figure 20:
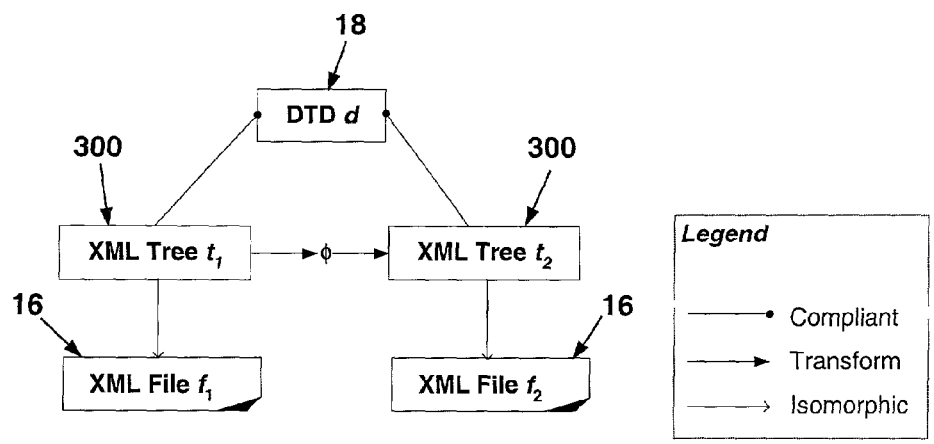
FIG. 20 is a schematic view of a pair of XML documents in the form of DOM trees which are compliant to the same DTD that indicates the transformation of one XML document into another XML document if the documents are compliant with the same DTD, wherein this schematic is useful in understanding how the update primitives in the system and method of FIGS. 16–19 are completed.

FIG. 20 is a schematic view of a pair of XML documents in the form of DOM trees which are compliant to the same DTD that indicates the transformation of one XML document into another XML document if the documents are compliant with the same DTD, wherein this schematic is useful in understanding how the update primitives in the system and method of FIGS. 16–19 are complete.

It is desired to show that the update primitives 514 can perform all of the transformations of DOM updates for any valid XML document 12. The concept of completeness of XML update primitives is defined as:

"Completeness" Definition. If given any two XML documents $f_1$ and $f_2$ valid according to a given DTD d, then there always exists a series of operations composed only of the four operators from the set of update primitives 514 (defined above) that transforms $f_1$ into $f_2$, then it can be said that the set of update primitives 514 is complete.

Recalling that the XML data model is assumed to be a document tree model (DOM), in which ID/IDREF are treated as attributes instead of links between the nodes.

It can thereby be proved that the XML update primitives 514 are complete as defined in the Completeness Definition above. Intuitively, "complete" means that we can transform one validated XML document into any other validated XML document (i.e., validated to the same DTD) through our XML update primitives 514.

Every XML document will have one DOM tree corresponding to it. In transforming a set of XML data, the document trees $t_1$ and $t_2$ are validated against a given DTD d. It is apparent that the DeleteLeafElement primitive could be repeatedly called to remove one existing leaf node of the document tree $t_1$ at a time until the tree $t_1$ is transformed into an empty tree. Then, the document tree $t_2$ could be created in a top-down fashion from scratch by applying the CreateRootElement and MoveElement primitives. Using this approach, any document tree $t_1$ can be transformed into any new tree $t_2$ under the given DTD d. While the internal IDs used in the two trees $t_1$ and $t_2$ may be different, their corresponding XML documents $f_1$ and $f_2$ generated from the trees $t_1$ and $t_2$ will be the same. The incremental validation of the XML data update primitives 514 can be assumed to be disabled during the transformation process. Since the given DTD d can be any DTD, the completeness of the four update primitives 514 is proven.

FIGS. 21–23

Figure 21:
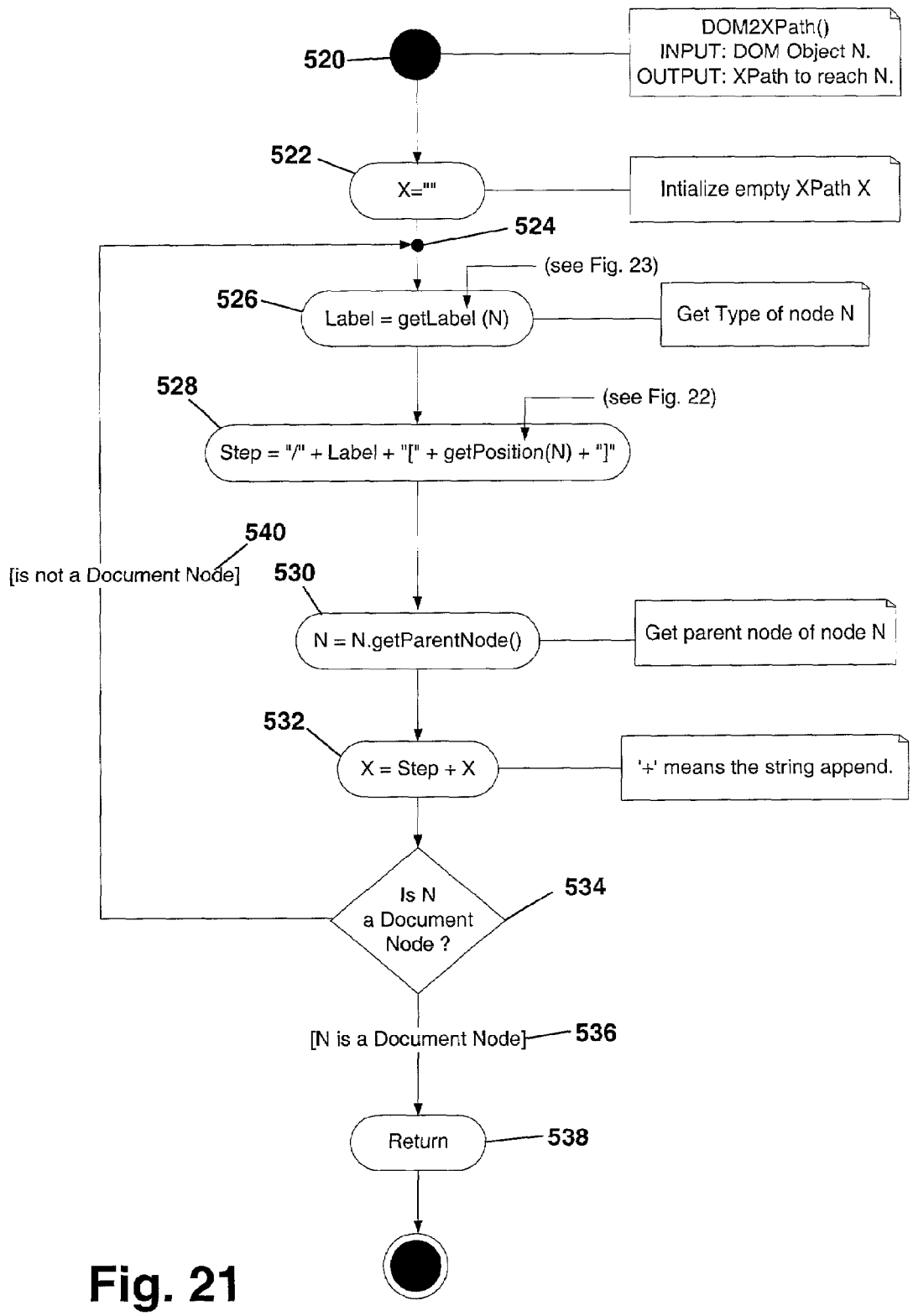
FIG. 21 is a flow chart detailing the steps of converting a DOM tree object identifier into an XPath expression for use in updating an RDBMS in accordance with the invention of FIGS. 16–20.
Figure 22:
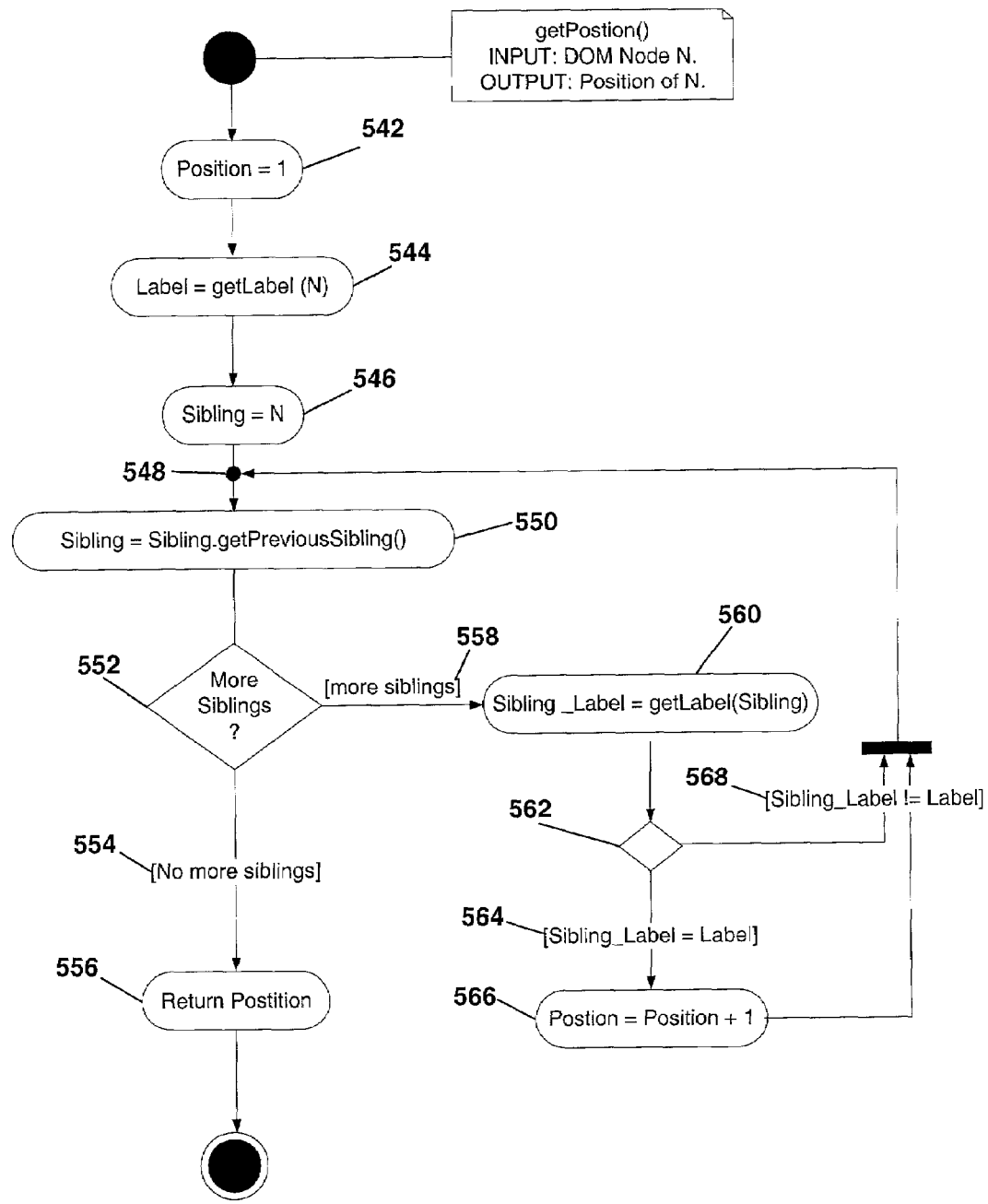
FIG. 22 is a flow chart detailing the steps of determining the position of a selected DOM node in an XPath expression for use in updating an RDBMS in accordance with the invention of FIGS. 16–21.
Figure 23:
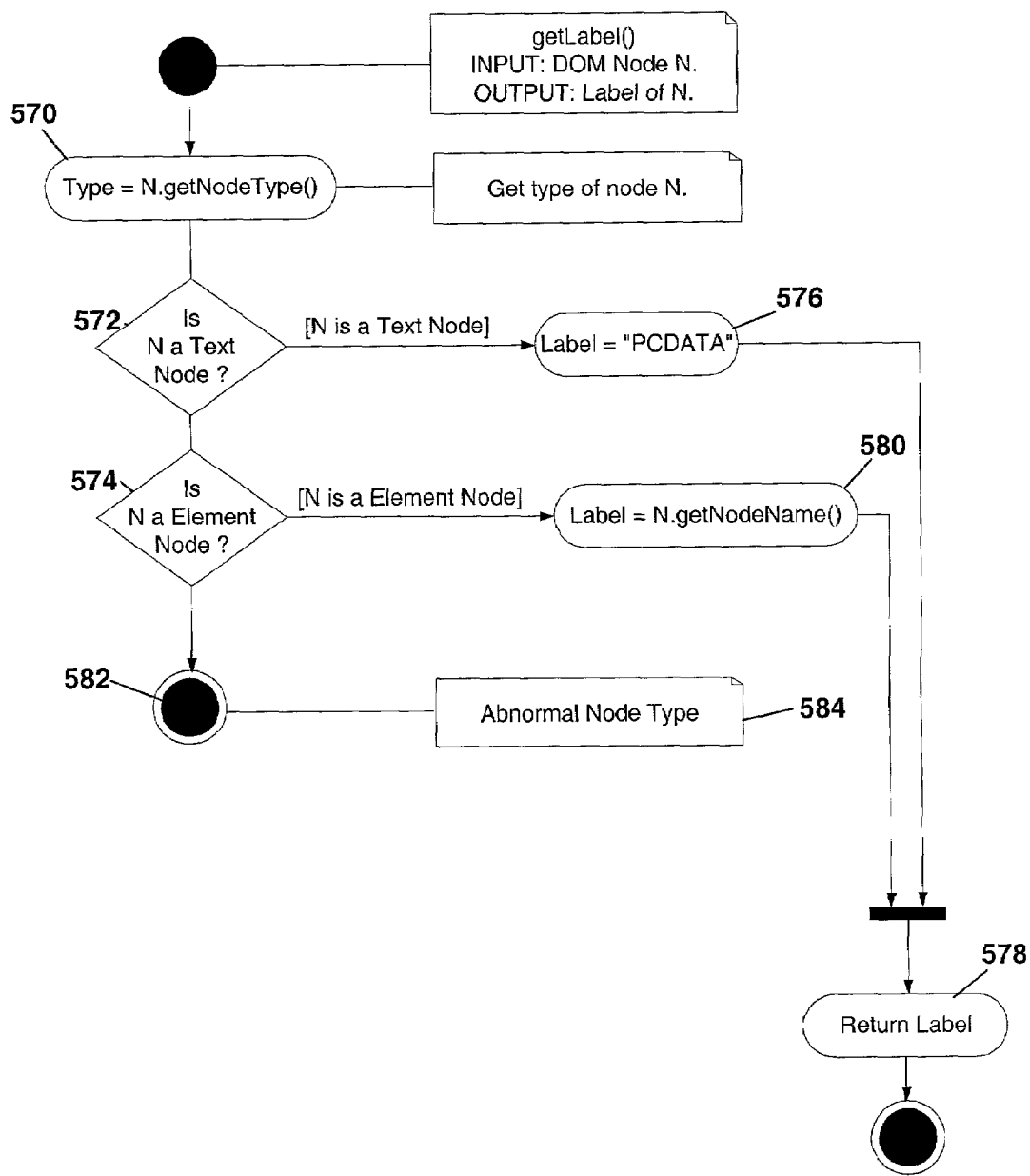
FIG. 23 is a flow chart detailing the steps for determining the position of a selected label of a particular node in an XPath expression for use in updating an RDBMS in accordance with the invention of FIGS. 16–22.

FIG. 21 is a flow chart detailing the steps of converting a DOM tree object identifier into an XPath expression for use in updating an RDBMS in accordance with the invention of FIGS. 16–20. FIG. 22 is a flow chart detailing the steps of determining the position of a selected DOM node in an XPath expression for use in updating an RDBMS in accordance with the invention of FIGS. 16–21. FIG. 23 is a flow chart detailing the steps for determining the position of a selected label of a particular node in an XPath expression for use in updating an RDBMS in accordance with the invention of FIGS. 16–22.

XQuery Extension. An extension of the XQuery language syntax by the four XML data update primitives 514 with the updates as described earlier will now be discussed. In particular, return_Clause grammar included in the XQuery language has been modified to incorporate the update statements. Due to the construction capability of XQuery introduced earlier, there is no need to introduce any additional syntax for the CreateRootElement update. The delete statement will only delete a set of leaf elements. The modify and move statements can be applied on any sets of elements.

In another example, if it is desired to update the carrier from 'AT&T' to 'Sprint' in the billing XML document from Examples 3–4, then the XQuery syntax is as follows:

FOR $carrier IN /invoice/carrier WHERE $carrier='AT&T' MODIFY $carrier WITH 'Sprint'

DOM Update. The JAVA binding of the DOM APIs typically defines a set of DOM data updates as depicted in the table following this paragraph. These updates are redundant and not primitive. For example, the DOM functions Node.setNodeValue( ), Attr.setValue( ), and Element.setAttribute( ) are basically the same, with all three setting the value of an attribute of an element. Also, the functionality of the Text.splitText( ) function overlaps with that of Document.createTextNode( ) and Node.setNodeValue( ).

---

| | |
|---|---|
| returnClause := | RETURN valueExpression \| |
| | updateStatement; |
| updateStatement := | deleteStatement \| |
| | modifyStatement \| |
| | moveStatement; |
| // VAR binds to leaf elements. | |
| deleteStatement := | DELETE VAR; |
| // VAR binds to attributes. | |
| modifyStatement := | MODIFY VAR WITH ArithmeticExpression; |
| // VAR binds to elements. | |
| // PathExpression identify only one Element. | |
| moveStatement := | MOVE VAR BEFORE PathExpression \| |
| | MOVE VAR AFTER PathExpression; |

| DOM Data Updates | Meaning |
|---|---|
| Node.setNodeValue( ) | set the value property of a specific node. |
| Node.insertBefore( ) | insert a new child node to this node before a specific child. |
| Node.removeChild( ) | remove a specific child node. |
| Document.createElement( ) | create a new element in a document. |
| Document.createTextNode( ) | create a new text node in a document. |
| Attr.setValue( ) | set the value of the attribute node. |
| Element.setAttributeNode( ) | set an attribute node of an element node. |
| Text.splitText( ) | split a text node into two text nodes. |

The mapping from DOM data updates to loader and data synchronizer update primitives 514 is listed in the table following this paragraph. For example, Text.splitText( ) takes two parameters: the OID of the node and the offset into text field of the split. The system 500 translates the DOM primitive into the following three loader and data synchronizer 500 update primitives 514: First, the CreateRootElement primitive creates one text element with the right part of the split text, then the ModifyElement primitive updates the current text element to only contain the left part of the split text, and finally, the MoveElement primitive moves the newly created text element to be placed after the original text element.

For another example, the Node.removeChild( ) DOM primitive takes two parameters: OID of the parent node and OID of the removed node. This function has the same effect as the loader and data synchronizer 500 primitive DeleteLeafElement. For the rest of the DOM updates, they are one-to-one mappings to the loader and data synchronizer 500 primitives as depicted below:

| DOM DATA UPDATES | Update Description |
| --- | --- |
| Node.setNodeValue( ) | ModifyElement |
| Node.insertBefore( ) | MoveElemet |
| Node.removeChild( ) | DeleteLeafElement (a subset of) |
| Document.createElement( ) | CreateRootElement |
| Document.createTextNode( ) | CreateRootElement |
| Attr.setValue( ) | ModifyElement |
| Element.setAttributeNode( ) | ModifyElement |
| Text.splitText( ) | ModifyElement, CreateRootElement, |

When an XML update specification is translated into the loader and data synchronizer 500 update primitivies 514, the to-be-updated XML elements must be matched with their underlying relational equivalents. The XPath technology can be employed to uniquely identify an XML element in both the XML document and its matching relational models. On one initial note, it must be discussed how element identifications in both an XQuery and a DOM update statement are translated into an XPath expression, and then how the XPath expression is translated into tables and keys in the relational database.

DOM OID to XPath Expression. We can see that the DOM operations are object-oriented operations, in the sense that every node is identified by its Object Identifier (OID). However, we cannot guarantee that the OID used by the external XML data source will be the same as the internal IID used in the relational storage, because they are generated by two separate systems. To assure identification of the matching elements across these two systems, the identification of items in DOM could be achieved by assuming that the XML data source uses an XPath expression to uniquely identify the to-be-modified node. For example, the XPath expression of the node with OID &116 in FIG. 15 is '/invoice[1]/itemized-call[1]'.

FIG. 21 depicts the DOM2XPath method to get the XPath expression for a given OID in the (Java binding) DOM tree. The tree is traversed backward from the selected node, on which the update occurs, back to the root document node to determine the sequence of labels on the path. The getPosition method of FIG. 22 returns the position of each node on the path. The getLabel method returns the label of each node on the path is given in FIG. 23. Hence, for each given DOM node, the XPath expression that uniquely identifies the given node can be easily determined in accordance with this invention.

Referring now to FIGS. 21–23 in detail, the steps of the XPath generation routine will now be described. This method begins at step 520 in FIG. 21 wherein the path generation method receives the DOM object N as an input parameter (with the objective of producing the XPath as a returned item. Processing then moves to step 522 in which an empty variable X is initialized. Then (while noting return processing intersection point 524), processing moves to step 526 in which a variable Label is initiated to equal the label of N via a returned value from the getLabel function (described in greater detail with respect to FIG. 23). Next, at step 528, a variable Step is initiated to equal a forward slash ("/"), followed by the value of variable Label, followed by a left square bracket ("["), followed by the position in the tree of DOM object N via a returned value of the getPosition function (described in greater detail with respect to FIG. 22), followed finally by a right square bracket ("]").

Processing then moves to step 530 at which variable N is traversed upwardly in the DOM tree by setting variable N equal to the parent object via a call to the Java getParentNode( ) method (i.e., N=N.getParentNode( )). Processing then moves to step 532 at which variable X is set equal to the value of Step followed by the previous value of X (NULL if this is the first pass through DOM2XPath( )).

At this point, decision block 534 is reached at which time it is determined whether variable N is now (i.e., after N was modified in step 530) set equal to a document node (the top node in the DOM tree). If yes, processing moves to step 538 at which time the value of X is returned to the calling item. If not, processing moves to intersection point 524 via return loop 540 to continue preparation of the XPath string until a document node is encountered.

The particular steps performed in the getPosition( ) method will now be described with reference to FIG. 22. The getPosition( ) method receives a DOM tree object N as an input parameter with the objective of returning a numeric value representative of the position of the input object N. Processing begins at step 542 in which a variable Position is initialized at 1. Processing then moves to step 544 in which a variable Label is initialized to the returned value of the getLabel(N) method (described in greater detail with respect to FIG. 23), i.e., Label contains the label of the input variable N to this method.

Next, at step 546, a variable Sibling is set equal to the input variable N. Processing then moves through intersection point 548 to step 550 in which Sibling is set equal to the result of the Java getPreviousSibling( ) method to move the value of Sibling to a previous sibling in the particular level of the DOM tree.

Processing then moves to decision block 552 in which it is tested whether Sibling is at a left end of a particular level in the DOM tree (i.e., Sibling is now NULL). If so, processing moves through decision leg 554 to step 556 where the value of Position is returned to the calling DOM2XPath( ) function. If not, there are more siblings to process, so processing moves through decision leg 558 to step 560 at which time a variable Sibling_Label is initialized to the return value of the getLabel method with respect to the Sibling variable (i.e., getLabel(Sibling)) to obtain the label of the current sibling.

Processing then moves to decision block 562 at which it is tested whether the value of Sibling_Label is equal to Label (i.e., the label of the particular node will not change if it is at the far left position in the tree). If so, processing moves through decision leg 564 to step 566 at which time Position is incremented by one and processing moves to intersection point 548 and back to step 550. If not, processing moves through decision leg 568 and to intersection point 548 and back to step 550 (i.e., Position is not incremented).

The particular steps performed in the getLabel( ) method will now be described with reference to FIG. 23. The getLabel( ) method receives a DOM tree object node N as an input parameter with the objective of returning a string value representative of the label of the input object node N. Processing begins at step 570 at which a variable Type is initialized to the return value of the Java getNodeType( ) method of the N object (i.e., Type=N.getNodeType( )). Processing then moves to a pair of serial decision blocks 572 and 574 which test whether Type is equal to "Text" (i.e, a String label) or whether Type is equal to an Element object.

If the test at decision block 572 is true, i.e., Type is a text value, processing moves to step 576 wherein a variable Label is initialized to a "Text" value and then processing moves to step 578 where the value of Label is returned to the calling function. If the test at 572 is false, processing moves to the decision block 574 wherein the test of whether Type has detected an element node type. If so, processing moves to step 580 in which the variable Label is set to the result of the getNodeName( ) method (if Java is used) after which processing moves to step 578 and the value of Label is returned to the calling function.

If the test at decision block 574 is false (i.e., Type is not a text or an element object), processing moves to step 582 at which an abnormal type is detected (see note 584) and nothing is returned to the calling function.

For example, given the node with OID &116 in FIG. 15, the node's label can be determined as being itemized-call, and its position as being 1. The first part of the XPath '/itemized call[1]' can thereby be generated. The parent of this node can thereafter be determined, which is the node with OID &111 in FIG. 15 having a label of invoice and a position of 1. The second part of the XPath expression '/invoice[1]' can then be generated. The two pieces can be concatenated together, and the XPath expression '/invoice[1]/itemized-call[1]'. Then the parent of the node &111 is determined, which is the document root. Once the document root node is encountered, the program ends and returns the XPath expression '/invoice[1]/itemized-call[1]'.

XQuery Expression to XPath Expression. If a query engine for XQuery or XPath that uses DOM as back-end storage model is assumed, then the translation of a DOM OID to an XPath expression can be performed easily as well.

For example, for the XQuery expression above, once the query is executed, the query engine binds the variable $carrier with the DOM node &116, which is in turn translated into an XPath expression using the DOM2XPath method of FIG. 21.

XPath to Relational Model. In the loader and data synchronizer 500, elements, when mapped to their relational representation, are identified by the pair node-name and iid, where node-name leads to the relational table and which tuple is to be found with the identifier iid. There appears to be a mismatch between XPath expressions and the corresponding tables and keys. However, the mapping from XPath expressions to relational tables and keys can easily be accomplished by maintaining a path index with an extension to support XPath. That is, the path index would provide the functionality to locate a tuple in the relational representation indexed by a path. For example, in the XPath index, for the XPath expression '/invoice[1]/itemized-call[1]', the key 'iid=8' and table name 'node-name=iid'. Hence with this index, the translation from XPath expressions into their relational equivalent is straightforward. For example, the DOM update Node.removeChild( ) for node '/invoice[1]' deleting the first child node '/invoice[1]/itemized-call[1]' will be translated into the loader and data synchronizer 500 primitive: DeleteLeafElement(8, "itemized-call").

These four primitive updates can be mapped into operations on their relational counterpart by explicitly exploiting knowledge in the DTDM tables 34 (identified by reference numerals 90, 92 and 94 throughout). As can be understood, a DTD does not define the data types of attributes and PCDATA. Hence, all data is treated herein as strings. However, this approach can be extended to offer different and additional data type handling by using XML schema.

FIG. 24

Figure 24:
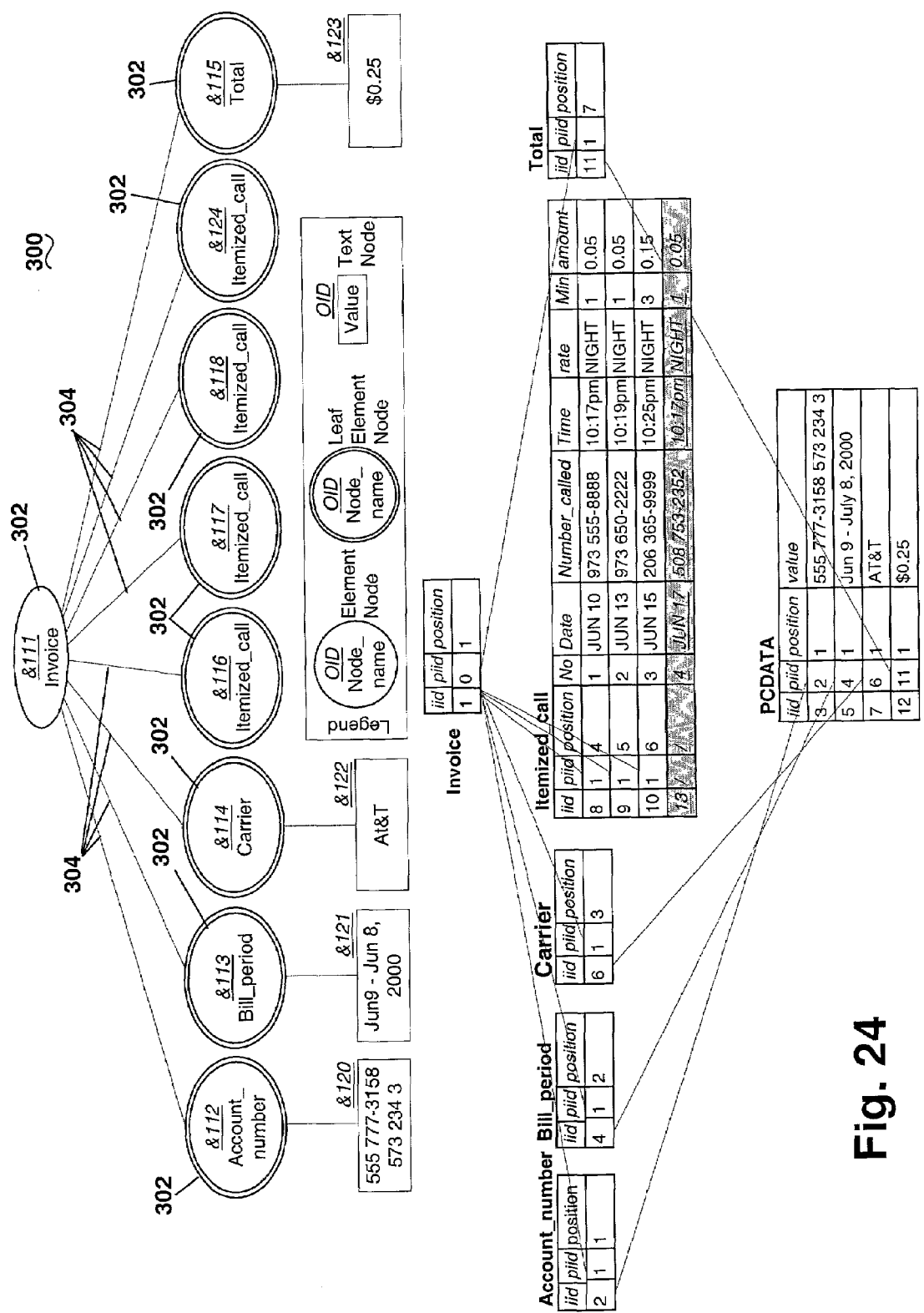
FIG. 24 is a modified version of the DOM tree shown in FIG. 15 and the relational tables shown in FIG. 17 after a new element (itemized_call) is created therein according to the invention of FIGS. 16–23.

FIG. 24 is a modified version of the DOM tree shown in FIG. 15 and the relational tables shown in FIG. 17 after a new element (itemized_call) is created therein according to the invention of FIGS. 16–23.

Create Root Element Operation. The operation CreateRootElement(table_name, list_of_attributes): new iid adds one tuple to the table identified by table-name with the applicable attributes list_of_attributes as indicated by the DTDM tables 90, 92 and 94, and an empty piid and order attribute values. A unique iid value is generated by the system 500 for the new tuple and returned by this function. table_name and list_of_attributes are gathered from the XML update specification, a.i., DOM update APIs, and extended XQuery.

The SQL template generated to accomplish this update is:

INSERT INTO <node-type> (iid, piid, order, <list_of_attributes>) VALUES (<new_iid>, null, null, <values_of__list_of_attributes>)

An example of how to create such an element will now be described with respect to FIG. 17, assuming it is desired to create a new element itemized_call with the following attribute values:

| No | date | number_called | time | rate | min | amount |
|---|---|---|---|---|---|---|
| 4 | JUN 17 | 508 753-2352 | 10:17 pm | NIGHT | 1 | 10.05 |

Then, the CreateRootElement operation adds one tuple to the table Itemized call with a new unique system generated iid, a null value for piid, a null value for order and with other attributes as provided in the list_of_attributes as an input parameter. The instantiated query of the query template in can be shown by representative SQL syntax as follows:

INSERT INTO Itemized-call (iid, piid, order, no, data, number_called, time, rate, min, amount) VALUES (new_iid, null, null, 4, 'JUN 17', '508 753-2352', '10:17pm', 'NIGHT', '1', '0.05')

The resulting DOM tree is shown in FIG. 24.

FIG. 25

Figure 25:
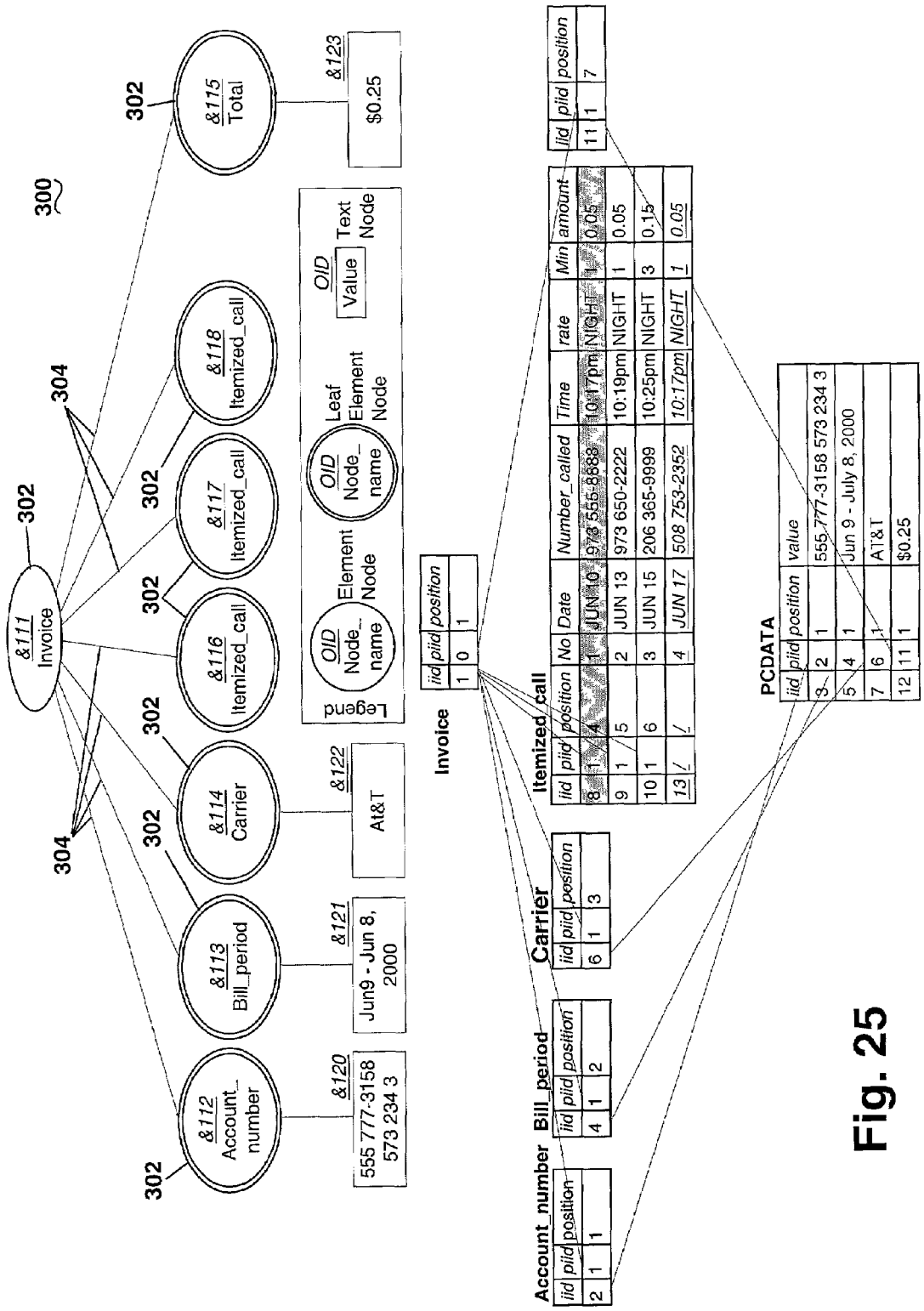
FIG. 25 is a modified version of the DOM tree shown in FIG. 15 and the relational tables shown in FIG. 17 after an existing element (itemized_call) is modified according to the invention of FIGS. 16–24.

FIG. 25 is a modified version of the DOM tree and the relational tables shown in FIG. 24 after an existing element (itemized_call) is modified according to the invention of FIGS. 16–24.

Modify Element Operation. The operation ModifyElement(iid, table_name, attribute_name, new_value): original_iid updates the attribute specified by attribute_name of a tuple identified by iid of table table_name with the new value new_value. It will return the iid value of the modified tuple.

The SQL template is:
UPDATE <node_type> SET <attribute_name>=<new_value> WHERE iid=<iid>

For example, if it is needed to modify the element itemized-call (referring to FIG. 17) which has iid=8 and change the value of its number_called attribute to '508 753-2352', then the ModifyElement primitive is specified as ModifyElement(8, 'itemized_call', 'number_called', '508 753-2352'). The instantiate SQL to accomplish the same on the mapped relational table is:
UPDATE Itemized_call SET number_called='508 753-2352' WHERE iid=8

The updated table from the Examples 3–4 is shown in FIG. 25.

FIG. 26

Figure 26:
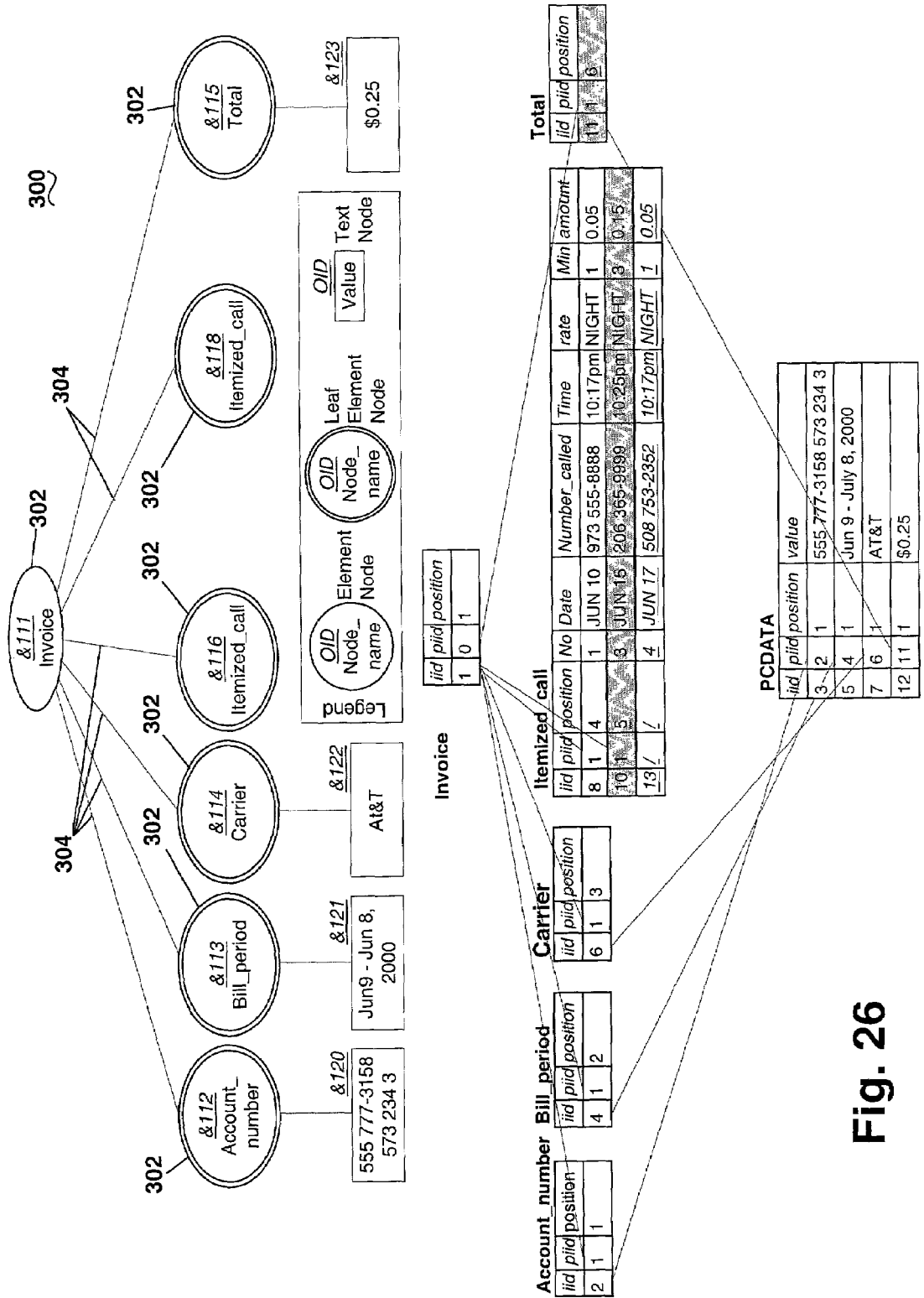
FIG. 26 is a modified version of the DOM tree shown in FIG. 15 and the relational tables shown in FIG. 17 after an existing element (itemized_call) is deleted according to the invention of FIGS. 16–25.

FIG. 26 is a modified version of the DOM tree and the relational tables shown in FIG. 25 after an existing element (itemized_call) is deleted according to the invention of FIGS. 16–25.

DeleteLeaf Element Operation. The operation Delete-LeafElement(iid, table_name): Parent_iid deletes one tuple identified by the iid of table table_name and adjusts the position column values of the sibling tuples. This method returns the parent tuple's iid.

There are certain concepts needed for the following detailed explanation of this update primitive 514 as follows:

Sibling Tuples of tuple t. The tuples corresponding to sibling nodes in a DOM tree of the node, which is stored as the tuple t, are called sibling tuples of tuple t.

Sibling Tables of tuple t. The tables containing the sibling tuples of tuple t are called the sibling tables of tuple t.

The DeleteLeaf Element first obtains a list of the sibling tables of the current element by querying the DTDM tables 90, 92 and 94. This can be done using a join on the DTDM tables 90, 92 and 94.

For example, referring to FIG. 17, if it is desired to delete the itemized_call tuple with iid=9 from underneath the invoice element, then the query to find the sibling tables will be the following:

SELECT DISTINCT Tsibling.name FROM DTDM-ItemTfrom, DTDM-ItemTsibling, DTDM-NestingTup, DTDM-NestingTdown WHERE Tfrom.name=t.itemized_callt AND Tfrom.id=Tup.Toid AND Tup.Fromid=Tdown.Fromid AND Tdown.Toid=Tsibling.id Then, the sibling tables are traversed to decrease the positions of the sibling tuples on the right side of the to-be-deleted tuple.

UPDATE <table_name> SET order=order−1
WHERE piid=iid_of parent_element AND order>order_of_to_be_deleted_tuple where the iid_of_parent_element and order_of_to_be_deleted_tuple can be obtained by the following query to the database:

SELECT piid AS iid_of_parent_element, order AS order_of_to_be_deleted_tuple FROM itemized-call WHERE iid=9

Third, the to-be-deleted tuple identified by the identifier=iid from the table table_name is deleted, for example:

DELETE FROM itemized_call WHERE iid=9

The resulting DOM tree is shown in FIG. 26.

FIG. 27

Figure 27:
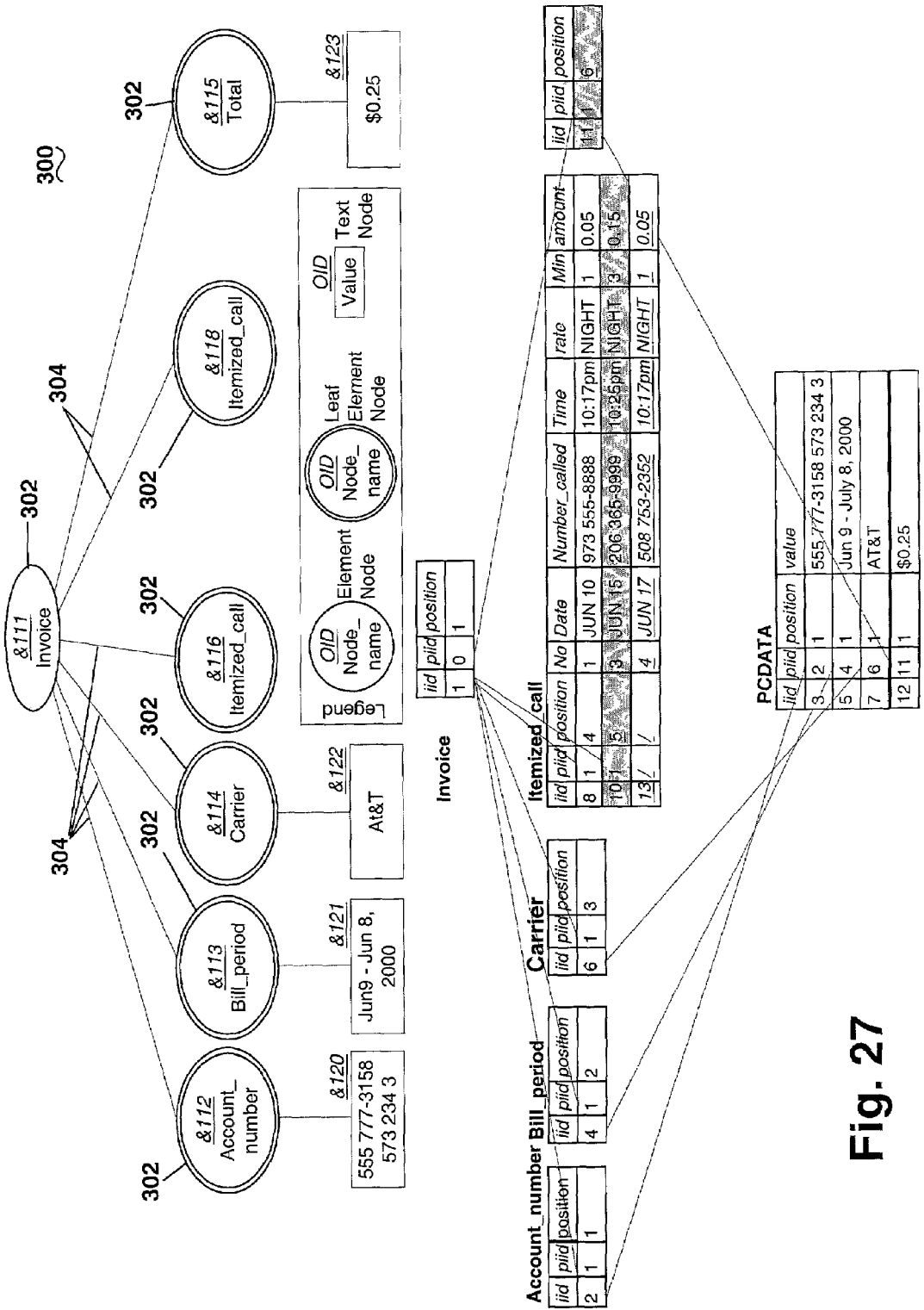
FIG. 27 is a modified version of the DOM tree shown in FIG. 15 and the relational tables shown in FIG. 17 after an existing element (itemized_call) is moved according to the invention of FIGS. 16–26.

FIG. 27 is a modified version of the DOM tree shown in FIG. 15 and the relational tables shown in FIG. 17 after an existing element (itemized_call) is moved according to the invention of FIGS. 16–26.

Move Element Operation. The operation MoveElement (iid, iid_table_name, piid, piid_table_name, new-position): original-iid moves the tuple identified by iid of the table iid_table_name to the children of the tuple identified by piid of table piid_table_name at the position new-position. It returns the moved element's iid.

The complexity of the relationship between the old and the new position of the given element complicates this operation. There are three kinds of relationships between the two positions:

Case 1: If the element is moved between different parent elements (either located in one table or two different tables), then the position of the tuples in the sibling tables that are larger than or equal to the to_node position must be increased, and the position of the tuples in the sibling tables that are larger than the from_node position must be decreased. There are three sub-cases based on when either one or both of the parent elements are NULL.

Case 1.a: Both parent elements are NULLs. In this case, there is nothing to move. No query is executed.

Case 1.b: The parent element of the to-be-moved element is NULL. In this case, the to-be-moved element is a root element. Only one query is executed, which increases the position of the tuples in the sibling tables that are larger than and equal the to-node position.

Case 1.c: The destination parent element is NULL. In this case, it is desired to convert the to-be-moved element into a root element. Only one query is executed, which decreases the position of the tuples in the sibling tables that are larger than the from-node position.

Case 2: If the element is moved underneath the same parent, then there are two sub-cases.

Case 2.a: First, if the from-node position is less than the to-node position, then the positions of the sibling tuples with the position greater than the from-node position but less than and equal the to-node position are decreased.

Case 2.b: Second, if the from-node position is larger than the to-node position, the positions of sibling tuples with the position greater than and equal the to-node position but less than the from-node position are increased.

Finally, the piid and position of the to-be-moved tuple (the from node) are updated.

By way of example, to attach the itemized_call tuple with key iid=13 to the invoice tuple with key iid=1 at position 6. First, the from_piid and from_position are obtained:

SELECT piid AS from_piid, position AS from_position FROM itemized_call WHERE iid=13

In the above example, it will be understood that from_piid is NULL, and from_position is NULL. As can be seen, the itemized_call tuple with key iid=13 does not have a parent. Hence, this scenario qualifies in the above-defined Case 1.b from above. Then, it is only needed to increase the positions of the sibling tuples that are greater than the new position, which is 6. From the convenient data and structure of the DTDM tables, it can be easily determined that the sibling tables for itemized_call are itemized_call, account_number, bill_period, carrier, and total. The query for the total table is shown below. The generation of SQL statements to be executed against all of the other tables is similar and hence omitted.

UPDATE total SET position=position+1 WHERE piid=1 AND position>6

Only the tuple in the total table with iid=11 is updated, and its position is changed from 6 to 7. Then, the piid and position to the itemized_call tuple with iid=13 is updated by the example SQL shown below. As the result, a new DOM tree has been achieved as well as the new corresponding relational storage illustrated in FIG. 26.

UPDATE itemized_call SET piid=1, position=6 WHERE iid=13

An XML document is said to be valid if it is compliant to a specific DTD. Though most currently available XML parsers, e.g., AElfred, DB2 XML Extender, DOMit, IBM XML for C++, Lark and Larval, libxml, Silfide XML Parser (XSP) with validation, Stilo XMLDeveloper, XML Parser for Java, etc., can validate a complete XML document, these products typically do not validate an individual XML update. Since there is no existing specification of validated XML updates, and DOM can only do un-validated updates. If updates are specified without any kind of validation checking, the modified data could then be in a possibly non-valid state according to its DTD. Hence, the DTD constraints that will be checked during the update process are discussed according to the invention, so that we can ensure the validation of the four update primitives 514.

It was discussed earlier that there are several properties defined in the DTD, such as, grouping, nesting, element referencing, ordering, existence, and occurrence. All of these properties must be checked against the following DTD constraints characterized below. Four constraints based on the DTD metadata have been provided below for discussion.

Attribute constraint: An attribute can have different constraints defined in the DTD and hence are stored in the DTDM-Attribute table. Once a new value of an attribute is set or a new element is created, it is necessary to check whether the type and the default value constraints of the attribute still hold true. The type and default value of an attribute are referred to as its attribute constraints.

In the discussion above with respect to FIG. 24, one root element with its attributes and values was created. The itemized_call element has the following attributes: no, date, number-called, time, rate, min, and amount. The number_called attribute is used herein and below as an example. From the DTDM-Attribute table 92, it can be seen that the number_called attribute of the itemized_call element is of type "CDATA", which, in turn, is translated into a String type in the relational data model. Then it can be said that the type checking of the attribute number_called is successful. So far, DTD has no strong type checking. Once the XML schema, which has a strong type support, is utilized, more in depth attribute type checking support may be required.

Reference constraint: In XML, a special type of attribute called ID/IDREF(S) has been designated to model cross-element references that imply special global constraints, such as, uniqueness of the ID typed attribute, and referential integrity of the IDREF typed attribute, namely that an IDREF typed attribute can only reference an existing ID. Hence, this kind of constraint can be separated from other constraints on the attributes and be classified as reference constraint.

In the earlier examples, the itemized_call element has one ID typed attribute, called no. In that example, the attribute no has the value 4, which is unique in the whole document. Hence, the update passes the reference constraint checking. If the attribute no was 3 instead of 4 then the constraint checking would fail. If one additional element type called dropped_calls was added (which might indicate that the identified calls have been dropped because of a network problem), with the following definition:

<!ELEMENT dropped_calls EMPTY>
<!ATTLIST no_ref IDREF>

If it is desired to create a root element of this dropped_calls element type, then it must be checked that the no_ref attribute will reference an existing no attribute. In this example, a reference ID between 1 and 4 would be required. Otherwise, the referential integrity constraint will be broken.

Nesting constraint: When an element is moved, it must be checked if there is a legal nesting relationship between the types of the new parent and the new (and old) children elements. The nesting constraint, which constrains the relationship between parents and their children, includes both type constraint and order constraint.

The type constraint in these examples allows an itemized_call element to be moved under an invoice element, but not to move an itemized_call element under an account_number element (i.e., because one is a string type and one is a number type). This is so because there is no nesting relationship between the itemized_call element and the account_number element defined in the DTD. The order constraint would allow us to move an itemized_call element between other itemized_call elements, but not to move an itemized-call element before an account_number element. The reason is that the DTD defines what the account_number element is before all the itemized_call elements.

Quantifier constraint: Two additional columns captured in the DTDM tables called "optional" and "multiple" are used to capture the quantifier constraints, i.e., 1, ?, +, and *. When one element is being moved or deleted, it must be assured that the number of the children of the related parent still satisfy the quantifier constraint.

For example, an invoice element has to contain one and only one account_number element. So, that account_number element is deleted or if another account_number element is added, both will violate this "1" quantifier constraint for the account_number element. However, an invoice element can contain zero or more itemized_call elements, hence deleting or adding such elements will always pass the quantifier constraint checking.

It is now discussed how the loader and data synchronizer 500 incrementally validates each update based on the DTD, i.e., by using the metadata capturing the DTD information in the DTDM tables, before the execution. All of the XML update validation is done against the relational representation of the XML document, since this is the only representation where it can be assumed the complete XML document is stored.

Four update primitives were defined earlier, i.e., CreateRootElement, DeleteLeafElement, ModifyElement, and MoveElement. Not all the update primitives affect all four DTD constraints.

The CreateRootElement primitive does not make any connection to existing XML fragments. Hence it will neither affect the nesting constraint nor the quantifier constraint. It will at most affect the attribute constraint and the reference constraint.

The DeleteLeafElement primitive will not affect the attribute constraint and the nesting constraint, because it does not create any new elements. Instead, it affects the reference constraint and the quantifier constraint. It should be noted that the reference constraint checking does not permit an element with an ID attribute to be deleted if any other element refers to it.

The ModifyElement primitive updates only the attribute values in an existing element. Hence, the attribute constraint and the reference constraint may be affected. It does not affect the nesting constraint and the quantifier constraint.

The MoveElement primitive can change the structure of the XML document, but will not change any data values. Hence, only the nesting constraint and quantifier constraint will be affected, while the attribute constraint and reference constraint will not be touched.

In the XML update validation described herein, the four DTD constraints specified above are grouped using the following four functions:

AttributeCheck(table_name, attribute_name, new_value) checks the attribute constraint using the DTDM-Attribute and DTDM-Item tables 92 and 90, respectively. This check is used for the validation of the CreateRootElement and the ModifyElement update primitives 514.

ReferenceCheck(table_name, attribute_name, new_value) checks the reference constraint using the DTDM-Attribute and DTDM-Item tables. This check is used for the validation of the CreateRootElement, DeleteLeafElement, and the ModifyElement update primitives.

NestingCheck(from_table_name, from_iid, to_table_name, to_piid) checks the nesting constraint of the nesting relationship between the element identified by from_table_name and from_iid with its parent and also the nesting relationship with the element identified by to_table_name and to_iid, by using the DTDM-Nesting and DTDM-Item tables 94 and 90, respectively. This method is used for the validation of the MoveElement update primitive.

QuantifierCheck(table_name, iid) checks the quantifier constraint of the nesting relationship between the element identified by the table_name and iid with its parent element using the DTDM-Nesting and DTDM-Item tables 94 and 90, respectively. This method is used for the validation of the DeleteLeafElement and the MoveElement primitive.

The table below summarizes the primitives, affected constraints and their checking functions. If there is a "X" in the constraint for an update primitive, the update primitive has to do the validation checking for that constraint before the execution of the received update specification. For example, the two "X"s for the CreateRootElement primive mean that the attribute constraint and reference constraint have to be checked before the execution of the CreateRootElement primitive.

| Primitive | Constraint/Checking | | | |
|---|---|---|---|---|
| | Attribute | Reference | Nesting | Quantifier |
| CreateRootElement | X | X | | |
| DeleteLeafElement | | X | | X |
| ModifyElement | X | X | | |
| MoveElement | | | X | X |

FIGS. 28–29

Figure 28:
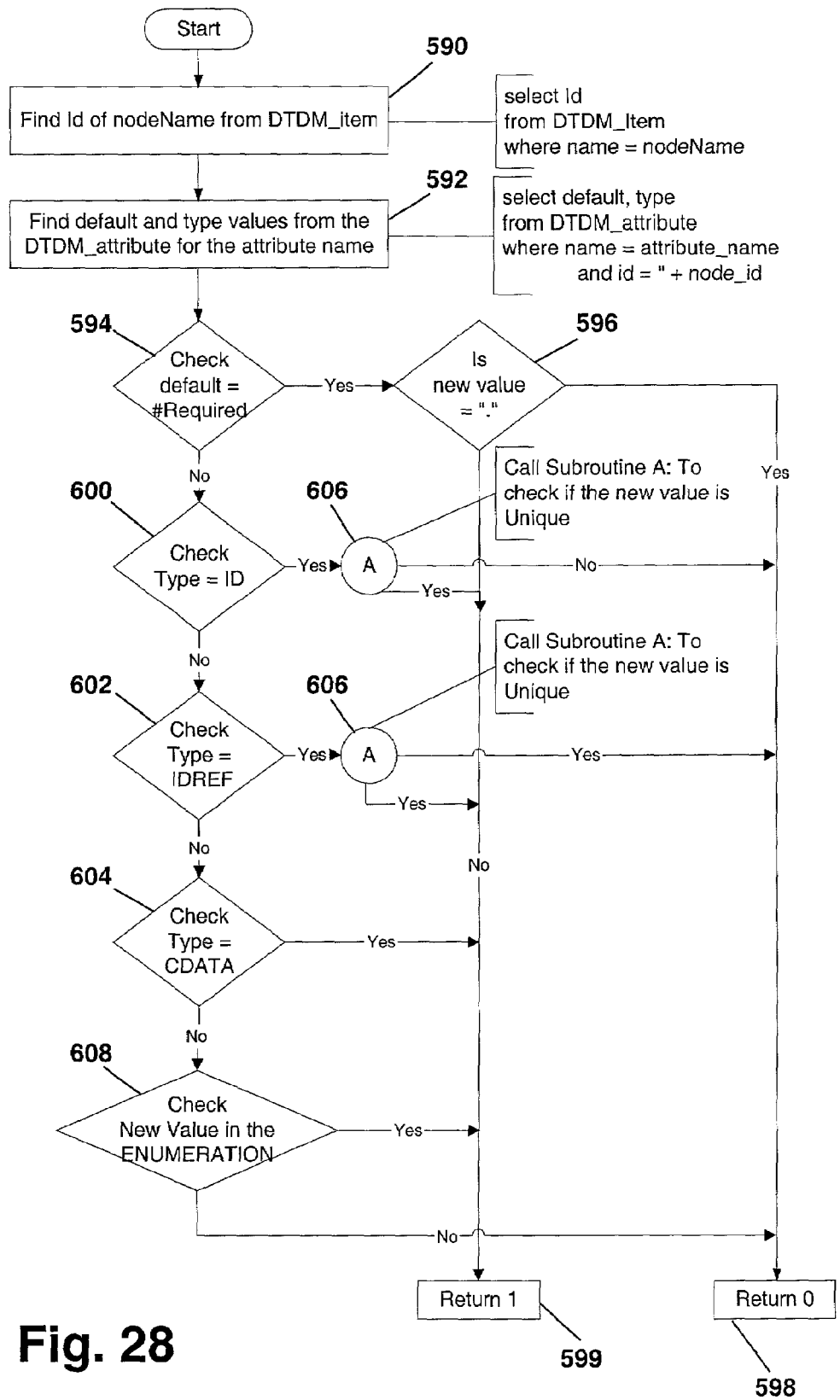
FIG. 28 is a flow chart detailing the steps of checking attributes for validating updates to an RDBMS when a root element is created and/or an existing element is modified according to the invention of FIGS. 16–27.

FIG. 28 is a flow chart detailing the steps of checking attributes for validating updates to an RDBMS when a root element is created and/or an existing element is modified according to the invention of FIGS. 16–27.

Figure 29:
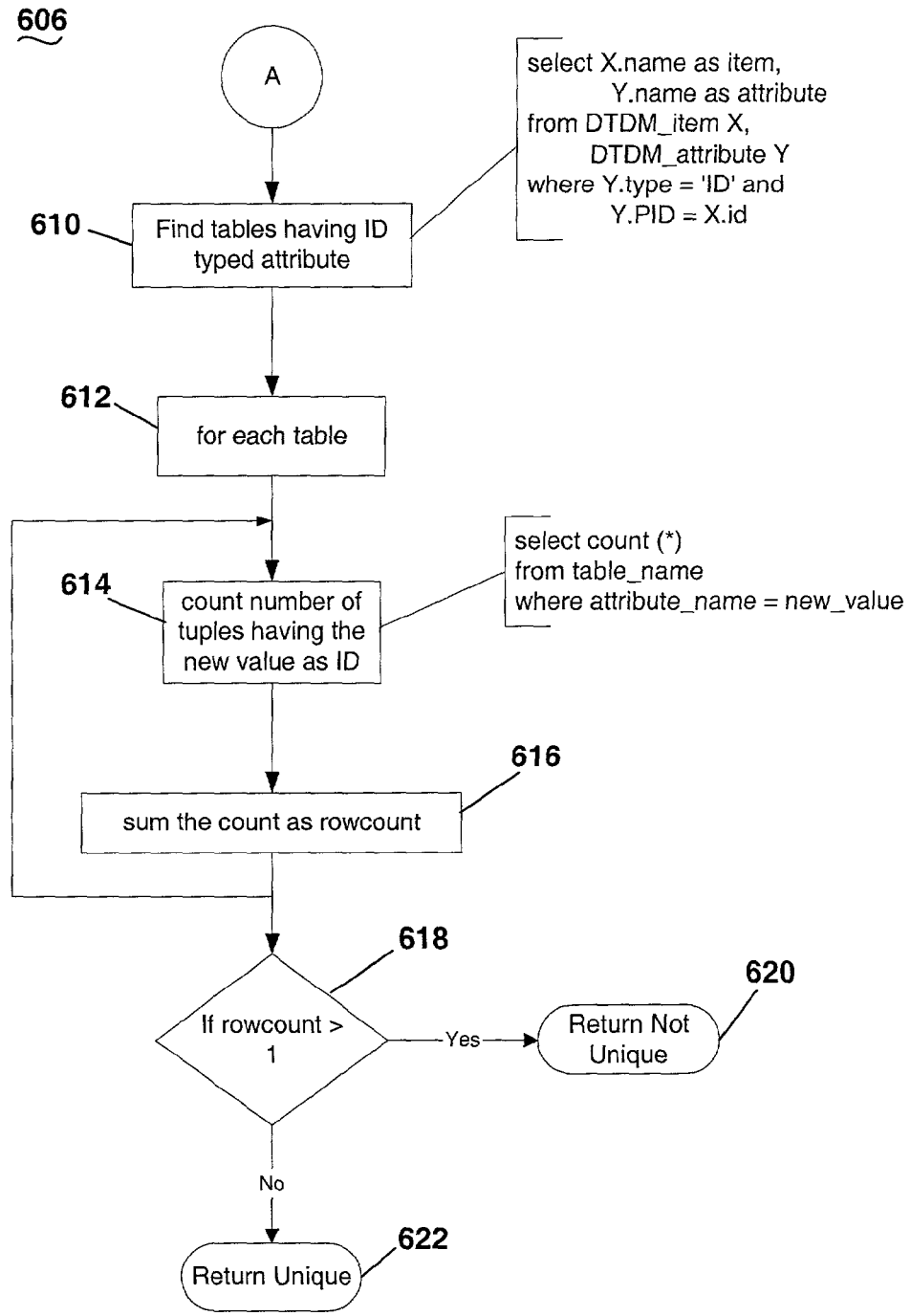
FIG. 29 is a flow chart detailing the steps of checking the internal table cross-references for validating updates to an RDBMS when a root element is created and/or an existing element is modified or deleted according to the invention of FIGS. 16–28.

FIG. 29 is a flow chart detailing the steps of checking the internal table cross-references for validating updates to an RDBMS when a root element is created and/or an existing element is modified or deleted according to the invention of FIGS. 16–28.

Process for the AttributeCheck method for the CreateRootElement and ModifyElement Primitives. AttributeCheck accepts three parameters: (1) table_name: identifies the name of the node on which the operation is performed. (2) attribute_name: identifies the attribute name on which the operation is performed. (3) new_value: identifies the new value for the attribute.

The flow chart in FIG. 28 describes the attribute constraint, and FIG. 29 describes the reference constraint checking.

For the ModifyElement primitive, AttributeCheck only checks the to-be-modified attribute. For the CreateRootElement primitive, AttributeCheck checks all the attributes in the attribute list. The validation check is based on the default value and the type of the attribute returned by querying the DTDM-Item table and DTDM-Attribute table in FIG. 28 at steps 590 and 592, respectively.

Processing then moves to decision block 594 at which the default value of the attribute is checked. If the default value is #REQUIRED, then processing moves to decision block 596 at which the variable new_value is checked against null. If the new_value variable is null, the constraint checking fails (i.e., returns 0 at step 598). Otherwise, it can be safely assumed that there are no restrictions on the new_value and processing moves to return a 1 value and indicate no such restrictions at step 599.

If there is no required value as determined at decision block 594, processing moves to the case check against the node type as shown by decision blocks 600, 602 and 604 which check whether the node type is ID, IDREF or CDATA, respectively.

If the type is determined to be ID at decision block 600, processing moves to step 606 which calls the subprocess of FIG. 29 as shown by the subroutine A circle marked with reference numeral 606. While the details of subroutine A are discussed below with reference to FIG. 29, a return of a Yes/True/1 value will send processing to step 599 and return a Yes/True/1 value to the calling process, while a return of No/False/0 will conversely send processing to step 598 and return the same No/False/0 value to the calling function. This requires that the value has to be unique among all attributes of type ID of all tables. The subroutine A (Box 7) checks the uniqueness. If the new_value is unique, the constraint checking succeeds, otherwise it fails as described.

If the type is IDREF as determined at decision block 602, the value has to exist among all of the ID-typed attributes. The existence is also checked by calling the subroutine A <606>. If new_value exists, the constraint checking succeeds (i.e., moves to step 599), otherwise it fails (i.e., moves to step 598).

If the type is CDATA as determined at decision block 604, the constraint checking always succeeds (i.e., processing moves to step 599).

If the type is an enumeration as determined at decision block 608, like (true false), (red|yellow|green), then new_value has to be one of the enumerated choices (i.e., processing moves to step 599). Otherwise, the constraint checking fails (i.e., processing moves to step 598).

The uniqueness function identified as subroutine A and reference numeral 606 in FIG. 28 that checks if a given ID value is unique is now discussed in greater detail with reference to FIG. 29. Processing first moves to step 610 wherein all of the ID-typed attributes and tables are obtained by querying the DTDM tables 90, 92 and 94 (e.g., SELECT X.name as Item, Y.name as Attribute FROM DTDM-Item X, DTDM-Attribute Y WHERE Y.type='ID' AND Y.PID=X.id). Next, processing moves to step 612 wherein a loop through each of the recordset rows returned in step 610 is initiated. Processing then moves to step 614 wherein the number of tuples containing the passed new-value as their ID is counted (e.g., in a variable called count).

Processing then moves to step 616 where an overall total variable (e.g., rowcount) is incremented by the count total determined in step 614. The loop continues back to step 614 for the remainder of the rows of the recordset created in steps 610, 612, after which, processing moves to decision block 618 wherein it is determined whether the value of rowcount is greater than 1 (i.e., more than one element with the requisite ID). If so, then the target ID is not unique and processing moves to step 620 and a value is returned representative of the lack of uniqueness. Otherwise, processing moves to step 622 and a value is returned representative of the uniqueness.

FIG. 30

Figure 30:
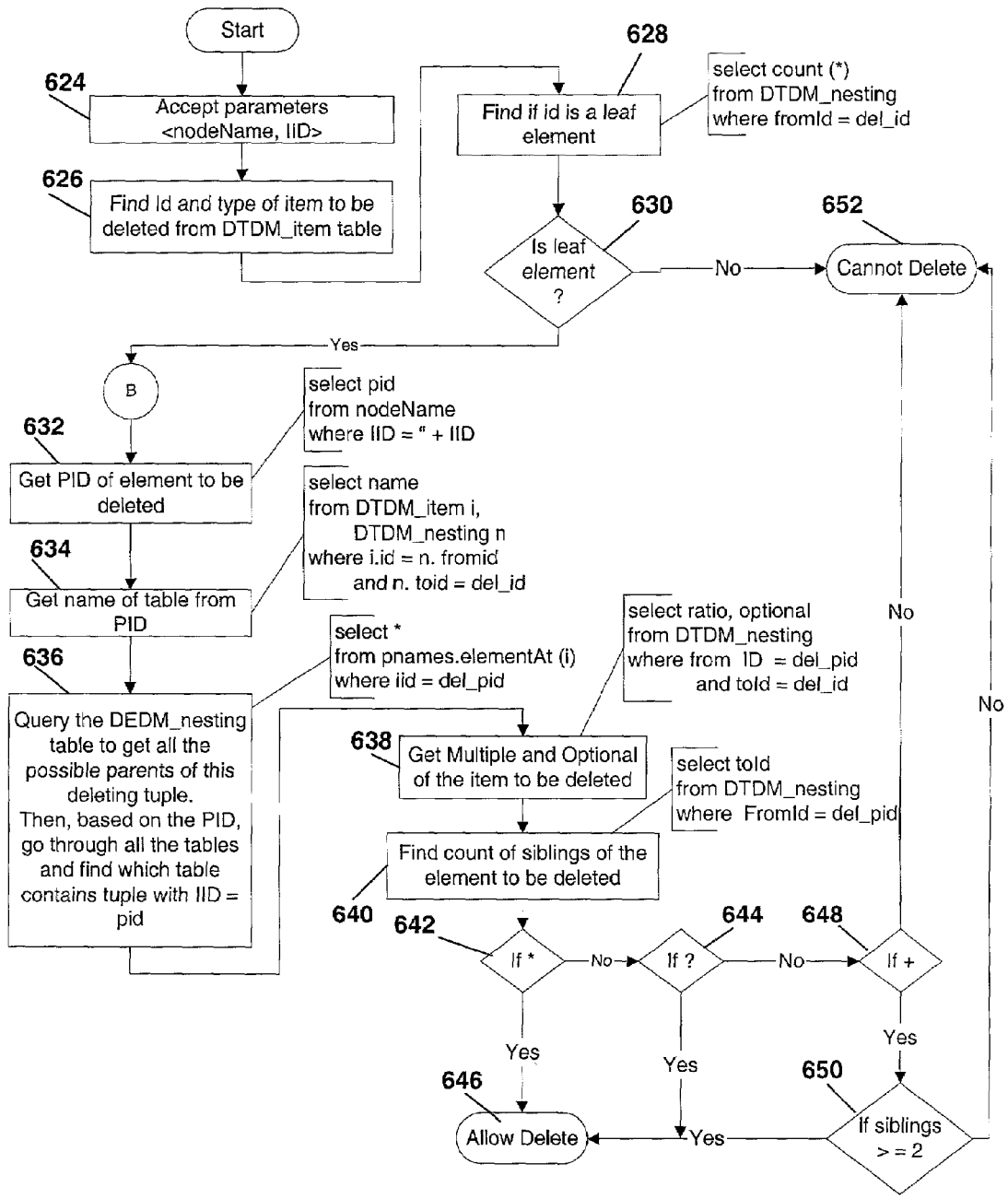
FIG. 30 is a flow chart detailing the steps of checking quantifiers for validating updates to an RDBMS when a root element is created and/or an existing element is modified according to the invention of FIGS. 16–29.

FIG. 30 is a flow chart detailing the steps of checking quantifiers for validating updates to an RDBMS when a root element is created and/or an existing element is modified according to the invention of FIGS. 16–29.

The QuantifierCheck is used to validate the DeleteLeaf Element update propagation. It accepts two parameters: (1) NodeName: identifies the name of the node to be deleted, and (2) iid: identifies the tuple that represents the to-be-deleted node. The flow chart is shown in FIG. 30. Processing begins at step 624 wherein the QuantifierCheck process receives input parameters nodeName and iid. It will be understood that example SQL to accomplish the objectives of each step in this method of FIG. 30 (as throughout the figures) are shown in notes associated with each step in the figures.

First, it is necessary to insure that the element to be deleted is a leaf element. This can be done at steps 626 and 628 by querying both the DTDM-Item table 90 and the DTDM-Nesting table 94, respectively, to find all possible children tables, and then to determine whether the iid belongs to a leaf element by searching for iid in the piid column of the DTDM-Nesting table 94. The decision of whether the received node is a leaf element is determined at decision block 630 based upon the results of steps 626 and 628.

If the node element is indeed a leaf element, processing moves to step 632 wherein it can be necessary to determine whether the nesting relationships of the to-be-deleted element with its parent to insure it will not inadvertently sever the nesting constraint. First, after the parent id piid is determined in step 632, it is determined at steps 634 and 636 whether the parent id (piid) of the iid element has other relevant nesting relationships by querying the DTDM tables 34. Then, at step 638, the multiple and optional indicators of the piid and iid from the DTDM-Nesting table 94 are returned. Next, at step 640, the existing number of siblings of the to-be-deleted items is determined.

Then, processing moves to decision blocks 642 and 644 which determine whether the indicator is * or ?, respectively, and, if so, processing moves to step 646 which returns a value representative that the node can be deleted because the elements are optional. If not, processing moves to decision block 648 which checks whether the indicator is +, and, if so, processing moves to decision block 650 which determines whether the number of siblings is at least 2. If so, processing moves to step 646 wherein the delete update is allowed. If not, processing moves to step 652 because the indicator is 1, thereby indicating that no element could be deleted.

The NestingCheck method is used to validate the MoveElement update propagation. It accepts four parameters: (1) from_node_type, (2) from_iid: identifies the name and iid of the to-be-moved node, and (3) to_node_type and to_piid: identifies the name and iid of the new location to which the node is moved.

First, it should be confirmed that the nesting relationship between the to_node_type and from_node_type exists by querying the DTDM-Nesting table 94.

Second, the quantifier constraint should be checked. The number of "from siblings" is referred to as fromsiblings, and the number of "to siblings" is referred to as tosiblings. The quantifier for the nesting relationship between the from_parent and from_node is called from, and the quantifier for the nesting relationship between the to_parent and the to_node is called to. These 16 conditions are then checked, which is the product of the 4 kinds of quantifiers for from and 4 kinds of quantifiers for to, as shown below.

| NO. | from | to | Movable |
| --- | --- | --- | --- |
| 1. | * | * | Yes |
| 2. | * | + | Yes |
| 3. | * | ? | if tosiblings = 0 yes, else no |
| 4. | * | 1 | No |
| 5. | + | * | if fromsibling > 1 yes, else no |
| 6. | + | + | if fromsibling > 1 yes, else no |
| 7. | + | ? | if fromsibling > 1 and tosiblings = 0 yes, else no |
| 8. | + | 1 | No |
| 9. | ? | * | Yes |
| 10. | ? | + | Yes |
| 11. | ? | ? | if tosiblings = 0 yes, else no |
| 12. | ? | 1 | No |
| 13. | 1 | * | No |
| 14. | 1 | + | No |
| 15. | 1 | ? | No |
| 16. | 1 | 1 | No |

Next, the order constraint is checked. The order constraint can be checked with the help of all the sibling tables of the to_node where the to_be_moved node will be moved to (tosiblings in above table).

As of the date of this application, the system 500 has been implemented, including the update propagation and the update validation in Java using JDBC calls. The database back-end is preferably a high-end database model such as Oracle 8i running on a P111800 with 512 MB and Suse Linux 7.0 as the operating system. The client part of the loader and data synchronizer system 500 runs on a Windows NT 4.0 workstation with a 128 MB P11400.

Since the system 500 is implemented in Java and communication with its back-end database is through JDBC calls, update propagation can be relatively expensive. To reduce the frequent back and forth communication with the back-end and hence to reduce the total update time, a batch-statements processing mode is recommended. Thus instead of sending SQL statements one at a time, the statements are batched and then sent to the backend, i.e., to Oracle. Batch update propagation makes efficient use of the connection with the back-end and reduces the overall time for updates.

To implement the batch update propagation technique, the special method of OracleConnection called setDefaultExecuteBatch was employed. This method takes an integer which specifies the number of statements to be hatched before they are sent to the back-end server for execution. The connection object batches all the SQL statements received after calling the setDefaultExecuteBatch method until the number of SQL statements hatched reaches the argument specified in the call to this method. These statements are then all sent together for execution to the server.

In order to make use of the batch utility, the SQL statements to be submitted to the batch are supposed to be pre-compiled (these SQL statements are called Prepared Statements). Since the SQL statements hatched are pre-compiled, Oracle does not compile each statement as received and this further reduces the update propagation time. All the SQL statements received in a batch can then be directly submitted to the query processor for execution. In our implementation, the SQL statements are prepared using the prepareStatement method of the OracleConnection class provided by Java. Since the format of the SQL statements needed for update propagation is fixed, the parameterized SQL statements are prepared when the statement is added to the batch. Thus, a hashtable is created to hold the prepared SQL statements required for the four update primitives according to the invention described herein. Similarly, this technique of batching is also employed for the validation of XML updates.

Since the metadata tables (DTDM tables 34) are frequently used for querying information related to the element being updated, the DTDM tables 34 can be cached to decrease the overall execution time for update propagation. The Oracle statements to cache the DTDM tables are:

ALTER TABLE DTDM item CACHE ALTER TABLE DTDM attribute CACHE ALTER TABLE DTDM nesting CACHE Thus, it can be seen that a more efficient method of updating a RDBMS with XML data from an external source can be had with the system 500 according to the system described herein. The invention described herein addresses the naive handling of order in the update propagation as well as includes incremental validation of the XML updates. Furthermore, the metadata of the DTD is used during the validation check of the updates to determine which DTD constraints must be met, e.g., attribute, reference, nesting, and quantifier constraints.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for synchronizing and updating a relational database containing existing data with supplemental data, the relational database having a set of tables defined by a relational schema, the supplemental data comprising formatted data having a document type definition representative of the relational schema, the method comprising the steps of:
   receiving at least one proposed data update representative of the supplemental data from a source external to the relational database, the supplemental data being represented by a document object; and
   propagating the received at least one proposed data update into the relational database in a manner which ensures compliance with both the relational database relational schema and the document type definition without requiring reloading the existing data in the relational database, said propagating step comprising the substeps of
      traversing the document object to determine at least one path expression identifying at least one element of the document object, said at least one element being identified by said at least one proposed data update, and
      using said at least one path expression to determine relational identifiers of data to be updated in the relational database.

2. The method of claim 1 wherein said formatted data is tagged-format data.

3. The method of claim 2 further comprising the step of providing at least one update primitive for accomplishing the step of propagating the received at least one proposed data update.

4. The method of claim 3 further comprising the step of selectively calling the at least one update primitive and validating an output of the at least one update primitive against the document type definition.

5. The method of claim 4 wherein the at least one update primitive further comprises at least one of a create root element primitive, a modify element primitive, a delete leaf element primitive and a move element primitive.

6. The method of claim 5 wherein the create root element primitive creates a new unattached root element in the document object representative of the at least one proposed data update.

7. The method of claim 6 wherein the modify element primitive modifies a specified attribute of an identified element of the document object representative of the at least one proposed data update.

8. The method of claim 7 wherein the delete leaf element primitive removes an identified element of the document object representative of the at least one proposed data update.

9. The method of claim 8 wherein the move element primitive changes the document object location of an identified element of the document object representative of the at least one proposed data update.

10. The method of claim 9 further comprising the step of calling both the create element primitive and the move element primitive to create a new element in the document object and to attach the newly-created element within the document object at a desired location within the document object when the at least one proposed data update calls for the creation of a new element.

11. The method of claim 1 wherein said path expression is formed in an XPath syntax.

12. The method of claim 1 further comprising the step of converting an object identifier of said at least one element into said at least one path expression.

13. The method of claim 1 wherein said traversing step is performed in a child-to-parent direction to build said at least one path expression.

14. The method of claim 13 wherein said path expression comprises at least one node indicator comprising label value and a position value corresponding to the document object.

15. The method of claim 14 wherein successive node indicators are separated by a preselected delimiter.

16. The method of claim 14 wherein the position value corresponds to a lateral sibling location in the document object.

17. The method of claim 14 wherein the label value is selected based upon a node type of a predetermined node.

18. The method of claim 1 further comprising the step of validating the at least one proposed data update to ensure the at least one proposed data update is compliant with the document type definition.

19. The method of claim 18 further comprising the step of determining whether at least one of a type constraint and an attribute constraint remain valid when at least one of a new value of a document object attribute value is set and a new document object is created.

20. The method of claim 19 further comprising the step of determining whether a cross-reference index is unique within the document object during the step of validating the at least one proposed data update.

21. The method of claim 20 further comprising the step of determining whether a default value is required during the creation of a new element in accordance with the at least one proposed data update during the step of validating the at least one proposed data update.

22. The method of claim 21 further comprising the step of determining whether an enumerated value is required by the at least one proposed data update and determining whether a proposed value therefore is contained in a specified enumeration during the step of validating the at least one proposed data update.

23. The method of claim 22 further comprising the step of checking a nesting relationship between a former and a new location of an element when an element is moved in accordance with the at least one proposed data update during the step of validating the at least one proposed data update.

24. The method of claim 23 further comprising the step of determining a quantitative relationship between the at least one proposed data update and the relational database and determining whether the at least one proposed data update complies with such quantitative relationship as determined by the document type definition.

25. The method of claim 23 further comprising the step of checking a quantifier constraint of a nesting relationship between elements implicated by the at least one proposed data update and determining whether the at least one proposed data update violates that quantifier constraint.

26. The method of claim 25 further comprising the step of preventing the propagation step from occurring if the at least one proposed data update fails the validation step.

27. The method of claim 1 wherein said propagating step further comprises:
translating said proposed data update into a set of update primitives;
executing said set of update primitives to transform said at least one element of the document object in accordance with said proposed data update;
mapping said set of update primitives to relational operations; and
applying said relational operations to said data identified by said relational identifiers.

28. A method for both generating a relational schema for a relational database corresponding to a document having a document-type definition and data complying with the document-type definition, the document-type definition having content particles representative of the structure of the data and loading the data into the relational database in a manner consistent with the relational schema, the method comprising the steps of:
extracting metadata representative of the document-type definition from the document-type definition;
generating the relational schema from the metadata, thereby defining via the metadata at least one table in the relational database corresponding to at least one of the content particles of the document-type definition;
loading the data into the at least one table according to the relational schema and in a manner driven by the metadata; and
updating the relational database with at least one proposed update associated with supplemental data represented by a document object, said updating step comprising the sub-steps of
traversing the document object to determine at least one path expression identifying at least one element of the document object, said at least one element being identified by said at least one proposed data update,
using said at least one path expression to determine relational identifiers of at least a subset of the data in the relational database, and
applying at least one relational operation to said at least a subset of the data in the relational database to update said at least a subset of the data in accordance with said at least one proposed update.

29. The method of claim 28 further comprising the step of loading data from the document into the relational schema of the relational database.

30. The method of claim 28 further comprising the step of validating the at least one proposed update with respect to the document-type definition.

31. The method of claim 30 further comprising the step of preventing the at least one proposed update from being loaded into the relational database if the validating step fails.

32. The method of claim 30 wherein the step of validating the at least one proposed update further comprises the step of comparing at least one of a data type constraint, an attribute constraint, a link reference constraint, a nesting relationship constraint and a quantifier constraint of the at least one proposed update against that required by the document-type definition prior to the step of loading the data from the at least one proposed update into the relational database.

33. A system for synchronizing and updating a relational database containing existing data with supplemental data, the relational database having a set of tables defined by a relational schema, the supplemental data comprising formatted data having a document type definition representative of the relational schema, comprising:
a translator for receiving at least one proposed data update representative of the supplemental data from a source external to the relational database, the supplemental data being represented by a document object; and
an execution device operably connected to the translator for propagating the received at least one proposed data update into the relational database in a manner which ensures compliance with both the relational database relational schema and the document type definition without requiring reloading the existing data in the relational database, said execution device being configured to perform the steps of:
traversing the document object to determine at least one path expression identifying at least one element of the document object, said at least one element being identified by said at least one proposed data update; and
using said at least one path expression to determine relational identifiers of data to be updated in the relational database.

34. The system of claim 33 wherein said formatted data is tagged-format data.

35. The system of claim 33 further comprising at least one update primitive for propagating the received at least one proposed data update to the execution device.

36. The system of claim 33 wherein the at least one update primitive is selectively called in order to validate an output of the at least one update primitive against the document type definition.

37. The system of claim 36 wherein the at least one update primitive further comprises at least one of a create root element primitive, a modify element primitive, a delete leaf element primitive and a move element primitive.

38. The system of claim 37 wherein the create root element primitive creates a new unattached root element in the document object representative of the at least one proposed data update.

39. The system of claim 38 wherein the modify element primitive modifies a specified attribute of an identified element of the document object representative of the at least one proposed data update.

40. The system of claim 39 wherein the delete leaf element primitive removes an identified element of the document object representative of the at least one proposed data update.

41. The system of claim 40 wherein the move element primitive changes the document object location of an identified element of the document object representative of the at least one proposed data update.

42. The system of claim 41 wherein the create element primitive and the move element primitive create a new element in the document object and attach the newly-created element within the document object at a desired location within the document object when the at least one proposed data update calls for the creation of a new element.

43. The system of claim 36 wherein the at least one update primitive further comprises a create root element primitive, a modify element primitive, a delete leaf element primitive, and a move element primitive.

44. The system of claim 43 wherein the create root element primitive, the modify element primitive, the delete leaf element primitive, and the move element primitive form a complete set of operations for transforming any first document object tree into any second document object tree, wherein the first document object tree and the second document object tree each comply with the same document type definition.

45. The system of claim 33 wherein said path expression is formed in an XPath syntax.

46. The system of claim 33 wherein the translator converts an object identifier of said at least one element into said at least one path expression during the translation of said at least one proposed data update.

47. The system of claim 33 wherein the translator traverses the document object in a child-to-parent direction to build said at least one path expression.

48. The system of claim 47 wherein said path expression comprises at least one node indicator comprising label value and a position value corresponding to the document object.

49. The system of claim 48 wherein successive node indicators are separated by a preselected delimiter.

50. The system of claim 48 wherein the position value corresponds to a lateral sibling location in the document object.

51. The system of claim 48 wherein the label value is selected based upon a node type of a predetermined node.

52. The system of claim 33 further comprising a validator which determines whether the at least one proposed data update is compliant with the document-type definition.

53. The system of claim 52 wherein the validator determines whether at least one of a type constraint and an attribute constraint remain valid when at least one of a new value of a document object attribute value is set and a new document object is created.

54. The system of claim 53 wherein the validator determines whether a cross-reference index is unique within the document object.

55. The system of claim 54 wherein the validator determines whether a default value is required during the creation of a new element in accordance with the at least one proposed data update.

56. The system of claim 55 wherein the validator determines whether an enumerated value is required by the at least one proposed data update and determines whether a proposed value therefore is contained in a specified enumeration.

57. The system of claim 56 wherein the validator checks a nesting relationship between a former and a new location of an element when an element is moved in accordance with the at least one proposed data update.

58. The system of claim 57 wherein the validator checks a quantifier constraint of a nesting relationship between elements implicated by the at least one proposed data update and determines whether the at least one proposed data update violates that quantifier constraint.

59. The system of claim 58 wherein the execution device prevents the at least one proposed data update from propagating to the relational database upon a validation failure signal from the validator.

60. The system of claim 57 wherein the validator determines a quantitative relationship between the at least one proposed data update and the relational database and determines whether the at least one proposed data update complies with such quantitative relationship as determined by the document type definition.

61. A system for both generating a relational schema for a relational database corresponding to a document having a document-type definition and data complying with the document-type definition, the document-type definition having content particles representative of the structure of the data and loading the data into the relational database in a manner consistent with the relational schema, comprising:

an extractor for creating metadata representative of the document-type definition from the document-type definition;

a generator for forming the relational schema from the metadata, thereby defining via the metadata at least one table in the relational database corresponding to at least one of the content particles of the document-type definition;

a loader for loading the data into the at least one table according to the relational schema and in a manner driven by the metadata; and a synchronizer for updating the relational database with at least one proposed update from a second document containing related data without requiring the reloading of the data already in the relational database by the loader, said synchronizer being configured to:

traverse the second document to determine at least one path expression identifying at least one element of the second document, said at least one element being identified by said at least one proposed data update;

use said at least one path expression to determine relational identifiers of at least a subset of the data in the relational database; and apply at least one relational operation to said at least a subset of the data in the relational database to update said at least a subset of the data in accordance with said at least one proposed update.

62. The system of claim 61 further comprising a validator for validating the at least one proposed update with respect to the document-type definition.

63. The system of claim 62 wherein the validator prevents the at least one proposed update from being loaded into the relational database by the synchronizer by sending a signal to the synchronizer.

64. The system of claim 63 wherein the validator compares at least one of a data type constraint, an attribute constraint, a link reference constraint, a nesting relationship constraint and a quantifier constraint of the at least one proposed update against that required by the document type definition prior to signaling the synchronizer to load the at least one proposed update into the relational database.

65. A method of synchronizing and updating existing data of a relational database, the method comprising:

receiving a proposed data update from a source external to the relational database, said proposed data update being represented by a document object;

translating said proposed data update into a set of update primitives;

executing said set of update primitives to transform at least one element of the document object in accordance with said proposed data update;

traversing the document object to determine a path expression identifying said at least one element of the document object;

using said path expression to determine relational identifiers identifying data in the relational database; and propagating said proposed data update into the relational database by mapping said set of update primitives to relational operations and applying said relational operations to said data identified by said relational identifiers.

66. The method of claim 65 further comprising validating said proposed data update by comparing said proposed data update with a plurality of relational tables containing relational schema representative of document type definition metadata.

67. The method of claim 66 wherein said plurality of relational tables includes a first table, a second table, and a third table, said first table comprising item metadata, said second table comprising attribute metadata, and said third table including nested relationship metadata.

68. The method of claim 65 wherein said relational identifiers comprise a table identifier and a tuple identifier, and said relational operations comprise said path expression having said relational identifiers as inputs.

* * * * *